US009607089B2

(12) United States Patent
Wissner et al.

(10) Patent No.: US 9,607,089 B2
(45) **Date of Patent: *Mar. 28, 2017**

(54) SEARCH AND SEARCH OPTIMIZATION USING A PATTERN OF A LOCATION IDENTIFIER

(71) Applicant: VCVC III LLC, Seattle, WA (US)

(72) Inventors: James M. Wissner, San Francisco, CA (US); Nova Spivack, Sherman Oaks, CA (US)

(73) Assignee: VCVC III LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/514,313

(22) Filed: Oct. 14, 2014

(65) Prior Publication Data

US 2015/0032716 A1 Jan. 29, 2015

Related U.S. Application Data

(63) Continuation of application No. 12/760,387, filed on Apr. 14, 2010, now Pat. No. 8,862,579.
(Continued)

(51) Int. Cl.
*G06F 17/30* (2006.01)
*G06F 17/24* (2006.01)

(52) U.S. Cl.
CPC ...... *G06F 17/30864* (2013.01); *G06F 17/241* (2013.01); *G06F 17/3053* (2013.01);
(Continued)

(58) Field of Classification Search
None
See application file for complete search history.

(56) References Cited

U.S. PATENT DOCUMENTS

| | | | |
|---|---|---|---|
| 5,406,477 | A | 4/1995 | Harhen |
| 5,408,567 | A | 4/1995 | Hamilton |

(Continued)

FOREIGN PATENT DOCUMENTS

| | | | |
|---|---|---|---|
| EP | 1310884 A2 | 5/2003 | |
| JP | 2007094592 A | 4/2007 | |

(Continued)

OTHER PUBLICATIONS

"Improved markup langugage for semantic Web using object oriented technology, 21-24"—Kangchan, et al., IEEE, vol. 1, Sep. 2003 (pp. 330-334).

(Continued)

*Primary Examiner* — Sangwoo Ahn
(74) *Attorney, Agent, or Firm* — Perkins Coie LLP

(57) ABSTRACT

Systems and methods for search and search optimization using a pattern in a location identifier is disclosed. In one aspect, embodiments of the present disclosure include a method, which may be implemented on a system, of search and search optimization. The method includes, detecting a set of location identifiers that have a pattern that matches a specified pattern and identifying a set of search results as having content related to the semantic type. The specified pattern can be stored in a computer-readable storage medium and corresponds to a semantic type. The set of search results can include objects associated with the set of location identifiers having the specified pattern.

18 Claims, 35 Drawing Sheets

Related U.S. Application Data

(60) Provisional application No. 61/169,662, filed on Apr. 15, 2009.

(52) U.S. Cl.
CPC .. *G06F 17/30442* (2013.01); *G06F 17/30539* (2013.01); *G06F 17/30734* (2013.01)

(56) References Cited

U.S. PATENT DOCUMENTS

| | | | |
|---|---|---|---|
| 5,408,657 | A | 4/1995 | Bigelow et al. |
| 5,515,532 | A | 5/1996 | Iijima |
| 5,548,749 | A | 8/1996 | Kroenke et al. |
| 5,717,924 | A | 2/1998 | Kawai |
| 5,809,297 | A | 9/1998 | Kroenke et al. |
| 5,819,086 | A | 10/1998 | Kroenke |
| 5,873,077 | A | 2/1999 | Kanoh et al. |
| 5,905,498 | A | 5/1999 | Diament |
| 5,925,100 | A | 7/1999 | Drewry et al. |
| 5,966,686 | A | 10/1999 | Heidorn et al. |
| 6,173,287 | B1 | 1/2001 | Eberman et al. |
| 6,199,099 | B1 | 3/2001 | Gershman et al. |
| 6,311,194 | B1 | 10/2001 | Sheth et al. |
| 6,363,377 | B1 | 3/2002 | Kravets et al. |
| 6,370,542 | B1 | 4/2002 | Kenyon |
| 6,401,085 | B1 | 6/2002 | Gershman et al. |
| 6,411,952 | B1 | 6/2002 | Bharat et al. |
| 6,418,433 | B1 | 7/2002 | Chakrabarti et al. |
| 6,499,021 | B1 | 12/2002 | Abu-Hakima et al. |
| 6,513,059 | B1 | 1/2003 | Gupta et al. |
| 6,516,315 | B1 | 2/2003 | Gupta |
| 6,530,083 | B1 | 3/2003 | Liebenow |
| 6,633,869 | B1 | 10/2003 | Duparcmeur et al. |
| 6,643,650 | B1 | 11/2003 | Slaughter et al. |
| 6,654,741 | B1 | 11/2003 | Cohen et al. |
| 6,704,729 | B1 | 3/2004 | Klein et al. |
| 6,711,585 | B1 | 3/2004 | Copperman et al. |
| 6,741,744 | B1 | 5/2004 | Hsu |
| 6,748,441 | B1 | 6/2004 | Gemmell |
| 6,785,688 | B2 | 8/2004 | Abajian et al. |
| 6,789,077 | B1 | 9/2004 | Slaughter et al. |
| 6,816,850 | B2 | 11/2004 | Culliss |
| 6,816,857 | B1 | 11/2004 | Weissman et al. |
| 6,839,701 | B1 | 1/2005 | Baer et al. |
| 6,847,974 | B2 | 1/2005 | Wachtel |
| 6,859,807 | B1 | 2/2005 | Knight et al. |
| 6,868,447 | B1 | 3/2005 | Slaughter et al. |
| 6,892,196 | B1 | 5/2005 | Hughes |
| 6,941,300 | B2 | 9/2005 | Jensen-Grey |
| 6,996,566 | B1 | 2/2006 | George et al. |
| 7,072,883 | B2 | 7/2006 | Potok et al. |
| 7,092,928 | B1 | 8/2006 | Elad et al. |
| 7,093,200 | B2 | 8/2006 | Schreiber et al. |
| 7,177,798 | B2 | 2/2007 | Hsu et al. |
| 7,185,075 | B1 | 2/2007 | Mishra et al. |
| 7,197,451 | B1 | 3/2007 | Carter et al. |
| 7,200,862 | B2 | 4/2007 | Murching et al. |
| 7,216,002 | B1 | 5/2007 | Anderson |
| 7,246,164 | B2 | 7/2007 | Lehmann et al. |
| 7,260,573 | B1 | 8/2007 | Jeh et al. |
| 7,284,196 | B2 | 10/2007 | Skeen et al. |
| 7,343,365 | B2 | 3/2008 | Farnham et al. |
| 7,398,201 | B2 | 7/2008 | Marchisio et al. |
| 7,398,261 | B2 | 7/2008 | Spivack et al. |
| 7,401,087 | B2 | 7/2008 | Copperman et al. |
| 7,433,876 | B2 | 10/2008 | Spivack et al. |
| 7,516,401 | B2 | 4/2009 | Chen et al. |
| 7,536,323 | B2 | 5/2009 | Hsieh |
| 7,584,194 | B2 | 9/2009 | Tuttle et al. |
| 7,584,208 | B2 | 9/2009 | Spivack et al. |
| 7,640,267 | B2 | 12/2009 | Spivack et al. |
| 7,707,161 | B2 | 4/2010 | Hall et al. |
| 7,730,063 | B2 | 6/2010 | Eder |
| 7,730,094 | B2 | 6/2010 | Kaler et al. |
| 7,739,121 | B2 | 6/2010 | Jain et al. |
| 7,769,742 | B1 | 8/2010 | Brawer et al. |
| 7,769,757 | B2 | 8/2010 | Grefenstette et al. |
| 7,774,380 | B2 | 8/2010 | Burke et al. |
| 7,774,388 | B1 | 8/2010 | Runchey |
| 7,788,293 | B2 | 8/2010 | Pasztor et al. |
| 7,793,209 | B2 | 9/2010 | Kikuchi |
| 7,814,111 | B2 | 10/2010 | Levin |
| 7,895,235 | B2 | 2/2011 | Baeza-Yates et al. |
| 7,904,439 | B2 | 3/2011 | Horvitz et al. |
| 7,933,914 | B2 | 4/2011 | Ramsey et al. |
| 7,937,582 | B1 | 5/2011 | Lee |
| 7,966,564 | B2 | 6/2011 | Catlin et al. |
| 8,020,206 | B2 | 9/2011 | Hubbard et al. |
| 8,024,328 | B2 | 9/2011 | Dolin et al. |
| 8,046,227 | B2 | 10/2011 | Starkie |
| 8,050,935 | B2 | 11/2011 | Plutowski et al. |
| 8,103,676 | B2 | 1/2012 | Bedrax-Weiss et al. |
| 8,135,704 | B2 | 3/2012 | Hyder et al. |
| 8,135,831 | B2 | 3/2012 | Sinclair et al. |
| 8,150,859 | B2 | 4/2012 | Vadlamani et al. |
| 8,161,066 | B2 | 4/2012 | Spivack et al. |
| 8,166,010 | B2 | 4/2012 | Ives |
| 8,176,079 | B1 | 5/2012 | Spertus |
| 8,190,684 | B2 | 5/2012 | Spivack et al. |
| 8,200,617 | B2 | 6/2012 | Spivack et al. |
| 8,275,796 | B2 | 9/2012 | Spivack et al. |
| 8,281,361 | B1 | 10/2012 | Schepis et al. |
| 8,438,124 | B2 | 5/2013 | Spivack et al. |
| 8,539,552 | B1 | 9/2013 | Grabelsky et al. |
| 8,645,367 | B1 | 2/2014 | Hajaj et al. |
| 8,688,742 | B2 | 4/2014 | Fischer et al. |
| 8,843,536 | B1 | 9/2014 | Elbaz et al. |
| 8,862,579 | B2 | 10/2014 | Wissner et al. |
| 8,868,560 | B2 | 10/2014 | Spivack et al. |
| 8,924,838 | B2 | 12/2014 | Spivack et al. |
| 8,965,979 | B2 | 2/2015 | Spivack et al. |
| 9,020,967 | B2 | 4/2015 | Spivack et al. |
| 9,037,567 | B2 | 5/2015 | Wissner et al. |
| 9,189,479 | B2 | 11/2015 | Spivack et al. |
| 2001/0003828 | A1 | 6/2001 | Peterson et al. |
| 2001/0049700 | A1 | 12/2001 | Ichikura |
| 2002/0023122 | A1 | 2/2002 | Polizzi et al. |
| 2002/0049689 | A1 | 4/2002 | Venkatram |
| 2002/0052894 | A1 | 5/2002 | Bourdoncle et al. |
| 2002/0055936 | A1 | 5/2002 | Cheng et al. |
| 2002/0059188 | A1 | 5/2002 | Nomura et al. |
| 2002/0059223 | A1 | 5/2002 | Nash et al. |
| 2002/0069100 | A1 | 6/2002 | Arberman |
| 2002/0077803 | A1 | 6/2002 | Kudoh et al. |
| 2002/0082900 | A1 | 6/2002 | Johnson |
| 2002/0099696 | A1 | 7/2002 | Prince |
| 2002/0099737 | A1 | 7/2002 | Porter et al. |
| 2002/0103777 | A1 | 8/2002 | Zhang |
| 2002/0103920 | A1 | 8/2002 | Berkun et al. |
| 2002/0123957 | A1 | 9/2002 | Notarius et al. |
| 2002/0147748 | A1 | 10/2002 | Huang et al. |
| 2002/0152113 | A1 | 10/2002 | Butz |
| 2002/0161626 | A1 | 10/2002 | Plante et al. |
| 2002/0184111 | A1 | 12/2002 | Swanson |
| 2002/0184191 | A1 | 12/2002 | Marpe et al. |
| 2002/0194154 | A1 | 12/2002 | Levy et al. |
| 2002/0194181 | A1 | 12/2002 | Wachtel |
| 2002/0194201 | A1 | 12/2002 | Wilbanks et al. |
| 2003/0009536 | A1 | 1/2003 | Henderson et al. |
| 2003/0028871 | A1 | 2/2003 | Wang et al. |
| 2003/0046344 | A1 | 3/2003 | Kumhyr et al. |
| 2003/0074356 | A1 | 4/2003 | Kaler et al. |
| 2003/0093551 | A1 | 5/2003 | Taylor et al. |
| 2003/0120730 | A1 | 6/2003 | Kuno et al. |
| 2003/0126136 | A1 | 7/2003 | Omoigui |
| 2003/0133556 | A1 | 7/2003 | Naik et al. |
| 2003/0144892 | A1 | 7/2003 | Cowan et al. |
| 2003/0144988 | A1 | 7/2003 | Nareddy et al. |
| 2003/0149934 | A1 | 8/2003 | Worden |
| 2003/0158937 | A1 | 8/2003 | Johal et al. |
| 2003/0163513 | A1 | 8/2003 | Schaeck et al. |
| 2003/0177111 | A1 | 9/2003 | Egendorf et al. |
| 2003/0208472 | A1 | 11/2003 | Pham |
| 2003/0233224 | A1 | 12/2003 | Marchisio et al. |

(56) References Cited

U.S. PATENT DOCUMENTS

2004/0012773 A1 1/2004 Puttkammer
2004/0054671 A1 3/2004 Cohen et al.
2004/0073430 A1 4/2004 Desai et al.
2004/0083199 A1 4/2004 Govindugari et al.
2004/0083211 A1 4/2004 Bradford
2004/0088325 A1 5/2004 Elder et al.
2004/0093381 A1 5/2004 Hodges et al.
2004/0111386 A1 6/2004 Goldberg et al.
2004/0122977 A1 6/2004 Moran et al.
2004/0143716 A1 7/2004 Hong
2004/0153467 A1 8/2004 Conover et al.
2004/0158455 A1 8/2004 Spivack et al.
2004/0162773 A1 8/2004 Del Rey et al.
2004/0181525 A1 9/2004 Itzhak et al.
2004/0181604 A1 9/2004 Immonen
2004/0194181 P1 9/2004 Iwaki
2004/0210602 A1 10/2004 Hillis et al.
2004/0220893 A1 11/2004 Spivack et al.
2004/0230572 A1 11/2004 Omoigui
2004/0230634 A1 11/2004 Busaba et al.
2004/0230676 A1 11/2004 Spivack et al.
2004/0249795 A1 12/2004 Brockway et al.
2004/0260680 A1 12/2004 Best et al.
2004/0260701 A1 12/2004 Lehikoinen et al.
2005/0004978 A1 1/2005 Reed et al.
2005/0015357 A1 1/2005 Shahidi
2005/0021862 A1 1/2005 Schroeder et al.
2005/0027708 A1 2/2005 Mueller et al.
2005/0055644 A1 3/2005 Stockton
2005/0080775 A1 4/2005 Colledge et al.
2005/0086206 A1 4/2005 Balasubramanian et al.
2005/0114487 A1 5/2005 Peng et al.
2005/0131778 A1 6/2005 Bennett et al.
2005/0144158 A1 6/2005 Capper et al.
2005/0144162 A1 6/2005 Liang
2005/0149510 A1 7/2005 Shafrir
2005/0154746 A1 7/2005 Liu et al.
2005/0160065 A1 7/2005 Seeman
2005/0165642 A1 7/2005 Brouze et al.
2005/0165743 A1 7/2005 Bharat et al.
2005/0177568 A1 8/2005 Diamond et al.
2005/0210000 A1 9/2005 Michard
2005/0267871 A1 12/2005 Marchisio et al.
2005/0267872 A1 12/2005 Galai et al.
2005/0278309 A1 12/2005 Evans et al.
2005/0278390 A1 12/2005 Kaler et al.
2006/0004703 A1 1/2006 Spivack et al.
2006/0004717 A1* 1/2006 Ramarathnam ... G06F 17/30864
2006/0004732 A1 1/2006 Odom
2006/0004892 A1 1/2006 Lunt et al.
2006/0020596 A1 1/2006 Liu et al.
2006/0028803 A1 2/2006 Pocrass
2006/0031288 A1 2/2006 Ter Horst et al.
2006/0074726 A1 4/2006 Forbes et al.
2006/0074980 A1 4/2006 Sarkar
2006/0085788 A1 4/2006 Amir et al.
2006/0151507 A1 7/2006 Swartz et al.
2006/0168510 A1 7/2006 Bryar et al.
2006/0184617 A1 8/2006 Nicholas et al.
2006/0200434 A1 9/2006 Flinn et al.
2006/0200478 A1 9/2006 Pasztor et al.
2006/0213976 A1 9/2006 Inakoshi et al.
2006/0230011 A1 10/2006 Tuttle et al.
2006/0235873 A1 10/2006 Thomas
2006/0242013 A1 10/2006 Agarwal et al.
2006/0242574 A1 10/2006 Richardson et al.
2006/0248045 A1 11/2006 Toledano et al.
2006/0259357 A1 11/2006 Chiu
2006/0265397 A1 11/2006 Bryan et al.
2006/0287989 A1 12/2006 Glance
2007/0016771 A1 1/2007 Allison et al.
2007/0027865 A1 2/2007 Bartz et al.
2007/0038610 A1 2/2007 Omoigui
2007/0038643 A1 2/2007 Epstein
2007/0050338 A1* 3/2007 Strohm et al. .................... 707/3
2007/0061198 A1 3/2007 Ramer et al.
2007/0081197 A1 4/2007 Omoigui
2007/0118802 A1 5/2007 Gerace et al.
2007/0121843 A1* 5/2007 Atazky et al. ........... 379/114.13
2007/0124202 A1 5/2007 Simons
2007/0143502 A1 6/2007 Garcia-Martin et al.
2007/0174270 A1 7/2007 Goodwin et al.
2007/0179954 A1 8/2007 Kudoh et al.
2007/0203903 A1* 8/2007 Attaran Rezaei et al. ....... 707/5
2007/0208703 A1 9/2007 Shi et al.
2007/0208714 A1 9/2007 Ture et al.
2007/0220893 A1 9/2007 Woltmann et al.
2007/0250468 A1 10/2007 Pieper
2007/0260598 A1 11/2007 Odom
2008/0010291 A1 1/2008 Poola et al.
2008/0010292 A1 1/2008 Poola
2008/0021924 A1 1/2008 Hall et al.
2008/0034058 A1 2/2008 Korman et al.
2008/0059519 A1 3/2008 Grifftih
2008/0091656 A1 4/2008 Charnock et al.
2008/0109212 A1 5/2008 Witbrock et al.
2008/0147788 A1 6/2008 Omoigui
2008/0148193 A1 6/2008 Moetteli
2008/0162498 A1 7/2008 Omoigui
2008/0172293 A1 7/2008 Raskin et al.
2008/0183694 A1 7/2008 Cane et al.
2008/0189267 A1 8/2008 Spivack et al.
2008/0235383 A1 9/2008 Schneider
2008/0243838 A1 10/2008 Scott et al.
2008/0262964 A1 10/2008 Bezos et al.
2008/0270428 A1 10/2008 McNamara et al.
2008/0287096 A1* 11/2008 Aaltonen et al. ............. 455/406
2008/0306959 A1 12/2008 Spivack et al.
2009/0006974 A1* 1/2009 Harinarayan et al. ........ 715/738
2009/0012991 A1 1/2009 Johnson et al.
2009/0030982 A1 1/2009 Spivack et al.
2009/0063538 A1 3/2009 Chitrapura et al.
2009/0076887 A1 3/2009 Spivack et al.
2009/0077062 A1 3/2009 Spivack et al.
2009/0077094 A1 3/2009 Bodain
2009/0077124 A1 3/2009 Spivack et al.
2009/0077531 A1 3/2009 Miloslavsky et al.
2009/0089278 A1 4/2009 Poola et al.
2009/0089286 A1 4/2009 Kumar et al.
2009/0106307 A1 4/2009 Spivack
2009/0138565 A1 5/2009 Shiff et al.
2009/0144240 A1 6/2009 Singh et al.
2009/0144612 A1 6/2009 Ishii et al.
2009/0171984 A1 7/2009 Park et al.
2009/0192972 A1 7/2009 Spivack et al.
2009/0192976 A1 7/2009 Spivack et al.
2009/0234711 A1 9/2009 Ramer et al.
2009/0240638 A1* 9/2009 Kirpal et al. ................... 706/12
2009/0254414 A1 10/2009 Schwarz et al.
2009/0254971 A1 10/2009 Herz et al.
2009/0327304 A1 12/2009 Agarwal et al.
2010/0004975 A1 1/2010 White et al.
2010/0046842 A1 2/2010 Conwell
2010/0049842 A1 2/2010 Koski
2010/0057815 A1 3/2010 Spivack et al.
2010/0070448 A1 3/2010 Omoigui
2010/0070542 A1 3/2010 Feinsmith
2010/0094952 A1 4/2010 Lindgren et al.
2010/0100545 A1 4/2010 Jeavons
2010/0153160 A1 6/2010 Bezemer et al.
2010/0223295 A1 9/2010 Stanley et al.
2010/0235918 A1 9/2010 Mizrahi et al.
2010/0262592 A1 10/2010 Brawer et al.
2010/0268596 A1 10/2010 Wissner et al.
2010/0268700 A1 10/2010 Wissner et al.
2010/0268702 A1 10/2010 Wissner et al.
2010/0268720 A1 10/2010 Spivack et al.
2011/0066525 A1 3/2011 Hulst et al.
2012/0010867 A1 1/2012 Eder
2012/0110008 A1 5/2012 Pieper
2012/0278163 A1 11/2012 Spivack et al.
2013/0132386 A1 5/2013 Runchey
2013/0204872 A1 8/2013 Runchey
2014/0032529 A1* 1/2014 Chang ........................... 707/722

(56) References Cited

U.S. PATENT DOCUMENTS

| | | | |
|---|---|---|---|
| 2014/0337332 A1 | 11/2014 | Wissner et al. |
| 2015/0039655 A1 | 2/2015 | Spivack et al. |
| 2015/0100870 A1 | 4/2015 | Spivack et al. |
| 2015/0248496 A1 | 9/2015 | Wissner et al. |
| 2015/0304400 A1 | 10/2015 | Spivack et al. |

FOREIGN PATENT DOCUMENTS

| | | | |
|---|---|---|---|
| KR | 20010028737 | A | 4/2001 |
| KR | 20040017824 | A | 2/2004 |
| KR | 20050023583 | A | 3/2005 |
| KR | 20060046522 | A | 5/2006 |
| KR | 20060117707 | | 11/2006 |
| KR | 20070061116 | | 6/2007 |
| WO | WO-2007032003 | A2 | 3/2007 |
| WO | 2010120941 | A2 | 10/2010 |
| WO | WO-2010120925 | A2 | 10/2010 |
| WO | WO-2010120929 | A2 | 10/2010 |
| WO | WO-2010120934 | A2 | 10/2010 |
| WO | WO-2010120941 | A2 | 10/2010 |

OTHER PUBLICATIONS

"Ontology-Driven Peer Profiling in Peer-to-Peer Enabled Semantic Web"—Olena Parhomenko, Yugyung Lee, E.K. Park—CIKM'03 Information and Knowledge Management Nov. 2003 (pp. 564-567).
"Re-integrating the research record"—Myers, et al., IEEE vol. 5, May-Jun. 2003 (pp. 44-50).
"SEAL—A Framework for Developing SEmanatic PortALS"—Nenad Stojanovic, Aleanander Maedche, Steffen Staab, Rudi Studer and York Sure, K=CAP'01', Oct. 22-23, 2001 ACM (pp. 155-162).
"Semanatic-Based Approach to Component Retrievel"—Vijayan Sugumaran and Veda C. Storey—ACM SIGMIS Database vol. 24, Issue Aug. 3, 2003 (pp. 8-24).
'a klog apart' [online]. Dijest.com 2003. [retrieved on May 3, 2007]. Retrieved from the Internet:<URL:htt://www.dijest.com/aka/2003/06/20.html>, 9 pages.
'Blogs as information spaces' [on-line]. Reflective Surface, 2003, [retrieved on May 3, 2007]. Retrieved from the Internet:<URL: http://log.reflectivesurface.com/2003/12/>, 6 pages.
'Development Notebook' [online]. Dannyayers, 2003, [retrieved on May 4, 2007]. Retrieved from the Internet: URL: webarchive.org/web/20031012055838/http://dannyayers.com/ideagraph-blog/archives/cat_jemblog.html>, 6 pages.
A. Hotho et al., "Information Retrieval in Folklsonomies: Search and Ranking," ESWC 2006, pp. 411-426.
Cass, "A Fountain of Knowledge," IEEE Spectrum, Jan. 2004, pp. 68-75.
Choi, Y. et al., "Refinement Method of Post-Processing and Training for Improvement of Automated Text Classification", Computational Science and its Applications—ICCSA 2006: International Conference, Glasgow, UK, May 8-11, 2006, pp. 298-308.
Devedži?, "A Survey of Modern Knowledge Modeling Techniques," Expert Systems with Applications, vol. 17, Issue 4, Nov. 1999, pp. 275-294.
European Supplementary Search Report EP 08 839486.1 Dated Dec. 27, 2010 pp. 1-8.
Fry, "Assembling a Parallel Corpus from RSS News Feeds," Artificial Intelligence Center, 2005, pp. 59-62.
International Search Report PCT/US07/75379; dated Aug. 5, 2008.
International Search Report PCT/US2008/010596 dated Mar. 24, 2009, pp. 1-2.
International Search Report PCT/US2008/011474 dated May 29, 2009; pp. 1-2.
International Search Report PCT/US2010/031090 dated Nov. 2, 2010; pp. 1-3.
International Search Report PCT/US2010/031096 dated Nov. 22, 2010; pp. 1-3.
International Search Report PCT/US2010/031101dated Nov. 26, 2010; pp. 1-3.
International Search Report PCT/US2010/031111 dated Nov. 26, 2010; pp. 1-3.
International Search Report PCT/US2010/039381 dated Jan. 5, 2011 pp. 1-3.
Kashyap et al., "Semantic and Schematic Similarities Between Database Objects: a Context-Based Approach," VLUB Journal, © Springer-Verlag 1996, pp. 1-29.
Lee et al., "Development of a Concurrent Mold Design System: a Knowledge-based Approach," Computer Integrated Manufacturing Systems, vol. 10, Issue 4, Oct. 1997, pp. 287-307.
Microsoft Computer Dictionary, p. 181, Microsoft Press, 5th ed., 2002.
Organizing weblogs by topic [online]. Read/Write Web, 2003, [retrieved on May 3, 2007]. Retrieved from the Internet: <URL: http://www.readwriteweb.com/archives/organizing_webl.php>, 3 pages.
Parkhomenko, O. et al., "Ontology Driven Peer Profiling in Peer to Peer Enabled Semantic Web," CIKM 03, pp. 564-557.
S. Decker and M. Frank, "The Social Semantic Desktop," DERI Technical Report May 2, 2004, May 2004, pp. 1-7.
Semantic Email [online]. University of Washington, [retrieved on May 3, 2007]. Retrieved from thee Internet:<URL:http://www.cs.washington.edu/research/semweb/email.html>, 2 pages.
Semantic link [online]. Meta, 2005 [retrieved on May 3, 2007]. Retrieved on the Internet:<URL: http://meta.wikimedia.org/wiki/Semantic_link>, 1 page.
W. Fang et al., "Toward a Semantic Search Engine Based on Ontologies," Proc. 4th Int'l Conf. on Mach. Learning and Cybernetics, Aug. 2005, pp. 1913-1918.
X. Shen, B. Tan, and X. Zhai, "Context-sensitive information retrieval using implicit feedback," Proc. SIGIR '05, pp. 43-50.
Maedche, "Layered Ontology Engineering," Ontology Learning for the Semantic Web, The Kluwer International Series in Engineering and Computer Science vol. 665, 2002, pp. 29-55.
Evans et al., "The Resource Locator Service: fixing a flaw in the web," Computer Networks, vol. 37, Issues 3-4, Nov. 5, 2001, pp. 307-330.
Aleman-Meza, et al., "Ranking Complex Relationships on the Semantic Web," IEEE Internet Computing, vol. 9, Issue 3, May/Jun. 2005, pp. 37-44.
Sheth, et al., "Semantic (Web) Technology in Action: Ontology Driven Information Systems for Search, Integration, and Analysis," IEEE Data Engineering Bulletin, vol. 26, No. 4, Dec. 2003, 11 pages.
Artz, et al., "A Survey of Trust in Computer Science and the Semantic Web," Web Semantics: Science, Services and Agents on the World Wide Web, vol. 5, Copyright 2007, 58-71.
Josang, et al., "A Survey of Trust and Reputation Systems for Online Service Provision," Decision Support Systems, vol. 43, Copyright 2007, pp. 618-614.
The American Heritage College Dictionary, 4th Edition, Houghton Mifflin Company, Boston, MA, Copyright 2002, p. 1260.
International Search Report PCT/US2008/010337 dated Dec. 28, 2009; pp. 1-3.
International Search Report PCT/US2009/002867 dated Dec. 18, 2009; pp. 1-3.
Milos Kudelka, et al., "Semantic Annotation of Web Pages Using Web Patterns", IEEE/WIC/ACM International Conference on Web Intelligence, Dec. 18, 2006, pp. 1-12.
Written Opinion PCT/US2007/75379 dated Aug. 5, 2008, pp. 1-7.
Written Opinion PCT/US2008/010337 dated Dec. 28, 2009; pp. 1-3.
Written Opinion PCT/US2008/011474 dated May 29, 2009, pp. 1-5.
Written Opinion PCT/US2009/002867 dated Dec. 18, 2009; pp. 1-5.
Written Opinion PCT/US2010/031090; dated Nov. 2, 2010; pp. 1-6.
Written Opinion PCT/US2010/031096 dated Nov. 22, 2010; pp. 1-4.
Written Opinion PCT/US2010/031101 dated Nov. 26, 2010dated; pp. 1-4.
Written Opinion PCT/US2010/031111 dated Nov. 26, 2010; pp. 1-6.
Written Opinion PCT/US2010/039381 dated Jan. 5, 2011 pp. 1-4.
Written Opinion PCT/US208/010596 dated Mar. 24, 2009, pp. 1-5.

(56) References Cited

OTHER PUBLICATIONS

Svatek, et al., "URL as a starting point for WWW document categorisation," RIAO 2000, College of France de France, Paris, France, Apr. 12-14, 2000, 10 pages.
Shin, et al., "Using URLS and Table Layout for Web Classification Tasks," WWW 2004, New York, NY, May 17-22, 2004, pp. 193-202.
Kules, et al, "Categorizing Web Search Results into Meaningful and Stable Categories Using Fast-Feature Techniques," JCDL 2006, Chapel Hill, NC, Jun. 11-15, 2006, pp. 210-219.
U.S. Appl. No. 60/972,815, filed Sep. 16, 2007, titled Collecting Market-Related Data via a Web-Based Networking Environment.
U.S. Appl. No. 11/873,388, filed Oct. 16, 2007, titled System and Method of Collecting Market-Related Data via a Web-Based Networking Environment.
U.S. Appl. No. 11/874,881, filed Oct. 18, 2007, titled System and Method of a Knowledge Management and Networking Environment.
U.S. Appl. No. 11/874,884, filed Oct. 18, 2007, titled System and Method of a Knowledge Management and Networking Environment.
U.S. Appl. No. 14/520,260, filed Oct. 21, 2014, titled System and Method of a Knowledge Management and Networking Environment.
U.S. Appl. No. 12/168,034, filed Jul. 3, 2008, titled System and Method for Leveraging Proximity Data in a Web-Based Socially-Enabled Knowledge Networking Environment.
U.S. Appl. No. 60/981,104, filed Oct. 18, 2007, titled System and Method of Advanced Functions of a Knowledge Management and Networking Environment.
U.S. Appl. No. 12/244,740, filed Oct. 2, 2008, titled System of a Knowledge Management and Networking Environment and Method for Providing Advanced Functions Therefor.
U.S. Appl. No. 60/427,550, filed Nov. 20, 2002, titled Associative Memory and Data Searching System Method.
U.S. Appl. No. 12/616,085, filed Nov. 10, 2009, titled Semantically Representing a Target Entity Using a Semantic Object.
U.S. Appl. No. 14/693,013, filed Apr. 22, 2015, titled Semantically Representing a Target Entity Using a Semantic Object.
U.S. Appl. No. 12/359,236, filed Jan. 23, 2009, titled Methods and Systems for Creating Semantic Object.
U.S. Appl. No. 60/546,794, filed Feb. 23, 2004, titled Semantic Web Portal and Platform.
U.S. Appl. No. 13/612,714, filed Sep. 12, 2012, titled Semantic Web Portal and Platform.
U.S. Appl. No. 60/821,891, filed Aug. 9, 2006, titled Harvesting Data From Page.
U.S. Appl. No. 11/835,079, filed Aug. 7, 2007, titled Harvesting Data From Page.
U.S. Appl. No. 14/570,671, filed Dec. 15, 2014, titled Harvesting Data From Page.
U.S. Appl. No. 13/455,096, filed Apr. 24, 2012, titled Methods and Systems for Semantically Managing Offers and Requests Over a Network.
U.S. Appl. No. 61/169,662, filed Apr. 15, 2009, titled Search and Search Optimization Using a Pattern of Location Identifier.
U.S. Appl. No. 61/169,669, filed Apr. 15, 2009, titled Generating User Customized Search Results and Building a Semantics Enhanced Search Engine.
U.S. Appl. No. 61/169,677, filed Apr. 15, 2009, titled Search Enhanced Semantic Advertising.
U.S. Appl. No. 12/760,387, filed Apr. 14, 2010, titled Search and Search Optimization Using a Pattern of a Location Identifier.
U.S. Appl. No. 12/760,411, filed Apr. 14, 2010, titled Generating User-Customized Search Results and Building a Semantics-Enhanced Engine.
U.S. Appl. No. 12/760,424, filed Apr. 14, 2010, titled Search Enhanced Engine Advertising.
U.S. Appl. No. 14/338,491, filed Jul. 23, 2014, titled Search Enhanced Engine Advertising.
U.S. Appl. No. 14/713,687, filed May 15, 2015, titled Generating User-Customized Search Results and Building a Semantics-Enhanced Search Engine.
U.S. Appl. No. 13/450,416, filed Apr. 18, 2012, titled Automatic Mapping of a Location Identifier Pattern of an Object to a Semantic Type Using Object Metadata.
U.S. Appl. No. 61/218,709, filed Jun. 19, 2009, titled Internet Subscription Through Content Tracking.
U.S. Appl. No. 12/819,999, filed Jun. 21, 2010, titled Using Indicia of Interest in a Topic for Identification and Aggregation of Content by a Semantics-Enabled Platform.
U.S. Appl. No. 13/022,376, filed Feb. 7, 2011, titled Internet Subscription Through Content Tracking.

* cited by examiner

1325 twine [ ] Search    Search Domains Vocabulary Admin

Figure 16B:
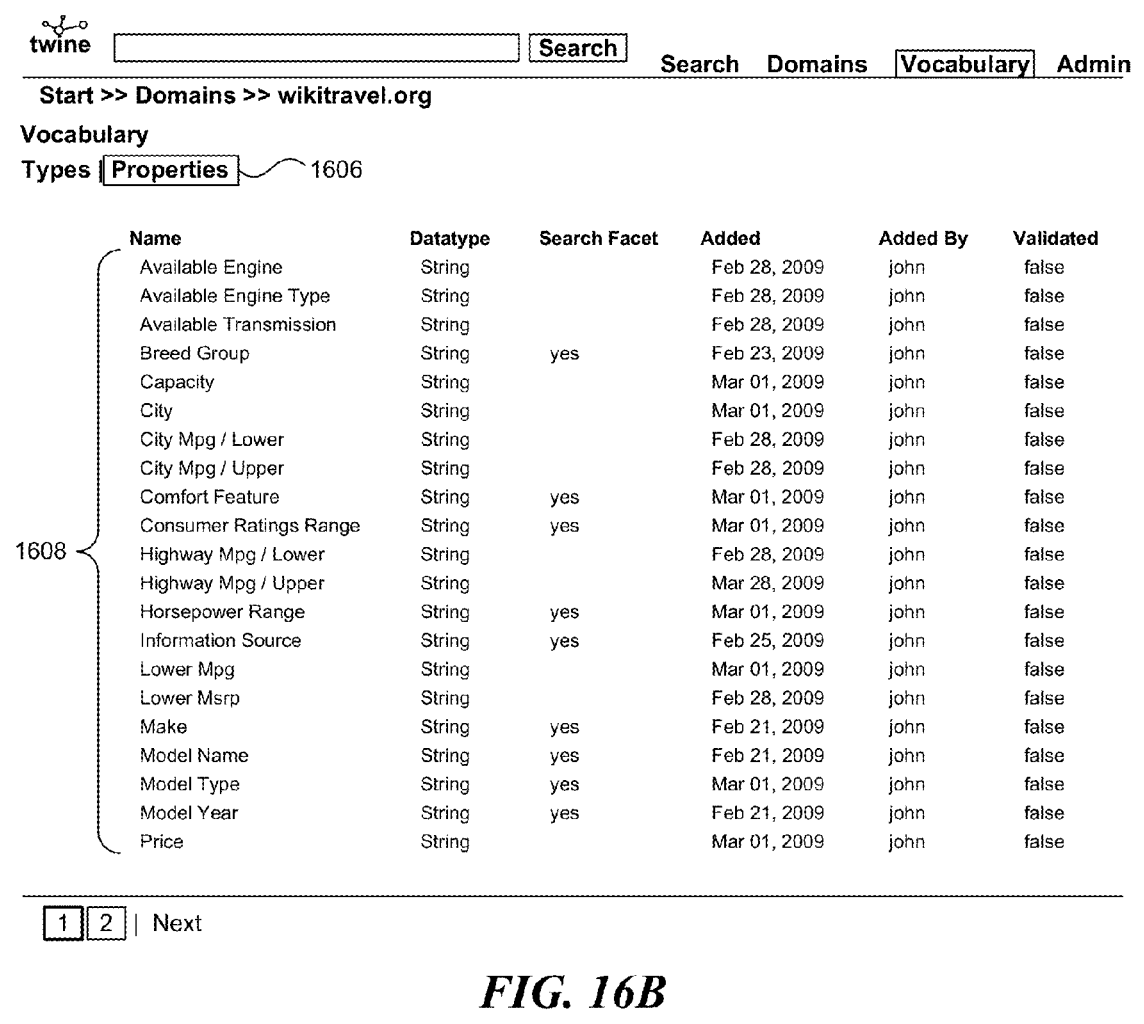

Start >> Domains >> wikitravel.org

Vocabulary

Types | Properties 1606

1608

| Name | Datatype | Search Facet | Added | Added By | Validated |
|---|---|---|---|---|---|
| Available Engine | String | | Feb 28, 2009 | john | false |
| Available Engine Type | String | | Feb 28, 2009 | john | false |
| Available Transmission | String | | Feb 28, 2009 | john | false |
| Breed Group | String | yes | Feb 23, 2009 | john | false |
| Capacity | String | | Mar 01, 2009 | john | false |
| City | String | | Mar 01, 2009 | john | false |
| City Mpg / Lower | String | | Feb 28, 2009 | john | false |
| City Mpg / Upper | String | | Feb 28, 2009 | john | false |
| Comfort Feature | String | yes | Mar 01, 2009 | john | false |
| Consumer Ratings Range | String | yes | Mar 01, 2009 | john | false |
| Highway Mpg / Lower | String | | Feb 28, 2009 | john | false |
| Highway Mpg / Upper | String | | Mar 28, 2009 | john | false |
| Horsepower Range | String | yes | Mar 01, 2009 | john | false |
| Information Source | String | yes | Feb 25, 2009 | john | false |
| Lower Mpg | String | | Mar 01, 2009 | john | false |
| Lower Msrp | String | | Feb 28, 2009 | john | false |
| Make | String | yes | Feb 21, 2009 | john | false |
| Model Name | String | yes | Feb 21, 2009 | john | false |
| Model Type | String | yes | Mar 01, 2009 | john | false |
| Model Year | String | yes | Feb 21, 2009 | john | false |
| Price | String | | Mar 01, 2009 | john | false |

1 2 | Next

SEARCH AND SEARCH OPTIMIZATION USING A PATTERN OF A LOCATION IDENTIFIER

CLAIM OF PRIORITY

This is a Continuation of U.S. application Ser. No. 12/760,387 titled "SEARCH AND SEARCH OPTIMIZATION USING A PATTERN OF A LOCATION IDENTIFIER," filed on Apr. 14, 2010, now U.S. Pat. No. 8,862,579 issued on Oct. 14, 2014 which claims priority to U.S. Provisional Patent Application No. 61/169,662 entitled "SEARCH AND SEARCH OPTIMIZATION USING A PATTERN OF A LOCATION IDENTIFIER", which was filed on Apr. 15, 2009, the contents of which are expressly incorporated by reference herein.

TECHNICAL FIELD

This technology relates generally to search and search optimization of objects containing electronic content and in particular, to optimizing search by enhancing relevancy through semantics and by improving computation time for the semantics enhancement.

BACKGROUND

The search through the vast amount of resources containing electronic content (e.g., digital music, digital video, documents, text files, web pages) in the digital world is increasingly becoming a resource consuming task. The mere task of executing the search based on a basic keyword comparison is daunting regardless of whether the scope of the search is within the confines of a local computing system, a private network, a local area network, or the World Wide Web.

The task of producing meaningful search results or even customized search results poses a yet further significant and seemingly impossible barrier to improving or enhancing a user's search experience. Furthermore, the prevalence of user-added or user-supplemented content has added to the difficulty and intricacy of performing search in an expedited manner while simultaneously producing meaningful results among the vast amount of available locally stored, shared, or globally available resources.

BRIEF DESCRIPTION OF THE DRAWINGS

FIG. 16B illustrates an example list of vocabulary showing attributes of semantic types that have been defined.

DETAILED DESCRIPTION

Figure 1:
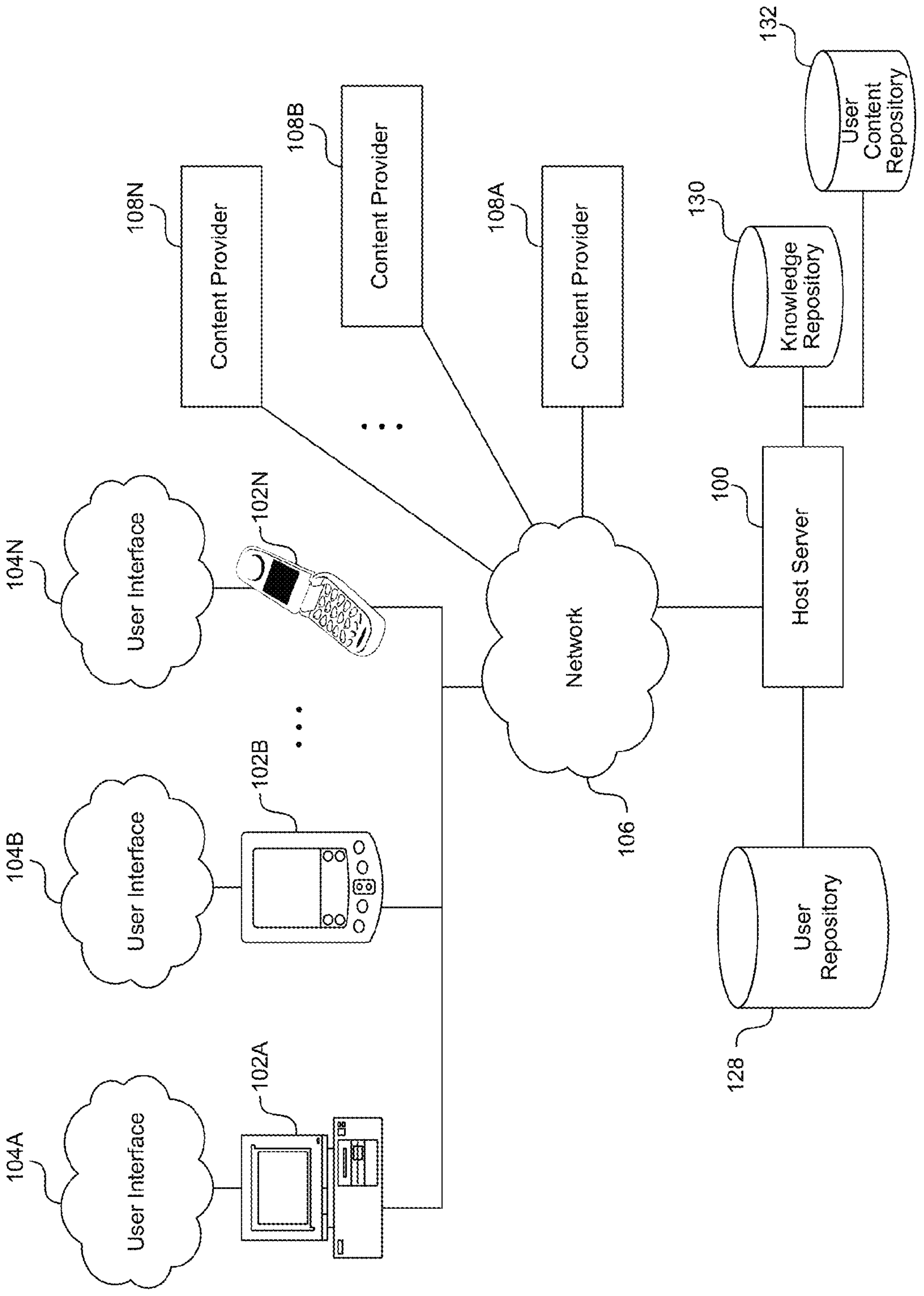
FIG. 1 illustrates an example block diagram of a host server that performs techniques of search and search optimization of content from various content providers to users of client devices through a network.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for performing search and search optimization using a pattern of a location identifier.

The techniques described herein generally relate to the search and the search optimization of electronic content including but not limited to electronic content that is distributed throughout the Internet or World Wide Web. The location identifier of electronic content or a source can be a web address that a web browser uses to locate the content of the source for access by a user via a web browser (e.g., Universal Resource Identifier (URI) or Universal Resource Locator (URL)).

In one example of the techniques described herein as applied to search for online content distributed via the Internet, information derived directly from extracting patterns and words in URLs and/or URIs provide a wealth of semantic information. The semantic information derived from the URLs and/or URIs can be used in searching for content based on semantics and/or for semantically optimizing the search process.

By using URL/URI patterns for online content, the semantic information can be deduced and extracted using relatively lesser computing resources, effort, and time, for example, as compared to solely extracting such semantic information by performing various data mining techniques on the content source. Pattern recognition using URL/URI or other location identifiers allows semantic information of a vast number of content sources to be determined in a relatively short amount of time compared to traditional mechanism. The semantic information thus extracted facilitates and expedites the search process and to generate semantically-valuable search results.

In other words, the patterns extracted from URLs/URIs can be correlated to ontologically defined semantic types and their attributes (e.g., properties). In addition, patterns can be drawn between non-semantically marked up HTML or XHTML content and semantic types/attributes. In addition to using the correlated patterns and the extracted semantic information for enhanced search engine indexing, the patterns (e.g., from URIs/URLs and/or (X)HTML content) can be associated directly to types, properties, and/or attributes defined in one or more ontologies.

For example, metadata (e.g., Resource Description Framework (RDF) triples) can be automatically extracted from XML or XHTML documents (e.g., using GRDDL (Gleaning Resource Descriptions From Dialects of Languages)) to convert (X)HTML or other content to semantic content. This conversion and extraction of semantic data from content can be used for building or enhancement of a search engine.

Note that the processes and techniques herein described are not limited to search and search optimization of web content or other online/shared content but also for search and search optimization of content sources stored locally on one computer/server, on a network of computers, and/or shared over a private network. Location identifiers and patterns thereof that can be used for search optimization, although described generally as including URIs and URLs, are not limited to such. Location identifiers such as file directories, file paths, network locations, and/or any other form of location identifiers for electronic content sources and the patterns thereof are contemplated and are also considered to be within the novel art of the disclosure.

FIG. 1 illustrates an example block diagram of a host server 100 that performs techniques of search and search optimization of content from various content providers 108A-N to users of client devices 102A-N through a network 106.

The client devices 102A-N can be any system and/or device, and/or any combination of devices/systems that is able to establish a connection with another device, a server and/or other systems. Client devices 102A-N each typically include a display and/or other output functionalities to present information and data exchanged between among the devices 102A-N and the host server 100. For example, the client devices 102A-N can be any of, but are not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, and/or an iPhone, etc. In one embodiment, the client devices 102A-N and content providers 108A-N of electronic content are coupled to a network 106. In some embodiments, the devices 102A-N and host server 100 may be directly connected to one another.

In one embodiment, the host server 100 is operable to perform search and/or provide search optimization techniques and related services. The search and search optimization can be performed using patterns of location identifiers (e.g., web addresses, URIs, URLs, file names, directories, network addresses, pathways, etc.) of content sources (e.g., sources of electronic content).

The search optimization performed by the host server 100 can include semantics-enhanced search that identifies and/or further categorizes web pages or other objects as having content of or being related specific semantic types. Further, the host server 100 can further categorize/identify objects as having content or content related to certain attributes of semantic types. In one embodiment, the host server 100 generates user-customized search results using user-defined semantic types.

Figure 3A:
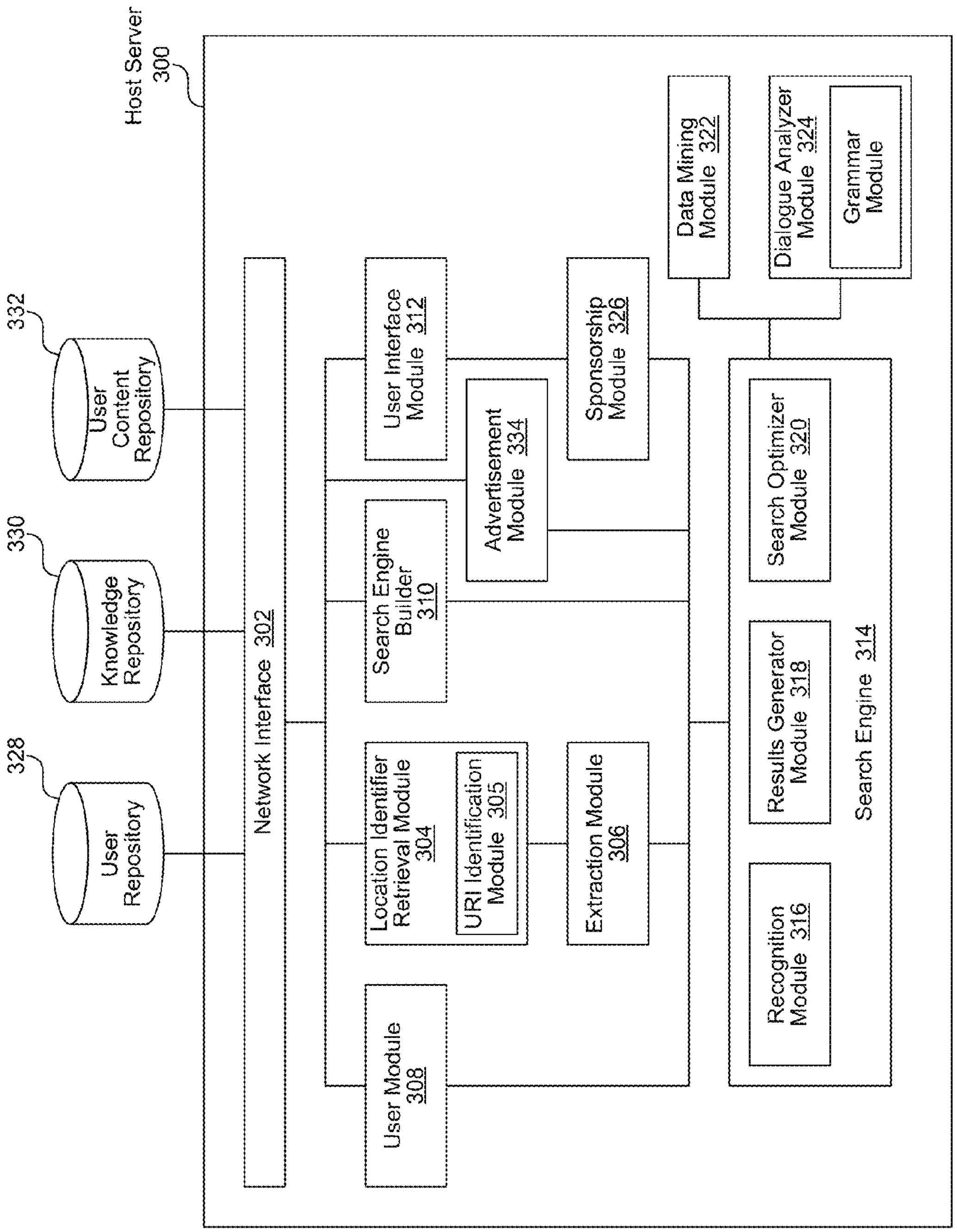
FIG. 3A depicts an example functional block diagram of the host server that performs search and optimizes the search process.
Figure 3B:
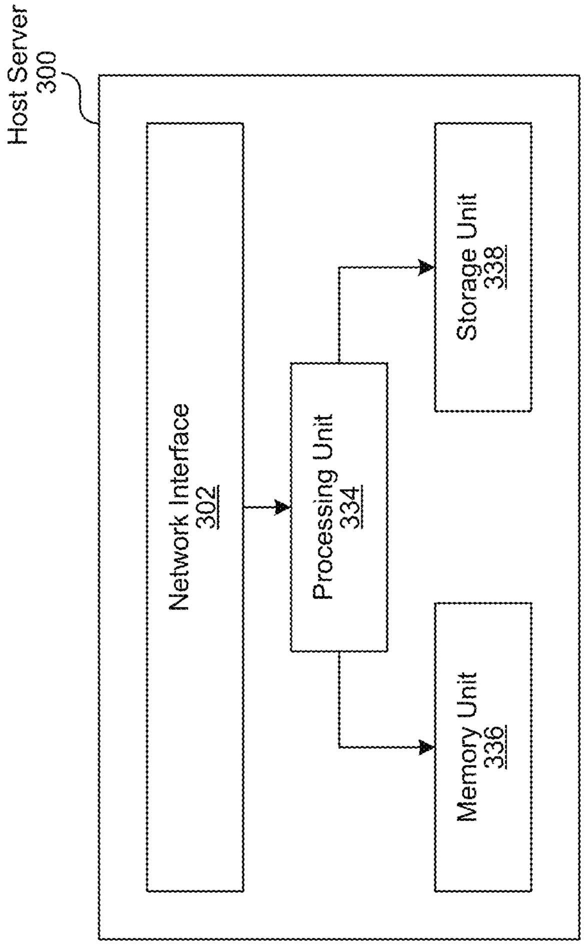
FIG. 3B depicts an example block diagram illustrating the components of the host server that performs search and/or optimized search.

Functions and techniques performed by the host server 100 and the components therein are described in detail with further references to the examples of FIG. 3A-3B.

The client devices 102A-N are generally operable to provide user access (e.g., visible access, audible access) to the search process, the user-customized search process, and the optimized search (e.g., via semantics), for example via user interface 104A-N displayed on the display units. The client devices 102A-N may also be used (e.g., by programmers and developers) for building a semantics-enhanced search engine or by end users to customize their search results, for example.

The network 106, over which the client devices 102A-N and the host server 100 communicate, may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102A-N and the host server 100 and may appear as one or more networks to the serviced systems and devices. In one embodiment, communications to and from the client devices 102A-N can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more wireless networks, such as, but are not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The host server 100 may include internally or be externally coupled to a user repository 128, a knowledge repository 130, and/or a user content repository 132. The repositories can store software, descriptive data, images, system information, drivers, and/or any other data item utilized by other components of the host server 100 and/or any other servers for operation. The repositories may be managed by a database management system (DBMS), for example but not limited to, Oracle, DB2, Microsoft Access, Microsoft SQL Server, PostgreSQL, MySQL, FileMaker, etc.

The repositories can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 100 is able to provide data to be stored in the user repository 128, the knowledge repository 130, and the user content repository 132 and/or can retrieve data stored in the user repository 128, the knowledge repository 130, and/or the user content repository 132. The user repository 128 can store user information, user preferences, user search preferences, sharing preferences, user-defined semantic types, user-specified attributes of semantic types, user-specified patterns for location identifiers, user reviews of electronic content and sources, device information, hardware information, etc.

The knowledge repository 130 can include, by way of example but not limitation, sets of ontologies, taxonomies and/or folksonomies that can be used by the host server 100 for determining the semantic type or attribute type of electronic content provided in online sources to enhance or optimize search. The ontologies and taxonomies may be user-defined and used on a per-user basis for enhancing search. The ontologies and taxonomies may also be provided by another source or centrally defined and applied globally or to users who have not defined their own ontologies. The knowledge repository 130 in some instances, can also include, dictionaries, thesauruses, and/or encyclopedias, etc.

In one embodiment, location identifier patterns and their associated semantic types and/or attributes are stored in the knowledge repository 130.

The user content repository 132 can include, user content including, by way of example but not limitation, user-generated, user-edited, and/or user-provided electronic content (e.g., documents, articles, audio files, video files, text files, images, user dialogue, user chat, etc.). The user content can be aggregated from a host or multiple hosts of online locations where users share information including but not limited to various networking sites (e.g., blogs, forums, social messaging site, social networking site, business networking, knowledge networking, etc.).

Repository 132 can also include user-supplemented content including content and edits, reviews, and/or comments provided by users. The host server 100 can perform search and search optimization not only on web content but also on user-generated, user-provided, and/or user supplemented content contributed through single or multiple content sharing or networking sites.

Figure 2:
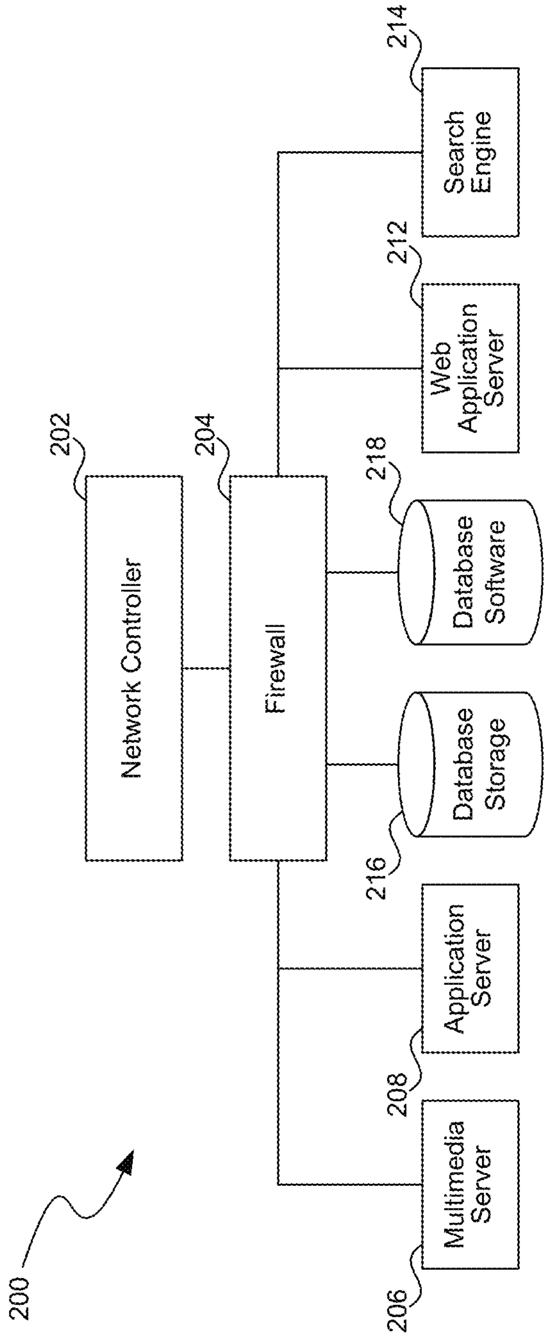
FIG. 2 depicts an example block diagram of the components of a host server that performs techniques of search and search optimization.

FIG. 2 depicts an example block diagram of the components of a host server 200 that performs techniques of search and search optimization.

In the example of FIG. 2, the host server 200 includes a network controller 202, a firewall 204, a multimedia server 206, an application server 208, a web application server 212, a search engine 214, and a database including a database storage 216 and database software 218.

In the example of FIG. 2, the network controller 202 can be a networking device that enables the host server 100 to mediate data in a network with an entity that is external to the host server 100, through any known and/or convenient communications protocol supported by the host and the external entity. The network controller 202 can include one or more of a network adaptor card, a wireless network interface card, a router, an access point, a wireless router, a switch, a multilayer switch, a protocol converter, a gateway, a bridge, a bridge router, a hub, a digital media receiver, and/or a repeater.

The firewall 204, can, in some embodiments, govern and/or manage permission to access/proxy data in a computer network, and track varying levels of trust between different machines and/or applications. The firewall 204 can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall 204 may additionally manage and/or have access to an access control list which details permissions including for example, the access and operation rights of an object by an individual, a machine, and/or an application, and the circumstances under which the permission rights stand.

Other network security functions can be performed or included in the functions of the firewall 204, can be, for example, but are not limited to, intrusion-prevention, intrusion detection, next-generation firewall, personal firewall, etc. without deviating from the novel art of this disclosure. In some embodiments, the functionalities of the network controller 202 and the firewall 204 are partially or wholly combined and the functions of which can be implemented in any combination of software and/or hardware, in part or in whole.

In the example of FIG. 2, the host server 200 includes the multimedia server 206 or a combination of multimedia servers to manage images, photographs, animation, video, audio content, graphical content, documents, and/or other types of multimedia data for use in or to supplement search results or semantics-enhanced search results. The multimedia server 206 is any software suitable for delivering messages to facilitate retrieval/transmission of multimedia data among servers to be provided to other components and/or systems of the host server 200, for example while rendering a web page or other types of objects (e.g., electronic content sources) including multimedia content.

In addition, the multimedia server 206 can facilitate transmission/receipt of streaming data such as streaming images, audio, and/or video. The multimedia server 206 can be configured separately or together with the web application server 212, depending on a desired scalability of the host server 200. Examples of graphics file formats that can be managed by the multimedia server 206 include but are not limited to, ADRG, ADRI, AI, GIF, IMA, GS, JPG, JP2, PNG, PSD, PSP, TIFF, and/or BMP, etc.

The application server 208 can be any combination of software agents and/or hardware modules for providing software applications to end users, external systems and/or devices. For example, the application server 208 provides specialized or generic software applications that provides search or search optimization functionalities which may be semantics-enhanced. The software applications provided by the application server 208 can be automatically uploaded/downloaded on-demand on an as-needed basis or manually at the user's request.

The software applications provided by the application server 208, for example, can allow end users to define semantic types and/or to customize the search experience. The software applications provided by the application server, can, in one embodiment, allow programmers or developers to build semantics-enhanced search engines using pattern recognition of location identifiers (e.g., URLs and/or URIs). The application server 208 can also facilitate interaction and communication with the web application server 212, or with other related applications and/or systems. The application server 208 can in some instances, be wholly or partially functionally integrated with the web application server 212.

The web application server 212 can include any combination of software agents and/or hardware modules for accepting Hypertext Transfer Protocol (HTTP) requests from end users, external systems, and/or external client devices and responding to the request by providing the requestors with web pages, such as HTML documents and objects that can include static and/or dynamic content (e.g., via one or more supported interfaces, such as the Common Gateway Interface (CGI), Simple CGI (SCGI), PHP, JavaServer Pages (JSP), Active Server Pages (ASP), ASP.NET, etc.).

In addition, a secure connection, SSL and/or TLS can be established by the web application server 212. In some embodiments, the web application server 212 renders the user interfaces in the example screenshots of FIG. 12-24. The user interfaces provided by the web application server 212 to client users/end devices provide the user interface screens 104A-104N for example, to be displayed on client devices 102A-102N in the example of FIG. 1.

In one embodiment, the host server 200 includes a search engine 214 for performing search and search optimization, for example, using patterns in location identifiers of objects such as web pages or other types of content. The objects can include electronic content including but not limited to, electronic documents, digital audio, digital video, images, graphical content, interactive content, etc. The search engine 214 can optimize the search process by enhancing relevancy of search results through, for example, semantics. The search engine can also optimize search by expediting the process to optimize the quantity of sources that can be analyzed in a given time period with limited computing power.

The databases 216, 218 can store software, descriptive data, images, system information, drivers, and/or any other data item utilized by other components of the host server 200 for operation. The databases 216, 218 may be managed by a database management system (DBMS), for example but not limited to, Oracle, DB2, Microsoft Access, Microsoft SQL Server, PostgreSQL, MySQL, FileMaker, etc. The databases 216, 218 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In the example of FIG. 2, the host server 200 includes components (e.g., a network controller, a firewall, a storage server, an application server, a web application server, a search engine, and/or a database including a database storage and database software, etc.) coupled to one another and each component is illustrated as being individual and distinct.

However, in some embodiments, some or all of the components, and/or the functions represented by each of the components can be combined in any convenient or known manner. Furthermore, the functions represented by the devices can be implemented individually or in any combination thereof, in hardware components, software agents, or a combination of hardware components and software agents.

FIG. 3A depicts an example functional block diagram of the host server 300 that performs search and optimizes the search process.

The host server 300 includes a network interface 302, a location identifier retrieval module 304, an extraction module 306, a user module 308, a knowledge management module 310, a user interface module 312, and a search engine 314. The search engine 314 includes a recognition module 316, a results generator module 318, and a search optimizer module 320. In one embodiment, the location identifier retrieval module includes a URI identification module 305. The host server 300 may further include a data mining module 322, a dialogue analyzer module 324, a sponsorship module 326, and/or an advertisement module 328.

In one embodiment, the host server 300 is coupled to a user repository 328, a knowledge repository 330, and/or a user content repository 332. The user repository 328, knowledge repository 330, and the user content repository 332 have been described with further reference to the example of FIG. 1.

Additional or less modules can be included without deviating from the novel art of this disclosure. In addition, each module in the example of FIG. 3A can include any number and combination of sub-modules, and systems, implemented with any combination of hardware and/or software modules.

The host server 300, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

In the example of FIG. 3A, the network interface 302 can be a networking device that enables the host server 300 to mediate data in a network with an entity that is external to the host server, through any known and/or convenient communications protocol supported by the host and the external entity. The network interface 302 can include one or more of a network adaptor card, a wireless network interface card, a router, an access point, a wireless router, a switch, a multilayer switch, a protocol converter, a gateway, a bridge, a bridge router, a hub, a digital media receiver, and/or a repeater.

One embodiment of the host server 300 includes a location identifier retrieval module 304. The location identifier retrieval module 304 can be any combination of software agents and/or hardware modules able to detect, identify, and/or retrieve a location identifier of an object having electronic content.

An object can be any electronic object stored, shared, distributed, and/or accessed through or using computing devices including but not limited to electronic documents, articles, audio files, video files, multimedia content, interactive content, emails, a web page, a link, an electronic review, a dialogue, a file, a directory, an online message, etc. The location identifier of the object can be a location identifier in the World Wide Web, a private network, a local network, or local storage on computing element/device including but not limited to a web address (e.g., a URI and/or a URL), file directories, file paths, a network address, a file location, etc.

For a web page, the location identifier retrieval module 304 can identify a location identifier (e.g., URI or URL) of the web page (e.g., by the URI identification module of the location identifier retrieval module 304). In one embodiment, location identifiers of web pages in a domain are identified from the domain's sitemap. In other embodiments, URIs and URLs can be manually identified or seeded from other resources. For example, a web crawler (e.g., a web crawl corpus such as Build Your Own Search Service (BOSS) platform) can be used to filter domains. In addition, a manual crawl of the site can be performed to extract URLs and/or URIs in domains. Other known and/or convenient methods can also be used to extract location identifiers. For other types of objects, the associated types of location identifiers can be identified and retrieved by the location identifier retrieval module 304.

Note that semantic types of content in objects (e.g., web pages) can be partially or fully automatically determined by the system or specified by an end user. For example, semantic type can be automatically determined through topic detection, natural language processing (NLP), speech processing, latent semantics indexing, etc. Semantic types can also be defined by the end user through tagging or annotating the object (e.g., web page) through a user interface in which the object is provided for access.

Note that each semantic type can be associated with one or more attributes that may be user-defined, automatically determined by the system, or a combination of both. Attributes of semantic types may be determined through a predefined ontology or user defined ontology. For example, a semantic type of 'Restaurant' can include the attributes 'Location', 'Price Range', 'Cuisine', etc. Some of these attributes may be system defined and some may be user-specified. Attributes defined by users may be provided to other users for reference and/or for rating, for example, via a user interface.

One embodiment of the host server 300 includes an extraction module 306. The extraction module 306 can be any combination of software agents and/or hardware modules able to extract a pattern from a location identifier of an object.

For example, the extraction module 306 can extract a pattern from the URI of a web page. In one embodiment, the extracted pattern corresponds to the semantic type of the content of the web page and can be used, for example, by the search engine 314 of the host server 300 to identify other objects (e.g., web pages) having content of or related to the same semantic type. The pattern of the location identifier once identified, can be stored in a computer-readable storage medium (e.g., in a computer database stored in hardware storage) for subsequent usage when determining the semantic type of content in an object (e.g., web page, off-line document, chat dialogue, etc.) to enhance the relevancy of search results and/or to identify and generate search results having content of or related to the semantic type.

In one embodiment, the extraction module 306, based on the semantic type of the content in the associated object or web page, automatically parses the location identifier to extract the pattern based on the semantic type. For example, the location identifier may include one or more portions with words that correspond to the semantic type in literal translation (e.g., in meaning) These portions may be defined in the pattern of the location identifier as the semantic type segment. For example, a semantic type of "car reviews" may correspond to a web page having a portion with the term "car" or "car/review". The term "car" or "car/review" may then be automatically identified and used in the pattern for refining existing search results or identifying search results pertaining to "car reviews".

Pattern extraction is typically dynamic depending on the location identifier and the associated semantic type and/or attributes of the content of the object or of the various fields/segments in the pattern. In one embodiment, dynamic pattern extraction is automated using one or more algorithms. For example, each URL can be broken up into fragments (e.g., based on path segments and/or using the query parameters). The fragmented portions can be combined using various permutations. The permutations of the various combinations can then be filtered or selected based on various criteria. For example, the permutations with lesser number of segments that also match the URIs/URLs (location identifiers) of interest can be identified.

In some embodiments, the extraction module 306 extracts the pattern from the location identifier via user input. In some instances, the semantic types are user-specified or user defined and can be redefined or re-configured. Thus, the pattern for the user-specified semantic type can be automatically determined/extracted when the object (webpage) is identified by the user as having content of or related to the user-specified semantic type. Alternatively, the pattern for the user-specified semantic type may also be manually specified or modified by the user.

Note that multiple patterns can be determined for a single semantic type based on identification of multiple webpages as having content of or relating to the semantic type by multiple users. All or a portion of these patterns can be subsequently used for identifying content of or relating to the semantic type. In some embodiments, the multiple patterns defined for a single semantic type can be ranked based on the number of users that have identified the associated content as having content of or relating to the semantic type. The rankings can be used in determining which patterns are subsequently used by default for search or search enhancement or for users who have not defined customized vocabulary of semantic types and/or attributes.

In one embodiment, the pattern corresponding to the semantic type also corresponds to an attribute of the semantic type of the content in the object (web page). For example, the pattern may correspond to the semantic type of 'car models' but also correspond to the attribute 'car reviews' of 'car models'. In general, patterns extracted by the extraction module 306 include a wildcard segment. The pattern may also include a domain name segment, a semantic type segment, and/or an attributes segment. An example of a location identifier pattern is illustrated with further reference to the examples of FIG. 11A-B.

In one embodiment, the extraction module 306 extracts a sub-pattern from the location identifier of the object (web page). The sub-pattern can correspond to attributes or other properties of the semantic type. For example, if the pattern "www.reviews.com/cars/*" (where "*" represents the wildcard segment of the pattern) corresponds to the semantic type of "cars", the sub-pattern of "www.reviews.com/cars/reviews/*" can be extracted by the extraction module 306 to correspond to the attribute of "car reviews" and stored for subsequent use, for example, by the search engine 314 in optimizing or performing search for content related to "car reviews". Multiple sub-patterns, each corresponding to one of multiple attributes of the semantic type can be extracted by the extraction module 306.

One embodiment of the host server 300 further includes a search engine 314. The search engine 314 can be any combination of software agents and/or hardware modules able to search, locate, identify, detect, objects having electronic content that satisfy one or more search criteria contained in a search query.

The search engine 314 can identify a set of search results in response to a search query via keyword search, query expansion, indexing content, meta-search, rankings, vertical search (e.g., domain-specific search), semantic search, or any combination of the above, etc. In one embodiment, the search engine 314 performs search and/or search optimization using patterns identified from location identifiers (URLs or URIs) of objects (web pages) having content with defined semantic types. The pattern-facilitated search method and search optimization technique can be used in lieu of and/or in conjunction with any of the above listed search processes at any stage of the search process.

Note that the search engine 314 can identify search results from web pages or other types of electronic content from various sources. The sources can include objects distributed over the Internet (World Wide Web), objects stored locally, objects shared over a local or private network, etc. The sources can also include user content locally provided or shared by a network of users over networking site or multiple networking sites (e.g., a knowledge networking site, a semantics-enabled knowledge networking site, a social network site, a professional networking site, etc.). The user content that can be searched and analyzed by the search engine 314 and used to identify search results includes user-added content, user-generated content, and/or user supplemented content.

In one embodiment, the search engine 314 detects a set of location identifiers that have a pattern that matches a specified pattern. The specified pattern generally corresponds to a semantic type and can be stored in a computer-readable storage medium in the host server 300 or the knowledge repository 330 and retrieved for use. The search engine 314 can then identify a set of search results as having content related to the semantic type using the specified pattern. The set of search results can include the objects associated with the set of location identifiers having the specified pattern. The location identifier may be a Universal Resource Identifier (URI) or Universal Resource Locator (URL) and the objects may be web pages.

The search engine 314 can use, for example, a URI pattern to locate web pages with generally the same or similar pattern and use these web pages to generate a set of search results without using other search methods. The search engine 314 can also enhance the search relevancy by using URI patterns to categorize search results (e.g., can include search results identified from one or more other search methods such as keyword or indexed content search) as having content of or relating to a particular semantic type associated with a particular URI pattern, for example.

The search engine 314, using a stored pattern on a computer-readable storage medium in the host server 300, performs pattern recognition on multiple location identifiers and detects matching location identifiers having generally a same or similar pattern as the stored pattern. The pattern recognition may be performed by the recognition module 316 in the search engine 314 on location identifiers having same or different domain names from which the stored pattern was extracted.

Pattern recognition may initially be performed on location identifiers having the same domain names to identify a set of type-determined web pages having content of or related to the semantic type. An additional set of matching location identifiers can be detected using the additional location identifiers of a different domain name but having generally the same or similar pattern as the pattern extracted from the location identifier. In addition, the search engine 314 also performs pattern recognition to detect a subset of the matching location identifiers that have generally the same patterns as sub-patterns.

The search engine 314, using the matching location identifiers (from both the same or different domain names), can identify a set of type determined objects (e.g., type-determined web pages) having the matching location identifiers (e.g., URIs or URLs) and can generate a set of search results from the set of type-determined web pages. Note that each of the type-determined objects or web pages will typically have content of or related to the semantic type associated with the stored pattern used in identifying the matching location identifiers.

Furthermore, the search engine 314, using the subset of the matching location identifiers, further identifies a subset of the type-determined web pages having a subset of the matching URIs. Each of the subset of the type-determined objects or web pages includes content of or related to the attribute of the semantic type. In addition, multiple subsets of the type-determined web pages can be identified using multiple sub-patterns. Each of the multiple subsets of the type-determined web pages include content associated with one of the multiple attributes of the semantic type. The type-determined objects and/or web pages or the subsets thereof may be identified by the results generator module 318 in the search engine 314.

The search engine 314 can also use the matching location identifiers to refine an existing set of search results to identify objects having the content of or related to the specific semantic type that corresponds to the stored pattern. For example, the search engine 314 can semantically categorize the existing set of search results and identifying a subset of which as having content related to the semantic type or one or more attributes of a semantic type in which the user is interested. In one embodiment, the semantic categorization is performed by the search optimizer module 320.

One embodiment of the host server 300 further includes a data mining module 322. The data mining module 322 can be any combination of software agents and/or hardware modules able to analyze and extract information from data through text mining, classification, topic detection, entity recognition, speech recognition, natural language processing or statistical natural language processing.

In one embodiment, the data mining module 322 data mines various objects (e.g., objects having electronic content) to determine what the content is or is related to. The objects can be web pages or other types of electronic content including but not limited to, digital music files, video files, electronic documents, multimedia content, etc. The results of the data mining can generally be used for search or in conjunction with other mechanisms of performing search.

In one embodiment, the data mining is used in conjunction with location identifier pattern extraction/matching for search and search optimization. For example, the data mining module 322 can data mine the content (e.g., interactive, textual, graphical, audio, etc.) of a set of type-determined web pages identified via pattern recognition using location identifier patterns. The data mining can be optionally performed to further determine relevancy to the semantic type to refine the search results identified by matching location identifier patterns, if needed.

Using the results of data mining, a refined set of type-determined web pages can be identified from the set of type-determined web pages based on the relevancy to the semantic type determined via the data mining. The refined set of type-determined web pages can be used to generate refined search results. In addition, using the results of data mining performed by the data mining module 322, each of the set of type-determined web pages can be ranked, based on the relevancy.

One embodiment of the host server 300 further includes a dialogue analyzer module 324. The dialogue analyzer module 324 can be any combination of software agents and/or hardware modules able to parse, analyze, process, and extract information from a web-based dialogue.

The web-based dialogue analyzer module 324 can parse web-based dialogues according to a grammar (e.g., a grammar stored in the grammar module). In one embodiment, the grammar is specifically defined for parsing electronic conversations that occur, for example, in a social network via a web browser, online chat application, short-messages, etc. In general, web-based dialogues can include one or more of, online chat, a review, a comment, a status update, and/or a posting.

The electronic conversations or web-dialogues can be parsed, using the grammar, to extract information or knowledge regarding objects referred to in the conversation. For example, knowledge or information regarding video games, DVDs, books, CDs, etc. can be extracted from user reviews or comments on various web sites where these items are posted for discussion or for purchase.

In one embodiment, a web-based dialogue regarding an object (e.g., a webpage) is parsed, for example, using a grammar specifically defined for electronic or online conversations. Based on the parsing performed by the dialogue analyzer module 324, the object or web page can be identified as having content of or related to a semantic type. Based on the parsing, the object or web page may also be identified as having content or related to one or more attributes of the semantic type.

In one embodiment, the search engine 314 can further use the results of the dialogue parsing to semantically categorize the object or web page as having content of or related to an attribute or a semantic type. In one embodiment, the search optimizer module 320 of the search engine 314 performs the semantic categorization based on the results of the dialogue parsing.

One embodiment of the host server 300 includes a user module 304. The user module 304 can be any combination of software agents and/or hardware modules able to receive, manage, process, user search preferences and user-defined semantics (e.g., semantic types and attributes of semantic types) for search and search optimization.

For example, the user module 304 can track different semantic types and/or associated attributes defined by different users (e.g., a first set of semantic types defined by a first user and a second set of semantic types defined by a second user, etc.). By tracking different semantic types/attributes defined by different users, user-customized search results can be optionally provided when content search performed for different users are based on their individually specified semantic types and attributes.

To generate user-customized search results, the search engine 314 can identify different sets of location identifier patterns (e.g., URI patterns) for different users. For example, the search engine 314 can identify a first set of URI patterns that are associated with the first set of semantic types defined by the first user and a second set of URI patterns that are associated with the second set of semantic types defined by the second user. Note that although the host server 300 is able to provide user-customized search results using user customized vocabulary, a default vocabulary can also be used to provide non-customized search when user-customization is not desired or not requested.

The first set of URI patterns can be identified from a first set of URIs of web pages having content specified by the first user as having content of the first set of semantic types and the second set of URI patterns can be identified from a second set of URIs of web pages having content specified by the second user as having content of the second set of semantic types.

For the first user, the search engine 314 can semantically categorize a first set of search results. The first set of search results can be categorized as having content related to one or more of the first set of semantic types that are defined by the first user. For the second user, the search engine 314 can semantically categorize a second set of search results. The second set of search results can be categorized as having content related to one or more of the second set of semantic types that are defined by the second user.

The first set of search results are categorized using the first set of URI patterns and the second set of search results are categorized using the second set of URI patterns. The search results can be categorized by the search optimizer module 320. In addition, the first set of search results are presented as being visually categorized to the first user as having content of or related to the one or more of the first set of semantic types and the second set of search results are presented as being visually categorized to the second user as having content related to the one or more of the second set of semantic types.

Note that the first and second sets of results may be categorized differently in response to the same keyword searches queried by the first and second users. For example, the first user may have defined the attributes “Bordeaux” and “1982 Vintage” of the semantic type “red wine”. The second user may have defined “Burgundy” and “Tempranillo” of the semantic type “red wine”. Therefore, when both users search for “red wine”, the first user may see search results categorized under “Bordeaux” and “1982 Vintage” where the second user may see search results categorized under “Burgundy” and “1995 Vintage”.

Alternatively, the attributes defined by various users are available (e.g., public) to all subsequent users. For example, if the first user defines attributes “Bordeaux” and “1982 Vintage” and the second user defines “Burgundy” and “Tempranillo”, each of the four attribute types may be available to each other or another user that searches for “red wine”. In some embodiments, users can select, from the available attributes, which attributes/properties they wish to search results for.

One embodiment of the host server 300 further includes a search engine builder 310. The search engine builder 310 can be any combination of software agents and/or hardware modules able to define, build, deploy, and/or maintain a search engine that is semantics enhanced.

The search engine builder 310 communicates with the location identifier retrieval module 304 to define a location identifier pattern for identifying objects having content of a semantic type. The location identifier pattern can be stored in a computer database embodied on a computer-readable storage medium. In one embodiment, the location identifier is a Universal Resource Identifier (URI) or Universal Resource Locator (URL) and the objects are web pages.

The search engine builder 310 can subsequently use the location identifier pattern to analyze a sitemap stored on a host server for a particular domain. To identify objects having content of or related to the semantic type, the search engine builder 310 identifies multiple location identifiers of the particular domain in the sitemap that have patterns that match the location identifier pattern defined for the semantic type.

Each of the multiple location identifiers that match the pattern can be indexed as being associated with objects having content of or related to the semantic type. In one embodiment, each of the objects having location identifiers with matching patterns can be indexed as having content of or related to the semantic type. The indexes can optionally be used during searches to locate objects (e.g., web pages) having content of or related to various semantic types without having to perform pattern recognition on location identifiers (e.g. URIs and/or URLs).

The search engine builder 310 can also analyze additional sitemaps or other domains to index the web pages. For example, the search engine builder 310 identifies, from the additional sitemaps, multiple additional location identifiers of the other domains matching the location identifier pattern defined for the semantic type. Each of the additional multiple location identifiers can be indexed as being associated with objects having content of or related to the semantic type.

In one embodiment, the search engine builder 310 defines a supplemental location identifier pattern for identifying objects having content related to an attribute of the semantic type. The search engine builder 310 can identify, from the sitemap, multiple supplemental location identifiers matching the supplemental location identifier pattern defined for the attribute. The sitemap can be the sitemap of the particular domain or other domains. Once the multiple supplemental location identifiers have been identified, the search engine builder 310 can index each of the multiple supplemental location identifiers as being associated with objects having content related to the attribute of the semantic type.

The indexes can be associated with semantic types and attributes and when indexed on objects or other content, can be used by the search engine 314 or other search engines for locating objects or web pages having content of or related to the attribute of the semantic type without performing further analysis.

One embodiment of the host server 300 further includes an advertisement module 334. The advertisement module 334 can be any combination of software agents and/or hardware modules able to identify, refine, select, either semantically and/or based on keywords, advertisements using search results, item detail pages, and/or user feeds (e.g., user interest feeds).

The advertisement module 334 can use the semantic types and/or attributes identified in a set of search results to identify advertisement to provide enhanced ad targeting. In addition, advertisement can be targeted to search results or other types of electronics objects according to semantic constraints including but not limited to semantic types/groups (e.g., drug, hotel, resume, event, laptop, vehicle, etc.) and/or semantic attributes/properties (e.g., cost, hours of operation, genre, vintage, year, horsepower, etc.).

For example, semantic types and/or attributes of search results can be used for filtering the associated advertisements. For example, when a user selects to view search results including content of or related to a particular semantic type (e.g., drug), the advertisements relevant to the semantic type "drug" can be presented to the user.

In addition to filtering advertisement based on semantic type, advertisements can further be filtered based on semantic attributes (e.g., semantic properties or facets) of the semantic type. For example, if the user selects to view search results related to semantic type "drug", the search results can further be filtered by its associated attribute (e.g., price, pediatric or adult, capsule, syrup, AM/PM, etc.). Based on the further refinement according to attributes, advertisements can also be refined. For example, when a user selects the pediatric attribute of the "drug" type, advertisements pertaining to children's medicine can be identified and presented to the user.

In one embodiment, when a user clicks on a selected search result, the user is re-directed to an item detail page (e.g., an ad) rather than to the URL of the selected search result. Each level of refinement (e.g., selection of semantic type, semantic attribute, and item detail page) of search results selected by the user allows the selection and identification of advertisements to also be further refined (e.g., semantically). The enhanced refinement increases the relevancy with what the user is searching for and thus increases the changes that the advertisement will be clicked on.

In general, the advertisements can include third party content, hosted content, and/or a combination of both. The advertisement module 334 can index both types of advertisement content (e.g., hosted or third party) according to semantic types or attributes for use locally or on third-party sites. The information related to the indexing of content and the relationship of the indices with the semantic types/contents can be provided to third-party hosts for a fee. In addition, the ad module 334 can index third-party content (ads) based on semantic content for a fee.

One embodiment of the host server 300 further includes a user interface module 312. The user interface module 312 can be any combination of software agents and/or hardware modules able to generate one or more user interfaces for users to enter a search query to request search and to generate one or more user interfaces to display the search results.

In one embodiment, the user interface module 312 generates an interface (e.g., graphical user interface) for users to submit a search query and to access search (e.g., the example UI of FIG. 17) and/or optimized search. The search accessed via the interface (e.g., GUI of FIG. 17) is generally semantics-enhanced and may be user-customized. For example, the user can login before requesting search such that personalized semantic types and associated attributes (e.g., customized ontology) can be used in performing search and/or optimizing search results.

The search results can be displayed in a user interface and laid out according to the determined semantic type. Different search results having content of or related to different semantic types can be displayed on different pages accessible via a user interface. In one embodiment, the user interface module 312 presents a set of objects (e.g., web pages) of a semantic type on a first page and another set of objects of another semantic type on a second page, both accessible via the search results interface (e.g., examples of the various pages in the user interface of FIG. 18-23). In addition, the user may be able to access web pages having content of or related to attributes of the semantic type via the first page in the user interface.

For example, the user interface module 312 can present links to each of the multiple subsets of the type-determined web pages that are associated with attributes of the semantic type on the first page where the search results having content of or related the semantic type are displayed. Each of the links in the first page in the user interface may be identified by each of the multiple attributes of the semantic type.

Figure 19A:
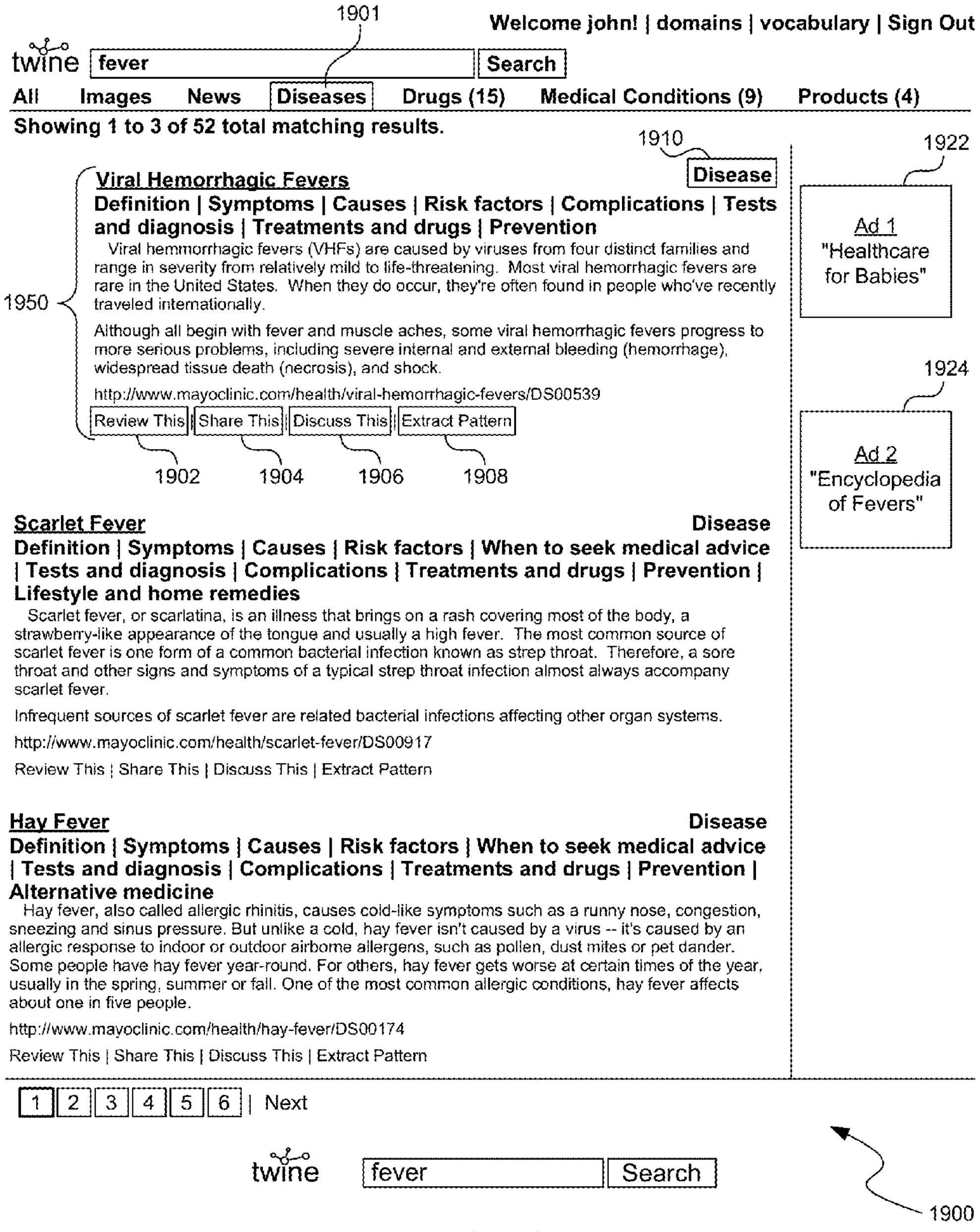
FIG. 19A illustrates a screenshot showing an example list of search results identified responsive to a search query and categorized as having content related to a semantic type.
Figure 19B:
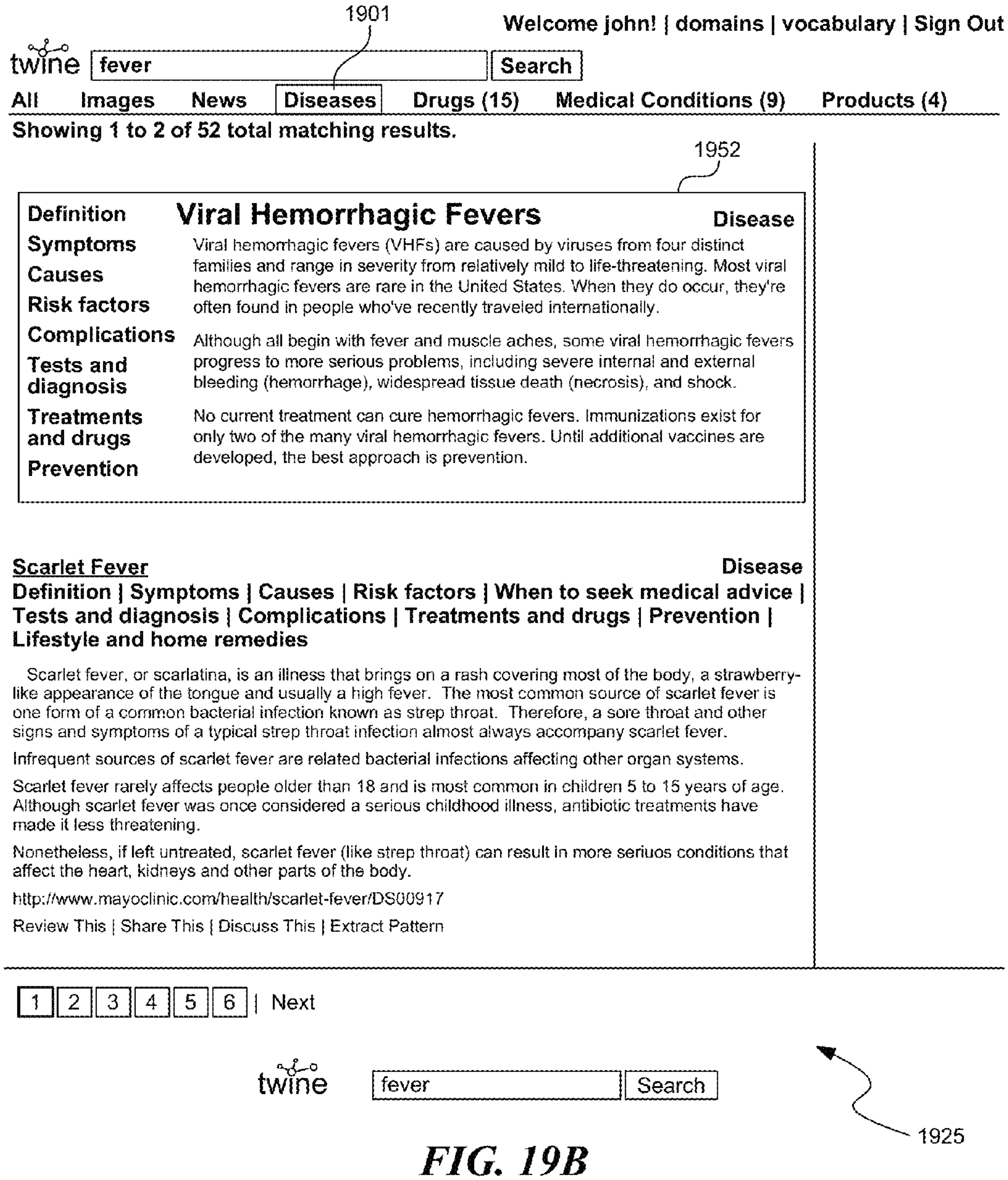
FIG. 19B illustrates a screenshot showing an example of a search result hosted by a sponsored domain and identified as having content related to a semantic type.

In one embodiment, the user interface module 312 generates a template for differentiating search results from web pages hosted by sponsored sites (e.g., the search result 1952 in the example of FIG. 19B). Web pages of search results hosted by sponsored sites may also be prioritized by the user interface module 312, in the list of search results in the user interface. Sponsorships can be managed by the sponsorship module 326 which manages the partnerships with other hosts and any fees associated with the sponsorship.

In one embodiment, the user interface module 312 also provides user interfaces for the search engine builder 310 for managing location identifier patterns and their associated semantics types, for example. For example, through the example user interfaces shown in FIG. 12-13, location identifier patterns and their properties can be viewed and edited as needed. The semantic types associated with the patterns can also be viewed and updated through the user interface. The user interface provided for the search engine builder 310 can also provide statistical information including but not limited to, the number of URIs or URLs having a matching pattern.

The host server 300 represents any one or a portion of the functions described for the modules. More or less functions can be included, in whole or in part, without deviating from the novel art of the disclosure.

FIG. 3B depicts an example block diagram illustrating the components of the host server 300 that performs search and/or optimized search.

In one embodiment, host server 300 includes a network interface 302, a processing unit 334, a memory unit 336, and/or a storage unit 338. Additional or less units or modules may be included. One suitable network interface 302 has been described in the example of FIG. 3A.

One embodiment the host server 300 further includes a processing unit 334. The data received from the network interface 302 can be input to the processing unit 334. The data that is received can include search queries, content from various content sources or a user content repository. The processing unit 334 can include one or more processors, CPUs, microcontrollers, FPGAs, ASICs, DSPs, or any combination of the above. Data that is input to the host server 300 can be processed by the processing unit 334 and output to a display and/or output via a wired or wireless connection to an external device, such as a mobile phone, a portable device, a host or server computer by way of a communications component.

One embodiment of the host server 300 further includes a memory unit 336 and a storage unit 338. The memory unit 335 and a storage unit 338 are, in some embodiments, coupled to the processing unit 334. The memory unit can include volatile and/or non-volatile memory. In performing search and search optimization (e.g., semantics-enhanced search optimization), the processing unit 334 may perform one or more processes related to pattern extraction in a location identifier of a source of content and processes related to pattern recognition in identifying objects (e.g., web pages or other types of electronic source) having content of or related to specific semantic types or attributes based on the specific search query.

In some embodiments, any portion of or all of the functions described of the various example modules in the host server 300 of the example of FIG. 3A can be performed by the processing unit 334. In particular, with reference to the host server illustrated in FIG. 3A, the functions and techniques executed by the location identifier retrieval module, the extraction module, the user module, the search engine, the recognition module, the results generator module, the search optimizer module, the data mining module, the dialogue analyzer module, the user interface module, the advertisement module, and/or the sponsorship module can be performed via any of the combinations of modules in the control subsystem that are not illustrated, including, but not limited to, the processing unit 334 and/or the memory unit 336.

Figure 4:
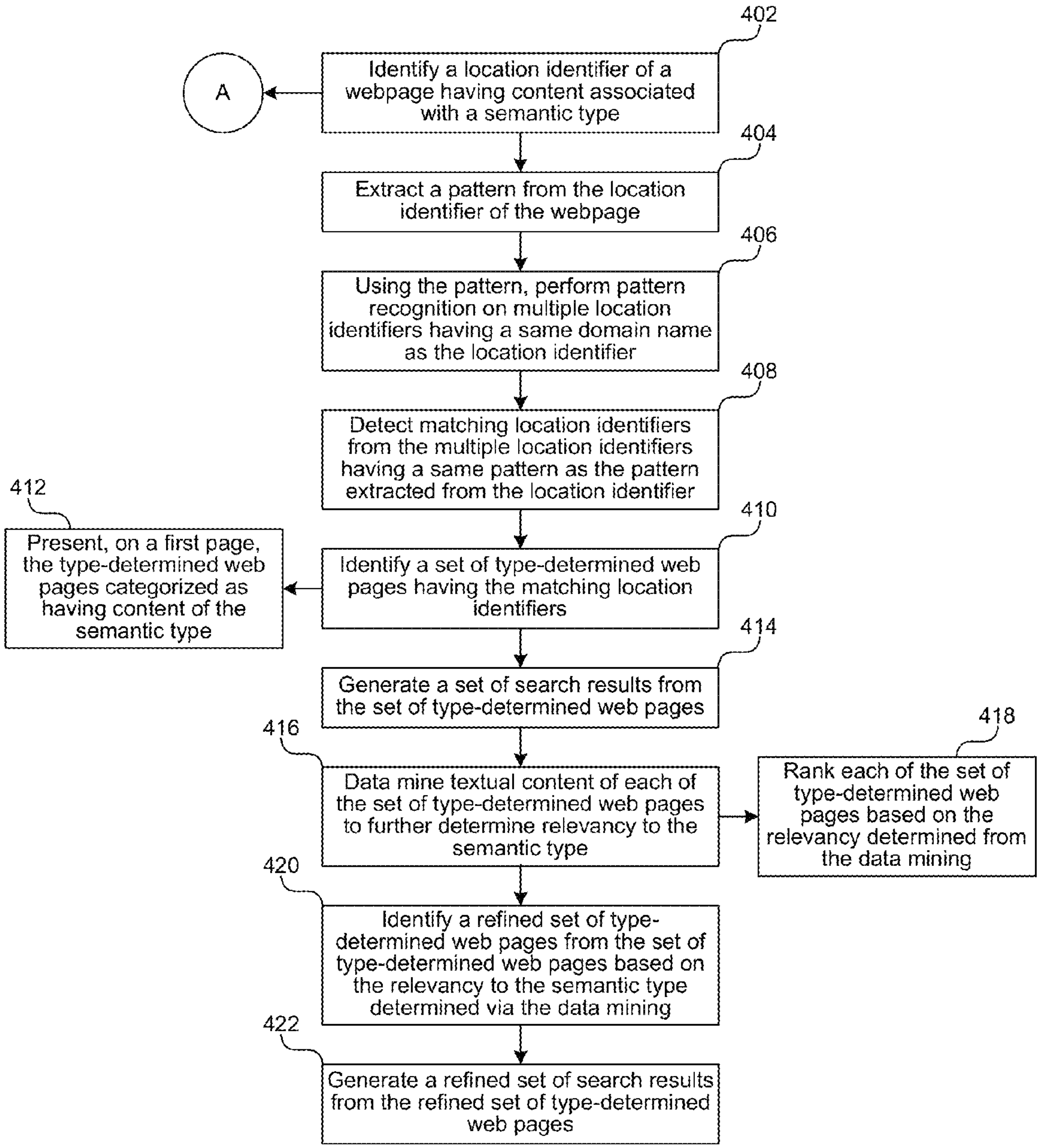
FIG. 4 depicts a flow chart illustrating an example process for optimizing search by identifying web pages having content of or related to a semantic type.

FIG. 4 depicts a flow chart illustrating an example process for optimizing search by identifying web pages having content of or related to a semantic type.

In process 402, a location identifier of a webpage having content associated with a semantic type is identified. The location identifier may be a Universal Resource Identifier (URI) or Universal Resource Locator (URL). In process 404, a pattern is extracted from the location identifier of the webpage and can be stored in a computer database embodied in a computer-readable storage medium. One suitable process for optimizing search by identifying web pages having content associated with one of multiple attributes of the semantic type is described in more detail in the example illustrated in FIG. 5.

In process 406, pattern recognition is performed on multiple location identifiers having a same domain name as the location identifier using the pattern stored on the computer-readable storage medium. The multiple location identifiers may be identified from a sitemap. In process 408, matching location identifiers from the multiple location identifiers are detected as having a same pattern as the pattern extracted from the location identifier.

In process 410, a set of type-determined web pages having the matching location identifiers are identified. In one embodiment, each of the set of type-determined web-pages is associated with an ontology defining the semantic type. In process 412, the set of type-determined web pages are presented on a first page in a user interface as categorized as having the semantic type. Note that another set of type-determined web pages can be presented on a second page of the user interface is categorized as having another semantic type.

In process 414, a set of search results are generated from the set of type-determined web pages. In one embodiment, additional semantic data is extracted from HTML or XHTML content of each of the set of type-determined web pages (e.g., using GRDDL). The additional semantic data can be used generate a refined set of search results from the set of search results using the additional semantic data.

In process 416, textual content of each of the set of type-determined web pages is data mined to further determine relevancy to the semantic type. In process 418, each of the set of type-determined web pages is ranked based on the relevancy determined from the data mining. In process 420, a refined set of type-determined web pages is generated from the set of type-determined web pages based on the relevancy to the semantic type determined via the data mining. In process 422, a refined set of search results is generated from the refined set of type-determined web pages.

Figure 5:
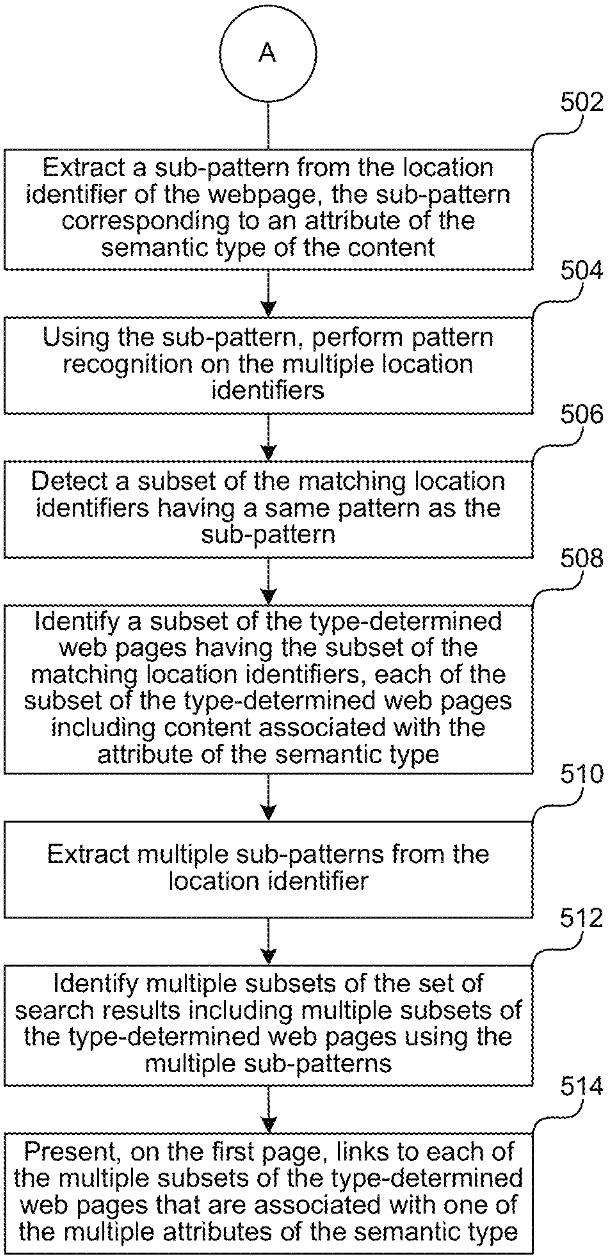
FIG. 5 depicts a flow chart illustrating an example process for optimizing search by identifying web pages having content associated with multiple attributes of the semantic type.

FIG. 5 depicts a flow chart illustrating an example process for optimizing search by identifying web pages having content associated with multiple attributes of the semantic type.

In process 502, a sub-pattern is extracted from the location identifier of the webpage. In one embodiment, the sub-pattern corresponds to an attribute of the semantic type of the content. In process 504, pattern recognition is performed on the multiple location identifiers using the sub-pattern. In process 506, a subset of the matching location identifiers having a same pattern as the sub-pattern are detected. In process 508, a subset of the type-determined web pages having the subset of the matching URIs is identified. In general, each of the subset of the type-determined web pages include content associated with the attribute of the semantic type.

In process 510, multiple sub-patterns are extracted from the location identifier. In process 512, multiple subsets of the set of search results including multiple subsets of the type-determined web pages are identified using the multiple sub-patterns. In process 514, links to each of the multiple subsets of the type-determined web pages that are associated with one of the multiple attributes of the semantic type are presented on the first page in the user interface.

Figure 6:
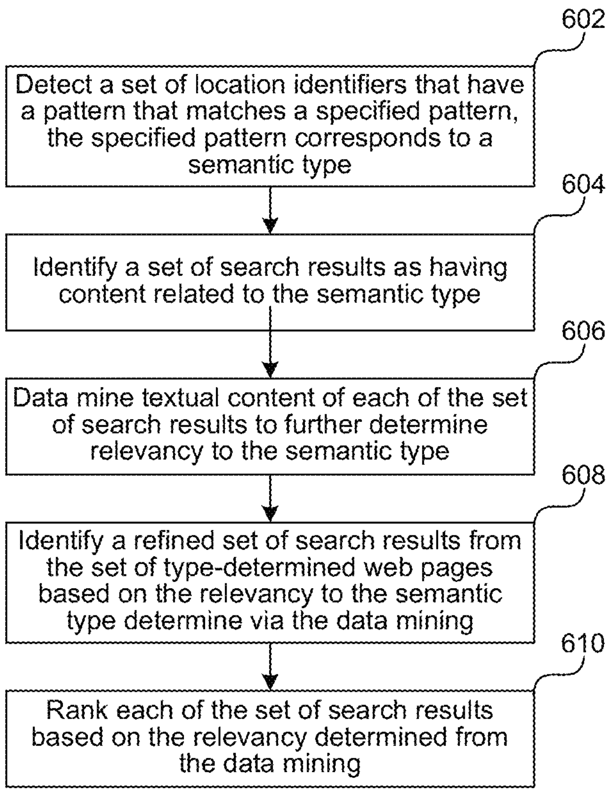
FIG. 6 depicts a flow chart illustrating an example process for search of objects having content of or related to a semantic type using patterns of the location identifiers of the objects.

FIG. 6 depicts a flow chart illustrating an example process for search of objects having content of or related to a semantic type using patterns of the location identifiers of the objects.

In process 602, a set of location identifiers that have a pattern that matches a specified pattern are identified. In general, the specified pattern corresponds to a semantic type. In process 604, set of search results as having content related to the semantic type are identified. The set of search results can include objects associated with the set of location identifiers having the specified pattern. The objects can be linked to an ontology defining the semantic type and/or attributes (e.g., properties) of the semantic type. In one embodiment, the location identifier is a Universal Resource Identifier (URI) or Universal Resource Locator (URL) and the objects are web pages.

In process 606, textual content of each of the set of search results is data mined to further determine relevancy to the semantic type. In process 608, a refined set of search results are identified from the set of type-determined web pages based on the relevancy to the semantic type determine via the data mining. In process 610, each of the set of search results are ranked based on the relevancy determined from the data mining.

Figure 7:
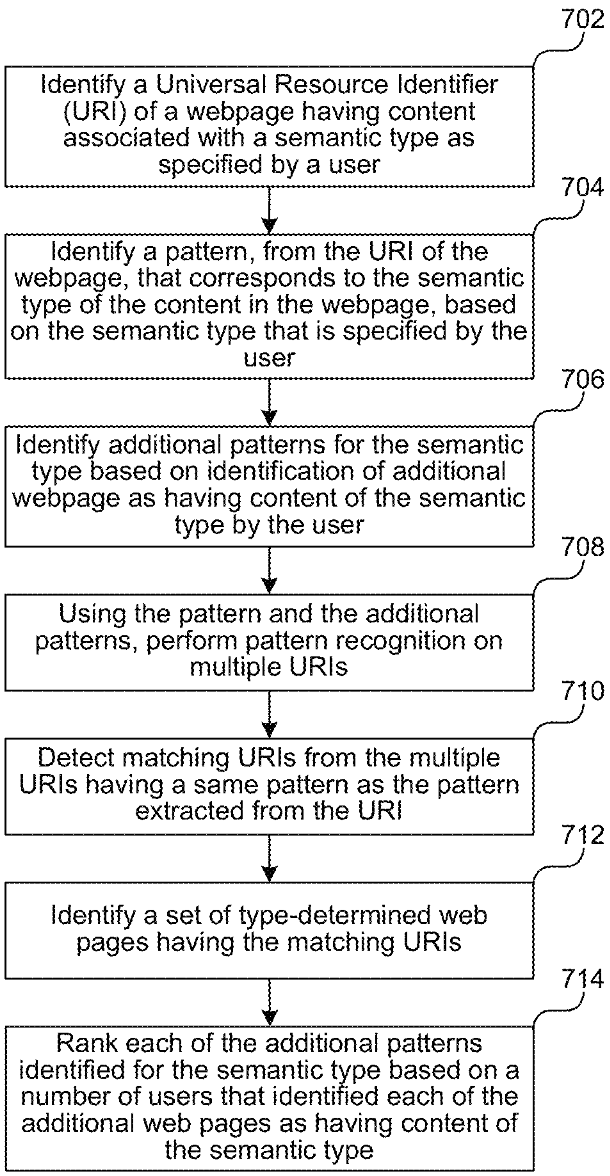
FIG. 7 depicts a flow chart illustrating an example process for optimizing search using semantics.

FIG. 7 depicts a flow chart illustrating an example process for optimizing search using semantics.

In process 702, a Universal Resource Identifier (URI) of a webpage having content associated with a semantic type as specified by a user is identified. The semantic type can be defined by the user through tagging the webpage on a user interface. In process 704, a pattern that corresponds to the semantic type of the content in the webpage is identified from the URI of the webpage, based on the semantic type that is specified by the user.

In process 706, additional patterns for the semantic type are identified based on identification of additional webpage (s) as having content of the semantic type by the user. In one embodiment, each of the additional patterns identified for the semantic type are ranked based on a number of users that identified each of the additional web pages as having content of the semantic type.

In some instances, users can belong to different levels (e.g., topic experts, power users, normal users, guests, etc.). The level differentiation can provide users with different access levels to tagging web pages or other objects with semantic types. The level differentiation can also be used by the system to determine the user-definitions to adopt or modify as the default semantic type for objects. Further, the level differentiation can be used by the system to determine which user-defined/specified tags for objects or web pages are provided to other users for reference and/or to adopt as their own. In general, users who have been specified as topic experts or ranked/reviewed by other users as providing quality definitions are assigned a higher level. For example, their definitions of objects may be provided to other users and may be considered with heavier weight by the system when aggregating various user definitions.

In process 708, the pattern and the additional patterns are used to perform pattern recognition on multiple URIs In process 710, matching URIs having a same pattern as the pattern extracted from the URI are detected from the multiple URIs.

In process 712, a set of type-determined web pages having the matching URIs are identified. In process 714, each of the additional patterns identified for the semantic type is ranked based on a number of users that identified each of the additional web pages as having content of the semantic type.

In one embodiment, the webpage is identified by a second user as having content of a second semantic type that is different from the semantic type. A second pattern that corresponds to the second semantic type of the content in the webpage, can be identified from the URI of the webpage based on the second semantic type that is specified by the second user. The second pattern may be different from or same as the pattern. The second pattern can thus be used for identifying a second set of type-determined web pages having content that is of or related to the second semantic type.

Figure 8:
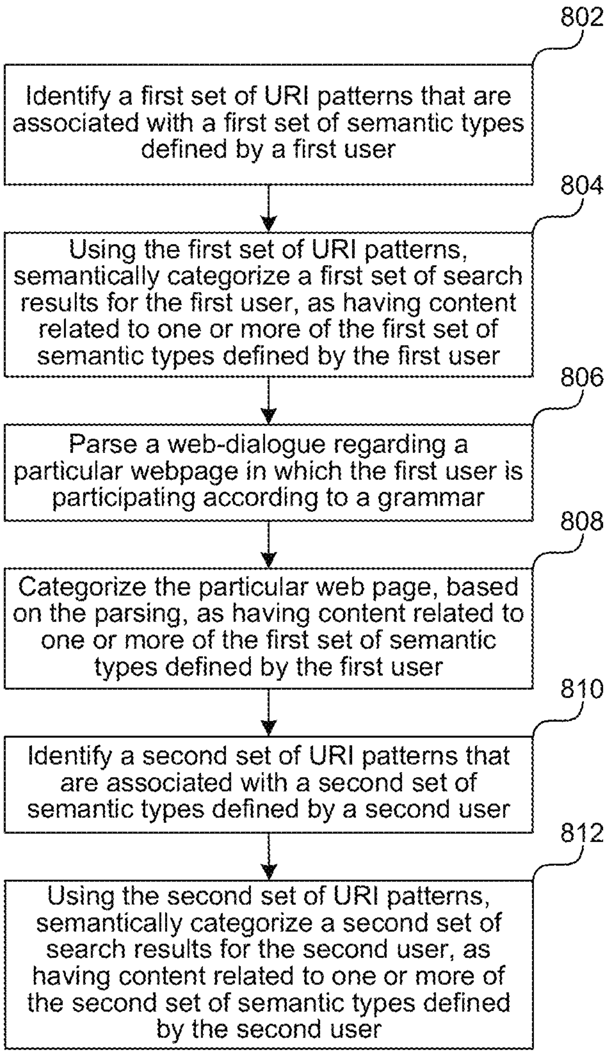
FIG. 8 depicts a flow chart illustrating an example process for generating user-customized search results using user-defined semantic types.

FIG. 8 depicts a flow chart illustrating an example process for generating user-customized search results using user-defined semantic types.

In process 802, a first set of URI patterns that are associated with a first set of semantic types defined by a first user are identified. In one embodiment, the first set of URI patterns are identified from a first set of URIs of web pages having content specified by the first user as having content of the first set of semantic types.

In process 804, using the first set of URI patterns, a first set of search results are semantically categorized for the first user, as having content related to one or more of the first set of semantic types defined by the first user. The first set of search results can be categorized by comparing associated URIs of each of the first set of search results with the first set of URI patterns.

In addition, a first additional set of URI patterns that are associated with a first set of attributes of a semantic type that are defined by the first user are identified. Using the first additional set of URI patterns, the first set of search results can be categorized for the first user, as having content related to one or more of the first set of attributes of the semantic type. In general, the first additional set of URI patterns are identified from a first additional set of URIs of web pages having content specified by the first user as having content related to one or more of the first set of attributes of the semantic type.

In process 806, a web-dialogue regarding a particular webpage in which the first user is participating is parsed according to a grammar. In process 808, the particular web page, is categorized, based on the parsing, as having content related to one or more of the first set of semantic types defined by the first user.

In process 810, a second set of URI patterns that are associated with a second set of semantic types defined by a second user are identified. In one embodiment, second set of URI patterns are identified from a second set of URIs of web pages having content specified by the second user as having content of the second set of semantic types. In process 812, using the second set of URI patterns, a second set of search results are semantically categorized for the second user, as having content related to one or more of the second set of semantic types defined by the second user.

In one embodiment, the first set of search results are identified in response to a keyword search requested by the first user and the second set of search results are identified in response to the keyword search requested by the second user that is a same keyword search as the first user's keyword search. The first set of search results that are presented can be visually categorized to the first user as having content related to the one or more of the first set of semantic types. The second set of search results that are presented can be visually categorized to the second user as having content related to the one or more of the second set of semantic types.

Figure 9:
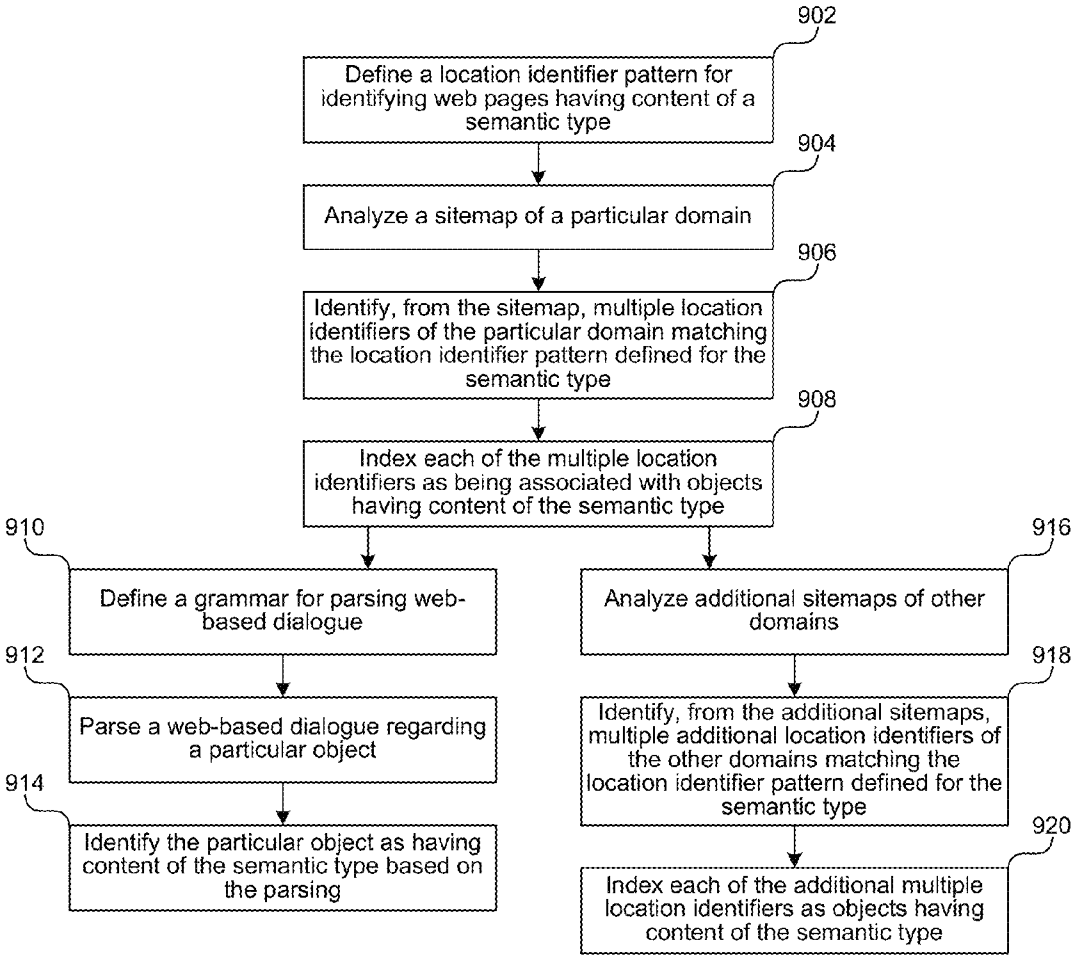
FIG. 9 depicts a flow chart illustrating an example process for building a semantics-enhanced search engine.

FIG. 9 depicts a flow chart illustrating an example process for building a semantics-enhanced search engine.

In process 902, a location identifier pattern for identifying objects having content of a semantic type is defined. The location identifier pattern can be stored in a computer database embodied on a computer-readable storage medium. In process 904, a sitemap stored on a host server for a particular domain is analyzed. In process 906, multiple location identifiers of the particular domain matching the location identifier pattern defined for the semantic type are identified from the sitemap. In process 908, each of the multiple location identifiers is indexed as being associated with objects having content of the semantic type.

In one embodiment, the location identifier is a Universal Resource Identifier (URI) or Universal Resource Locator (URL) and the objects are web pages. The web pages can be associated with an ontology defining the semantic type. In addition, the URL/URI can be associated with the ontology. In one embodiment, the HTML or XHTML content in the web pages are converted to semantic data for use in the semantics-enhanced search engine. The HTML or XHTML content can be converted using the GRDDL (Gleaning Resource Descriptions from Dialects of Languages) markup format.

In process 910, a grammar for parsing web-based dialogue is defined. The grammar can be a general grammar or a domain-specific grammar. In process 912, a web-based dialogue regarding a particular object is parsed according to the grammar. In process 914, the particular object is identified as having content of the semantic type based on the parsing. In one embodiment, a predicate and object of the web-based dialogue are detected using the grammar. RDF triplets may also be generated from the web-based dialogue and can be used with the grammar for conversational search in the semantics-enhanced search engine. In general, a web-based dialogue can include one or more of, a review, a comment, a status update, and/or a posting.

In process 916, additional sitemaps of other domains are analyzed. In process 918, multiple additional location identifiers of the other domains matching the location identifier pattern defined for the semantic type are identified from the additional sitemaps. In process 920, each of the additional multiple location identifiers are indexed as objects having content of the semantic type.

Furthermore, a supplemental location identifier pattern for identifying objects having content related to an attribute of the semantic type is identified. From the sitemap, multiple supplemental location identifiers of the particular domain matching the supplemental location identifier pattern defined for the attribute of the semantic type can be identified. Each of the multiple supplemental location identifiers can then be indexed as being associated with objects having content related to the attribute of the semantic type.

Figure 10:
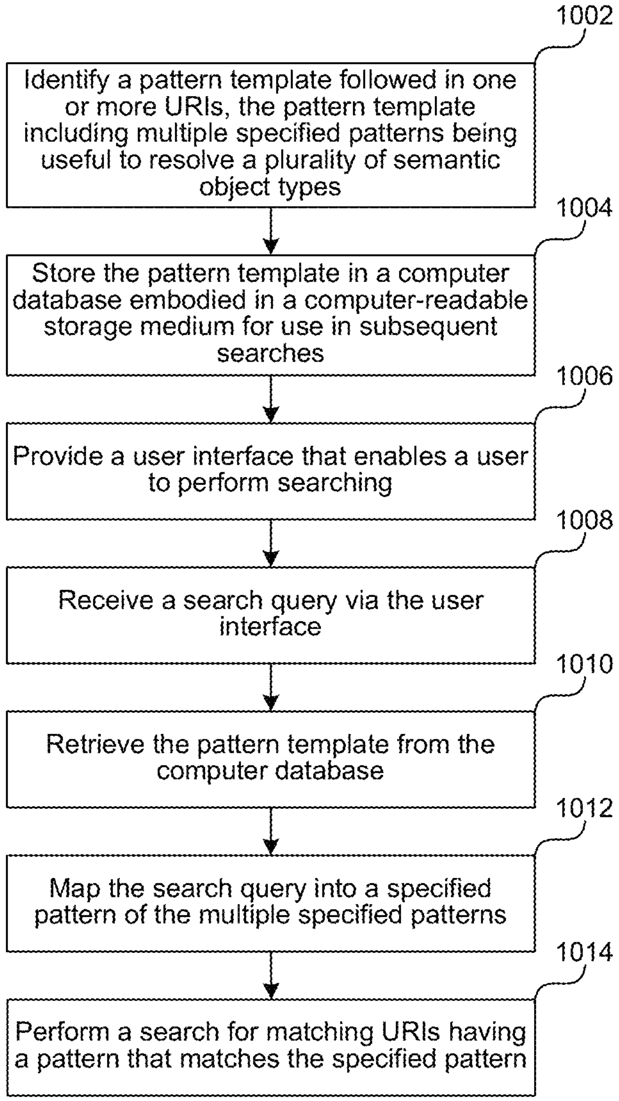
FIG. 10 depicts a flow chart illustrating an example process for performing a search by mapping a search query into a specified pattern in a pattern template.

FIG. 10 depicts a flow chart illustrating an example process for performing a search by mapping a search query into a specified pattern in a pattern template.

In process 1002, a pattern template followed in one or more URIs is identified. The pattern template can include multiple specified patterns which can be used to resolve a plurality of semantic object types. In process 1004, the pattern template is stored in a computer database embodied in a computer-readable storage medium for use in subsequent searches. In process 1006, a user interface that enables a user to perform searching is provided. IN process 1008, a search query is received via the user interface. In process 1010, the pattern template is retrieved from the computer database.

In process 1012, the search query is mapped into a specified pattern of the multiple specified patterns. In process 1014, a search for matching URIs having a pattern that matches the specified pattern is performed. Web pages corresponding to the matching URIs can be presented as search results to the user.

Figure 11A:
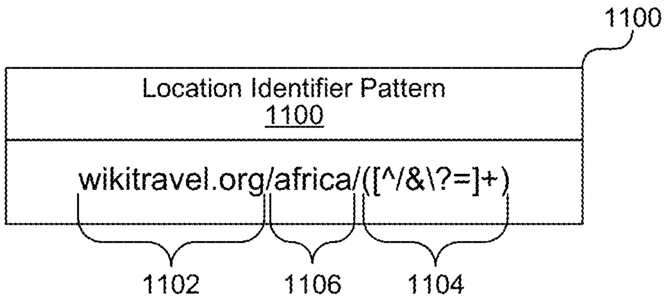
FIG. 11A-B illustrate examples of location identifier patterns.
Figure 11B:
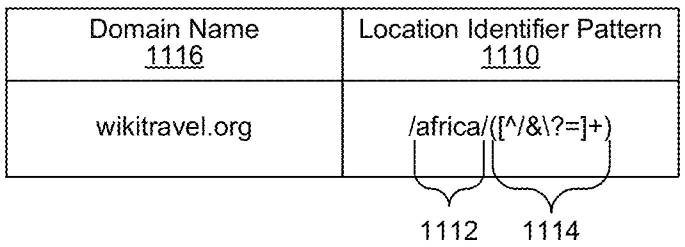

FIG. 11A-B illustrate examples of location identifier patterns.

In the example of FIG. 11A, an example of the location identifier pattern 1100 includes a domain name segment 1102, a semantic type segment 1106, and a wildcard segment 1104. In some embodiments, location identifier patterns can also include an attribute type segment (not shown). The location identifier pattern 1100 can be used for identifying web pages from wikitravel.org having a URL beginning with "wikitravel.org/africa". The wildcard segment 1104 appending the segment 1102 and "/africa" indicates that any webpage having a URL or URI with a beginning matching "wikitravel.org/africa" can be identified as matching the pattern 1100.

In the example of FIG. 11B, the location identifier pattern 1100 does not include the domain name 1112. The location identifier pattern 1110 includes a semantic type segment 1116 and a wildcard segment 1104. The location identifier pattern 1110 can be used for identifying web pages not limited to wikitravel.org but having the word '/africa' in the URI or URL.

Figure 12A:
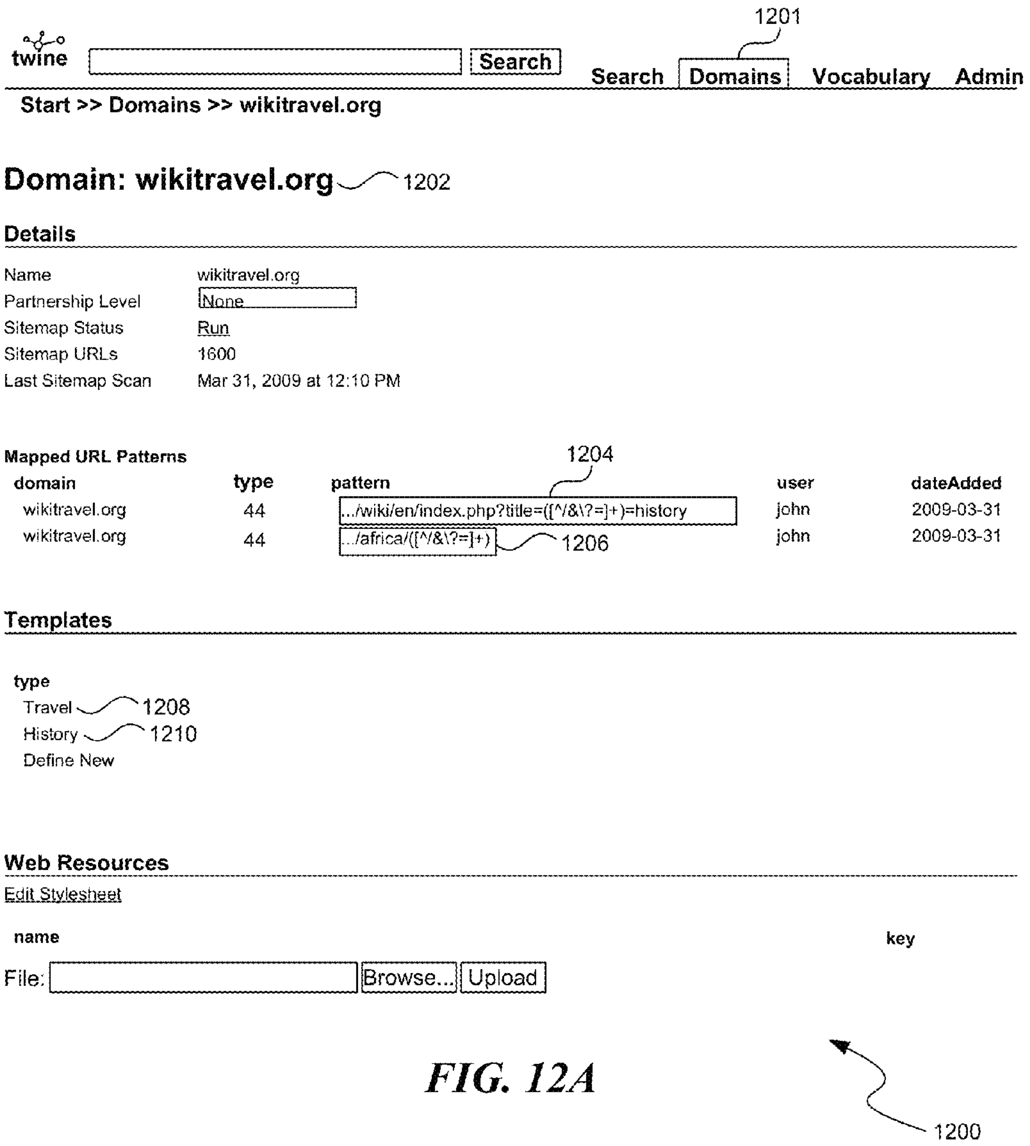
FIG. 12A illustrates an example screenshot showing examples of location identifier patterns and associated semantic types.

FIG. 12A illustrates an example screenshot 1200 showing examples of location identifier patterns and associated semantic types.

The example location identifiers patterns 1204 and 1206 illustrated are extracted from web pages in the domain of wikitravel.org. Each of the location identifier patterns 1204 and 1206 can be associated with a semantic type. For example, the semantic type 1208 "Travel" is associated with the pattern 1206 and the semantic type 1210 "History" is associated with the pattern 1204. The pattern 1204 can thus be used to identify objects or web pages with patterns matching 1204. These identified web pages can be used in search results in response to a query for items of the semantic type "History". Similarly, search results related to the semantic type "Travel" can be identified using the pattern 1206.

The screenshot also shows statistics related to the identified or specified patterns (e.g., pattern 1204 and pattern 1206). For example, the screenshot shows the number of sitemap URLs that match the patterns 1204 and 1206 and when the sitemap was last scanned. Note that although in one embodiment, sitemap scans are used to identify matching URIs or URLs, other methods can be used to obtain a list of URIs and URLs for hosts (e.g., site crawling).

In other embodiments, URIs and URLs can be manually identified or seeded from other resources. For example, a web crawler (e.g., a web crawl corpus such as Build Your Own Search Service (BOSS) platform) can be used to filter domains. In addition, a manual crawl of the site can be performed to extract URLs and/or URIs in domains. Other known and/or convenient methods can also be used to extract location identifiers.

Figure 12B:
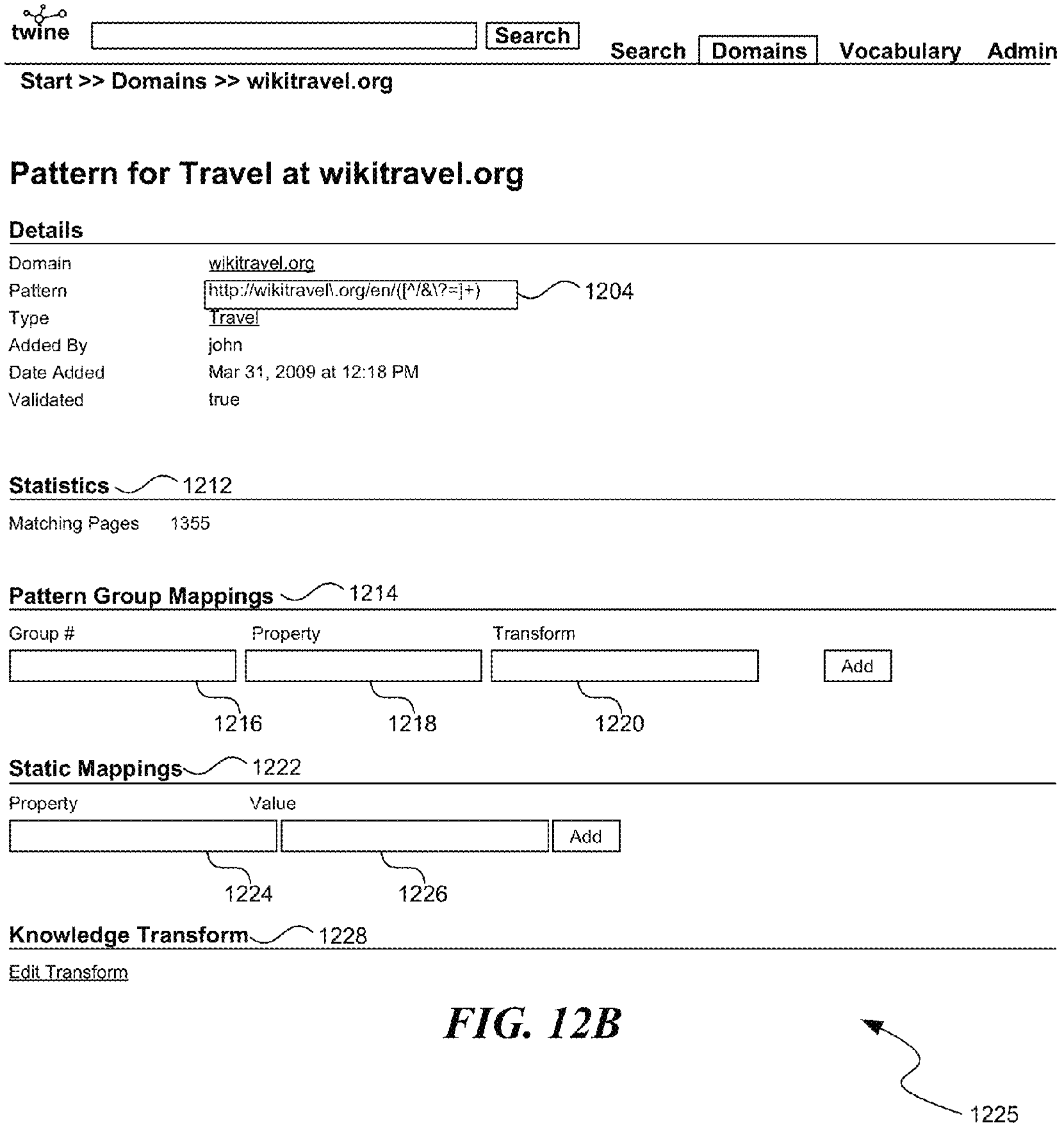
FIG. 12B illustrates an example screenshot of a location identifier and various editable fields.

FIG. 12B illustrates an example screenshot 1225 of a location identifier 1204 and various editable fields.

The editable fields allow various segments or portions of the pattern to be defined. The field "Group #" field 1216 identifies the specified portion of the pattern and the "Property" field 1218 indicates the semantic property of the value in the portion specified by the "Group #". For example, the Group #1 "en" in the pattern 1204 can be defined as having a semantic property of "language" or "English language". The group mappings 1214 are dynamic and generally variable among URIs and URLs.

The "Transform" field 1220 can be used to transform a value in a portion of the pattern to another format (which may be uniform for a particular type of data). For example, a date may be represented as 20090406 or 04062009 or 040609, etc. So a transform of "date ('yyyyMMdd')" would allow the system to properly parse it. In one embodiment, the value is transformed using Resource Description Framework (RDF) data model or other metadata data models suitable for modeling information in web resources. The transformation can be performed using GRDDL (Gleaning Resource Descriptions from Dialects of Languages) to enable RDF triples to be extracted from XML or (X)HTML documents.

The transformed value which can be a uniform or predetermined format allows for indexing based on semantic facets for search enhancement for example, by indexing the semantic content. The transformed value is generally machine-readable to enable semantic-indexing according to semantic facets which are generally user readable. Therefore, the transformation can also enable human users to make queries according to these semantic facets.

The static mapping field 1222 allows values or types to be assigned to various properties of location identifiers or objects associated with the location identifiers matching a particular pattern (e.g., pattern 1204). For example, a "Property" field 1224 can be assigned "topic" and the "Value" field 1226 can be assigned "Travel" (e.g., topic=travel for each web page having a URL with a matching pattern). Note that multiple properties can be defined for any given web page having the matching pattern.

The "knowledge transform" field 1228 allows an XSL document to be created. The XSL document can be used to detect values (e.g., values having semantic property) from the HTML of any URL with a matching pattern. In this example, the transform would be applied against the matching travel review articles at wikitravel.org. The transform can identify the values (e.g., values having semantic properties) from the HTML source file of the web page that are not in the pattern of its associated URL or URI. In this manner, additional semantic information about the web page identified using pattern recognition can be extracted.

Figure 12C:
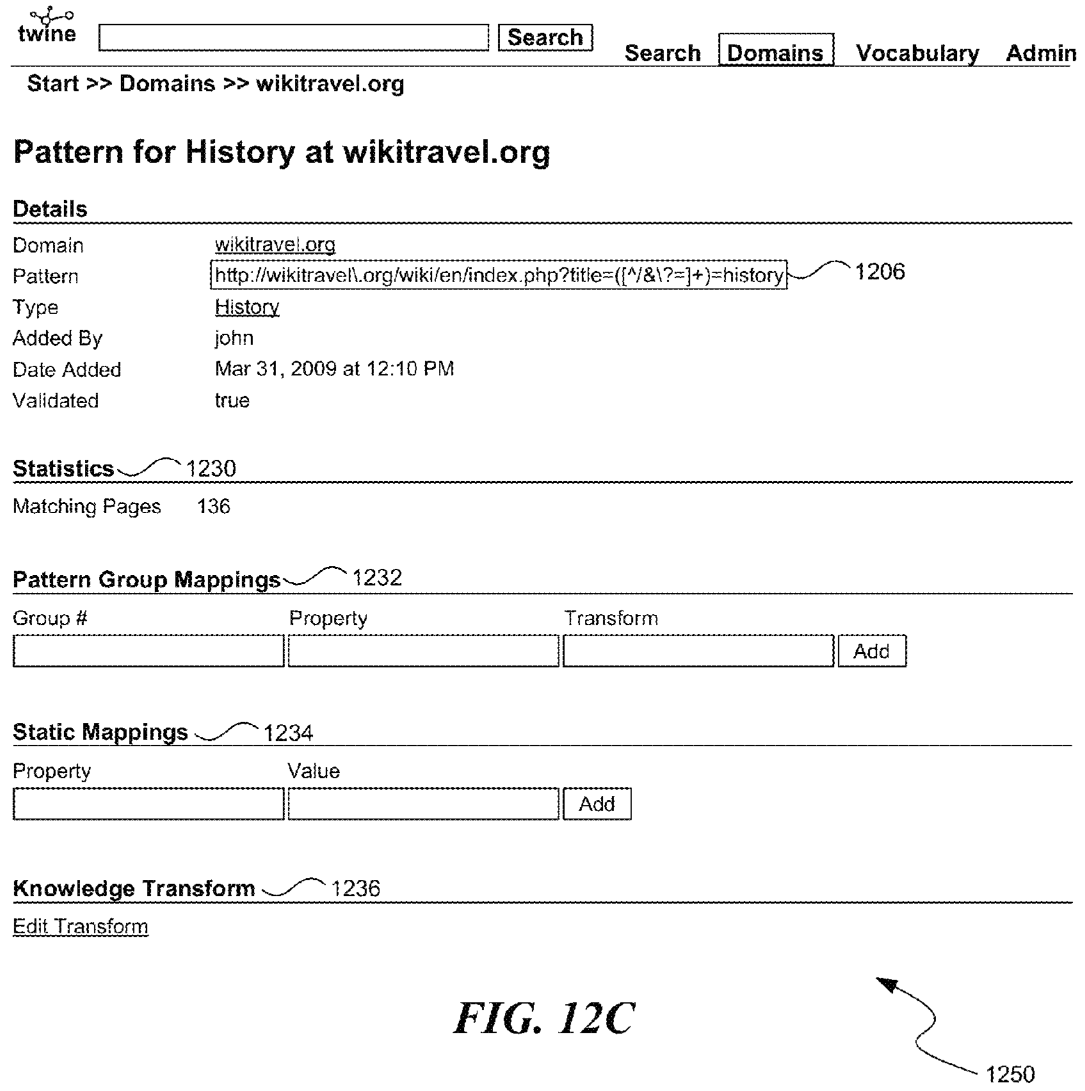
FIG. 12C illustrates an example screenshot of another location identifier and various editable fields.

FIG. 12C illustrates another example screenshot 1250 of another location identifier 1206 and various editable fields. The various editable fields can similarly be used for pattern group mappings and static mappings.

Figure 13A:
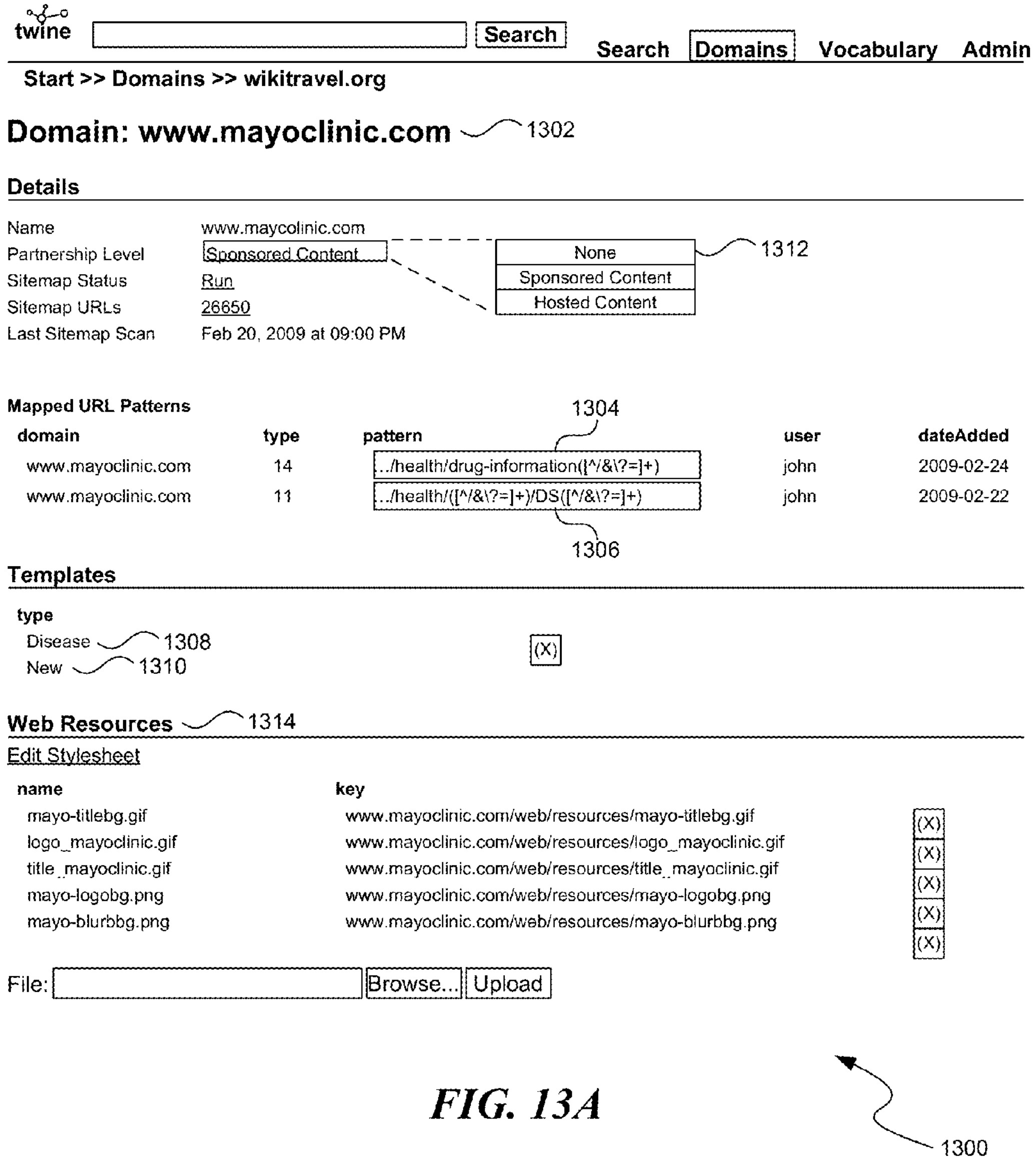
FIG. 13A illustrates another example screenshot showing examples of location identifier patterns and an associated semantic type for the domain.

FIG. 13A illustrates another example screenshot 1300 showing examples of location identifier patterns 1304 and 1306 and an associated semantic type 1308 for the domain 1302.

The screenshot 1300 is illustrated as an example for the domain 1302. The partnership level for the host of the domain 1302 can also be specified. In general, three partnership levels are available to various hosts (e.g., none, sponsored, or hosted).

Hosted content can be used to indicate that content is locally hosted as opposed to remotely indexed content. For example, the hosted content can be locally hosted by the search engine (e.g., a knowledge networking site hosted by the search engine). Hosted content can be assigned higher rankings or priorities when as a search result in a list of search results.

When the partnership level of a host site is "sponsored", the web pages from the host site can be displayed with priority in a user interface containing search results. In addition, web pages from a sponsored host site can be displayed with additional graphics or differentiating template (e.g., search result 1952 in the example of FIG. 19B). For example, the template for sponsoring sites can be defined under the web resources portion 1314. The template can include additional graphics, differentiating font, interactive features, audio, etc.

Figure 14A:
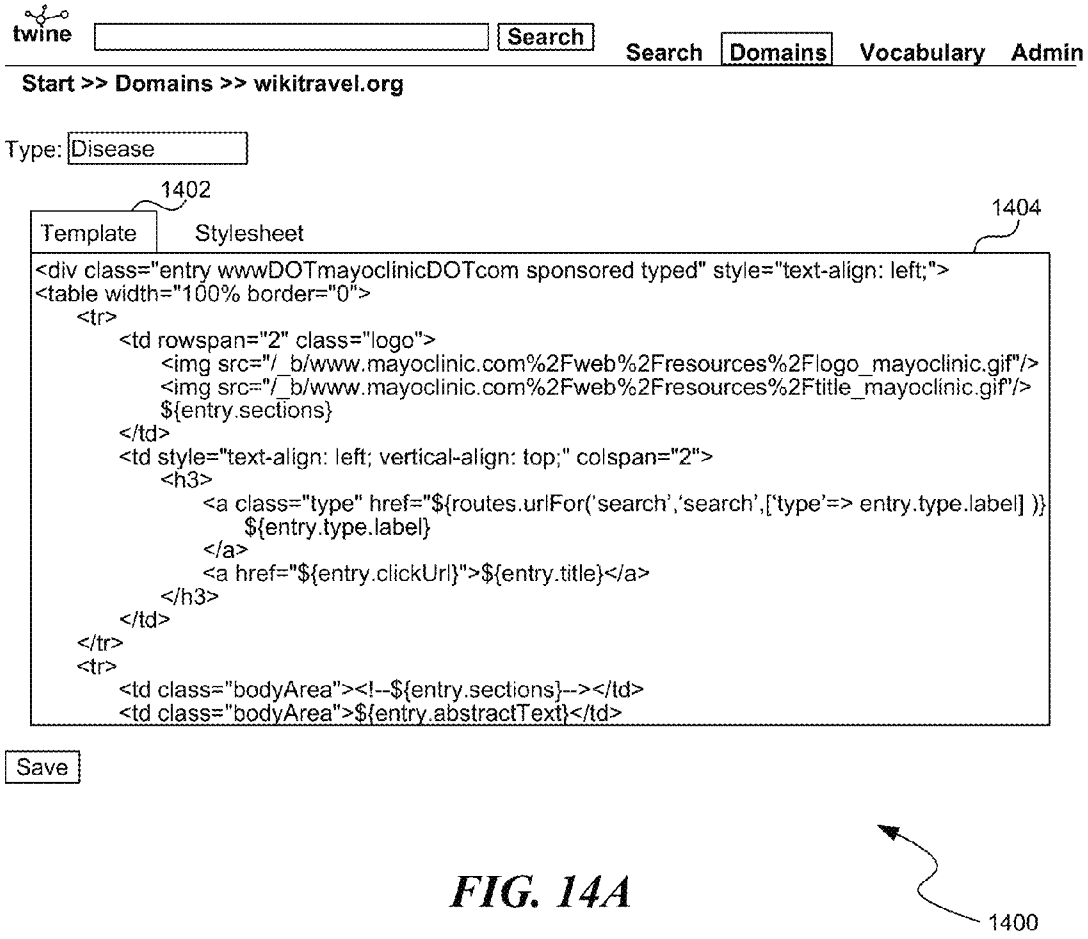
FIG. 14A illustrates an example template for specifying how a search result having content from a specific domain of a particular semantic type is displayed.
Figure 14B:
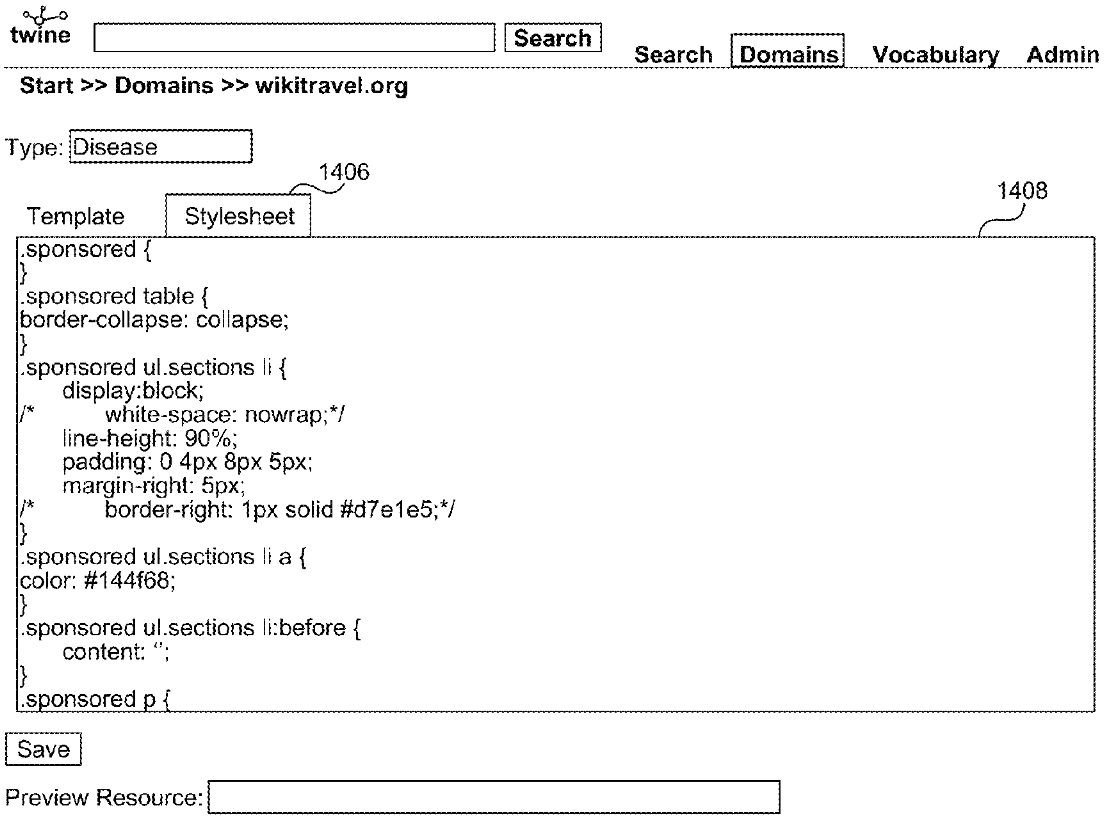
FIG. 14B illustrates an example stylesheet for specifying how a search result having content from a specific domain of a particular semantic type is displayed.

An example of a template for specifying how a search result having content from a specific domain of a particular semantic type can be displayed in a user interface is depicted FIG. 14A. The template is generally the HTML markup for a sponsored site. An example of a stylesheet for specifying how a search result having content from a specific domain of a particular semantic type is depicted in FIG. 14B. The stylesheet can include the corresponding CSS markup for stylizing the sponsored site.

In this example, the associated semantic type 1308 "Disease" is specified for both patterns 1304 and 1306. In other words, web pages located using patterns 1304 and 1306 can be identified as having content of or related to the semantic type 1308 "Disease". Note that additional semantic types can be defined by selecting the "New" tab 1310.

Figure 13B:
FIG. 13B illustrates an example screenshot of a location identifier and various editable fields.
Figure 13C:
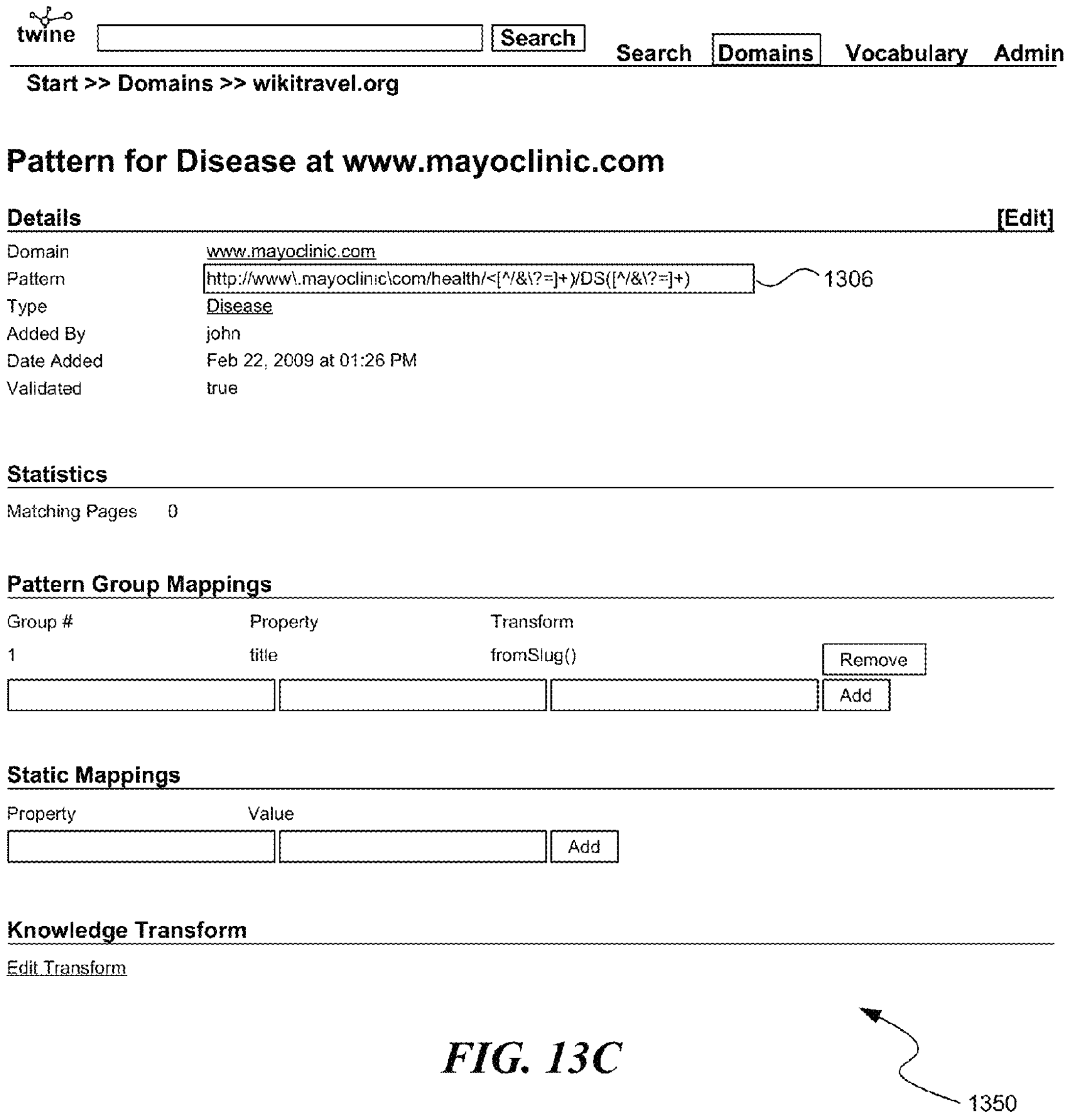
FIG. 13C illustrates another example screenshot of a location identifier and various editable fields.

FIG. 13B illustrates an example screenshot 1325 of location identifier 1304 and various editable fields. FIG. 13C illustrates another example screenshot 1350 of a location identifier 1306 and various editable fields.

Figure 15:
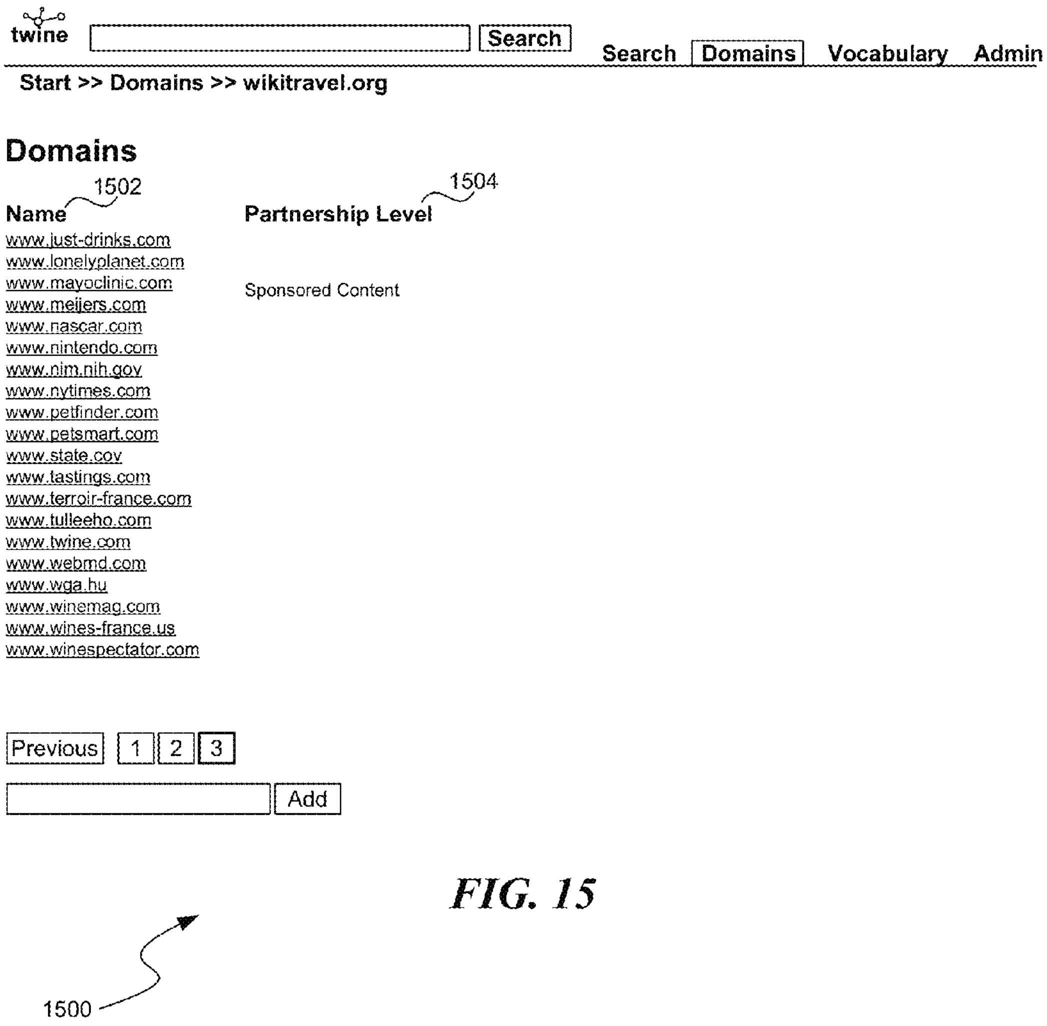
FIG. 15 illustrates an example list of domains for which location identifier patterns have been extracted.

FIG. 15 illustrates an example list of domains 1502 for which location identifier patterns have been extracted.

The list of domains 1502 can be revised or added to. Each of the listed domains 1502 can have patterns defined for various semantic types. The defined patterns can be stored for each domain and the corresponding sitemaps can be scanned automatically or upon manual request to identify, from each domain, the URLs or URIs that match the defined patterns. Note that the defined patterns can be specific to a particular domain or can be used across different domains.

The list of domain names 1502 may also be associated with a list 1504 identifying the partnership level of each domain in the list 1502. For example, certain domains may be sponsors and identified as such under list 1504.

Figure 16A:
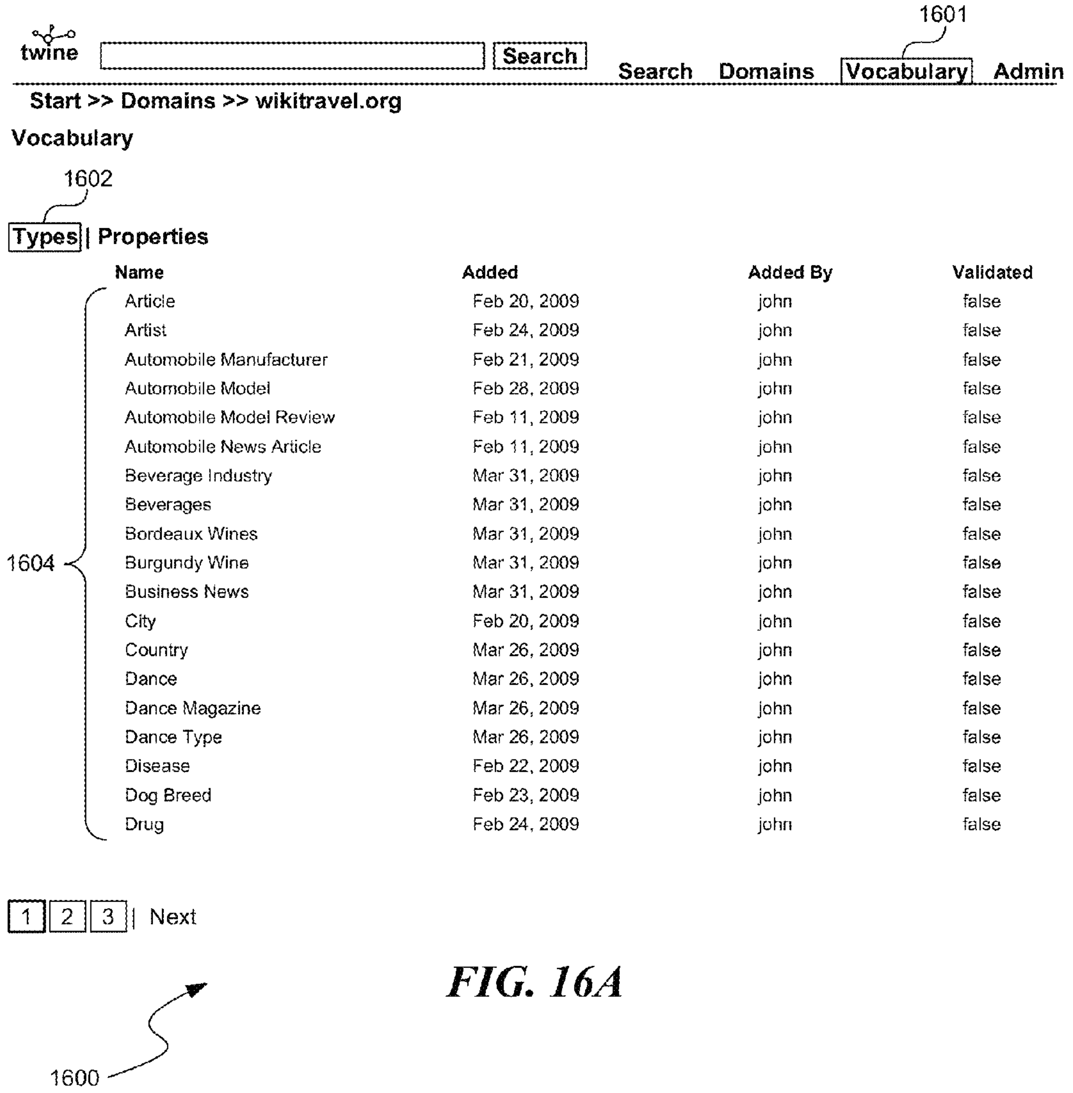
FIG. 16A illustrates an example list of vocabulary showing semantic types that have been defined.

FIG. 16A illustrates an example list of vocabulary 1602 showing semantic types 1604 that have been defined. FIG. 16B illustrates an example list of vocabulary properties 1606 showing a list of attributes 1608 of the semantic types that have been defined.

Figure 17:
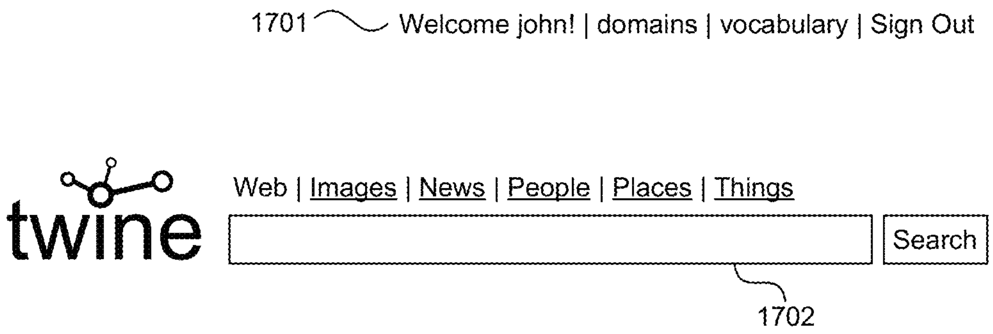
FIG. 17 illustrates an example screenshot of a user interface of a search engine that executes search and/or optimizes search by performing pattern recognition using location identifier patterns.

FIG. 17 illustrates an example screenshot of a user interface of a search engine that executes search and/or optimizes search by performing pattern recognition using location identifier patterns.

The user interface includes a search field 1702 where search queries can be entered by a user. The search query may be used to initiate a keyword-based search, a semantics search, or a combination thereof. The search can trigger identification of web pages or other objects using the disclosed pattern recognition method along or in conjunction with other search mechanisms.

In one embodiment, user-customized search can be accessed by logging in as an identified user 1701. Once logged in, any user-defined semantic types and/or semantic type attributes can be used by the search engine in performing search or search optimization. For example, search results can be categorized on a user-by-user basis according to their defined semantic types and/or semantic type attributes.

Figure 18:
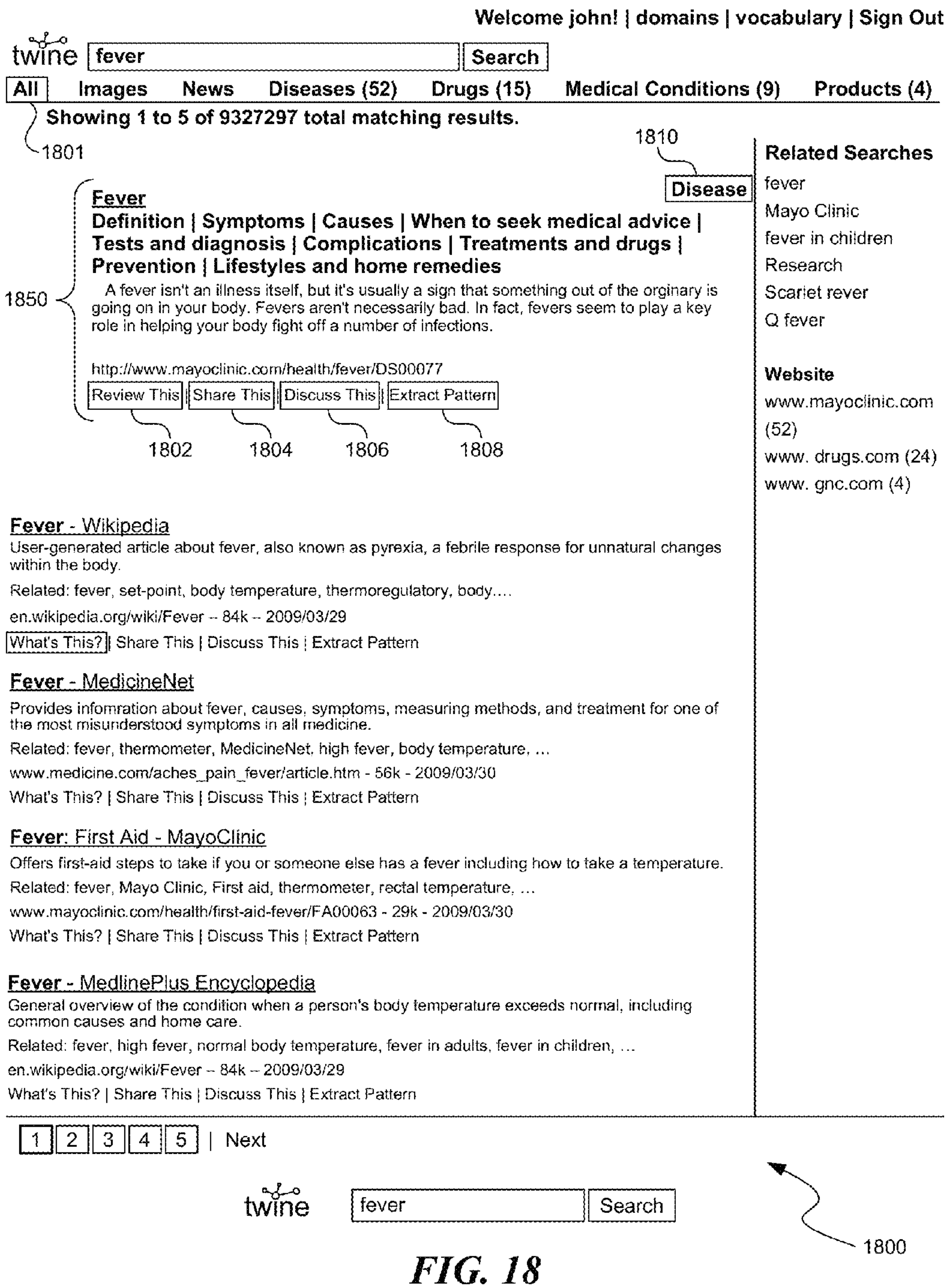
FIG. 18 illustrates a screenshot showing an example list of search results identified using keyword search without further semantic-categorization.

FIG. 18 illustrates a screenshot 1800 showing an example list of search results identified using keyword search without further semantic-categorization.

The example list of search results is shown when the 'all' tab 1801 is selected. This example list includes results identified in response to a search query 'fever'. The search result entry 1850 is identified, based on the pattern of the associated identifier, as having content related to the semantic type "disease". The search result entry 1850 can be labeled as corresponding to the semantic type "Disease" 1810 in the user interface showing the search results.

In the user interface displaying search results, each or some of the search result entries can be associated with various tabs (e.g., "Review this" 1802, "Share this" 1804, "Discuss this" 1806, "Extract pattern" 1808). The user can review the result using tab 1802. Tab 1804 can be used by the user to share the entry with other users or to post the associated web page or other object on another website, for example. Tab 1806 can be used to initiate or participate in a discussion regarding the entry 1850.

Tab 1808 "Extract pattern" can be used by the user to extract the pattern of the associated location identifier (e.g., the URI or URL of a web page). Upon selection of tab 1808, the pattern can be automatically extracted by the system and stored in memory. The pattern, after extraction by the system, can also be edited by the user. In addition, the user can define the semantic type associated with the pattern. In one embodiment, the tab "What's this" can be selected by the user to specify the semantic type that is associated with content of the search result.

FIG. 19A illustrates a screenshot 1900 showing an example list of search results identified responsive to a search query and categorized as having content related to a semantic type 1901.

When tab 1901 "Diseases" is selected, the search results shown in the example of FIG. 18 having content or related to the semantic type "Diseases" are shown and categorized as such. The entry 1950 can be labeled in the user interface as having a semantic type of "Disease" 1910. In addition, a user can review the entry using tab 1902, share the entry using tab 1904, discuss the entry using tab 1906, and/or extract the pattern from the location identifier of the web page using tab 1908.

In one embodiment, when the semantic type "Diseases" are selected by the user, advertisements relevant to the selected semantic type can also be identified. For example, Ad 1 1922 for a book/magazine titled "Healthcare for Babies" can be presented to the user. In addition, Ad 2 1924 for an encyclopedia entitled "Encyclopedia of Fevers" can be identified and selected for presentation to the user.

FIG. 19B illustrates a screenshot 1925 showing an example of a search result 1952 hosted by a sponsored domain and identified as having content related to a semantic type.

The search result 1952 hosted by the sponsored domain can be displayed in the user interface as having an enhanced or otherwise differentiating template (e.g., enlarged font size, additional graphics or colors, etc.). In addition, search results from sponsored domains may be placed before other search results in the list of search results.

Figure 20:
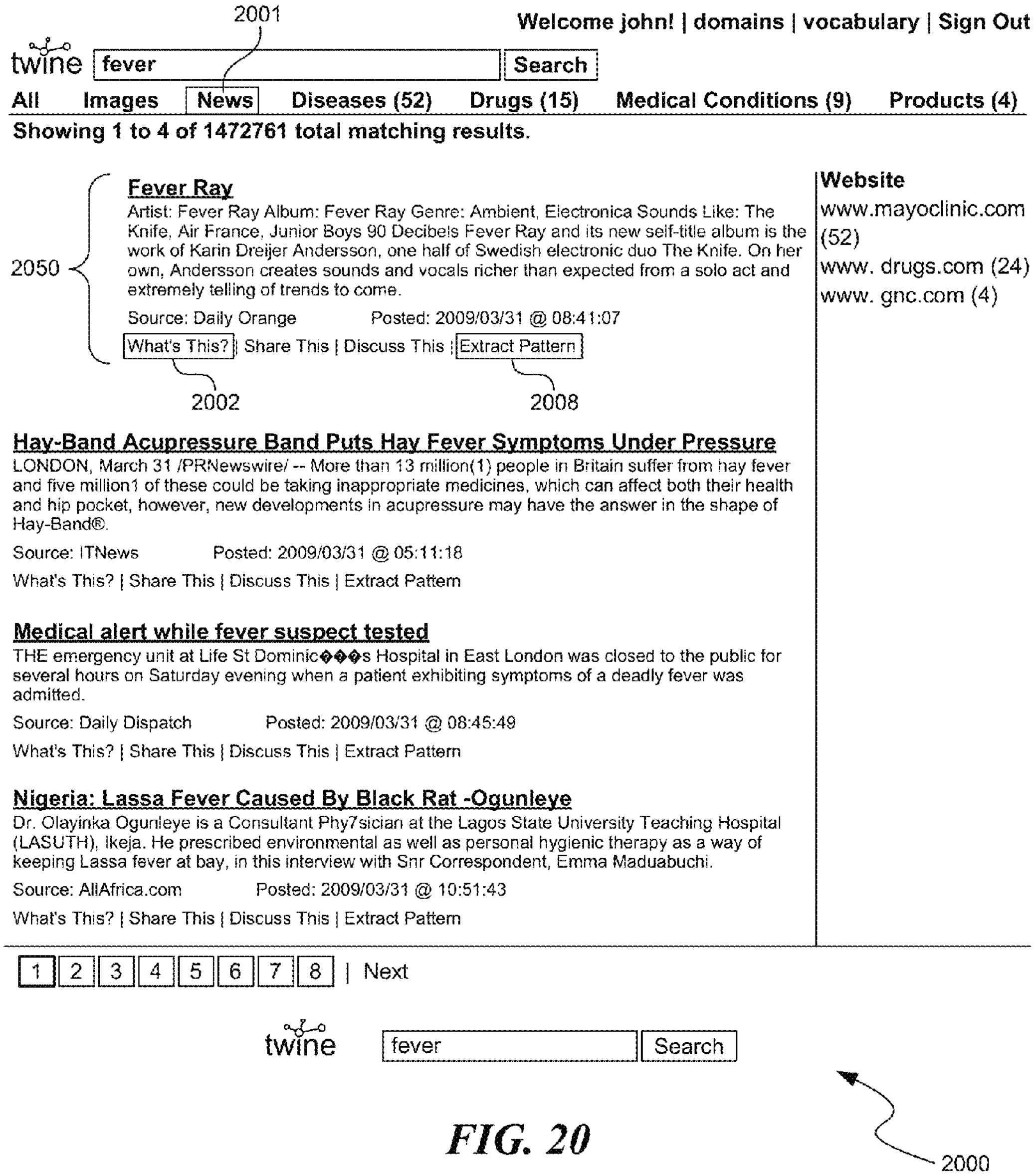
FIG. 20 illustrates a screenshot showing an example list of search results identified responsive to the search query and categorized as a news article.

FIG. 20 illustrates a screenshot 2000 showing an example list of search results identified responsive to the search query and categorized as a news article.

When tab 2001 "News" is selected, the search results shown in the example of FIG. 18 having content of or related to a news article are shown and categorized as such. Note that the semantic type of entry 2050 may not be determined yet. The user can use the "What's this?" tab 2002 to enter a user-defined semantic type of the content of the search result 2050. The user-defined semantic type can be saved by the search engine and subsequently used to identify other content of or relating to the user-defined semantic type.

In one embodiment, the user can use the "extract pattern" tab 2008 to define a pattern for the user-defined semantic type. The defined pattern can also be saved and subsequently used to identify additional objects with content of or related to the user-defined semantic type.

Note that the system can aggregate the various semantic types specified by users for the same search result 2050. In one embodiment, the system uses the user definitions to assign a semantic type to the search result. For example, the various semantic types defined by user can be ranked based on the frequency of use and the system can adopt one or more of the higher ranking semantic types to be assigned to the web page.

Figure 21:
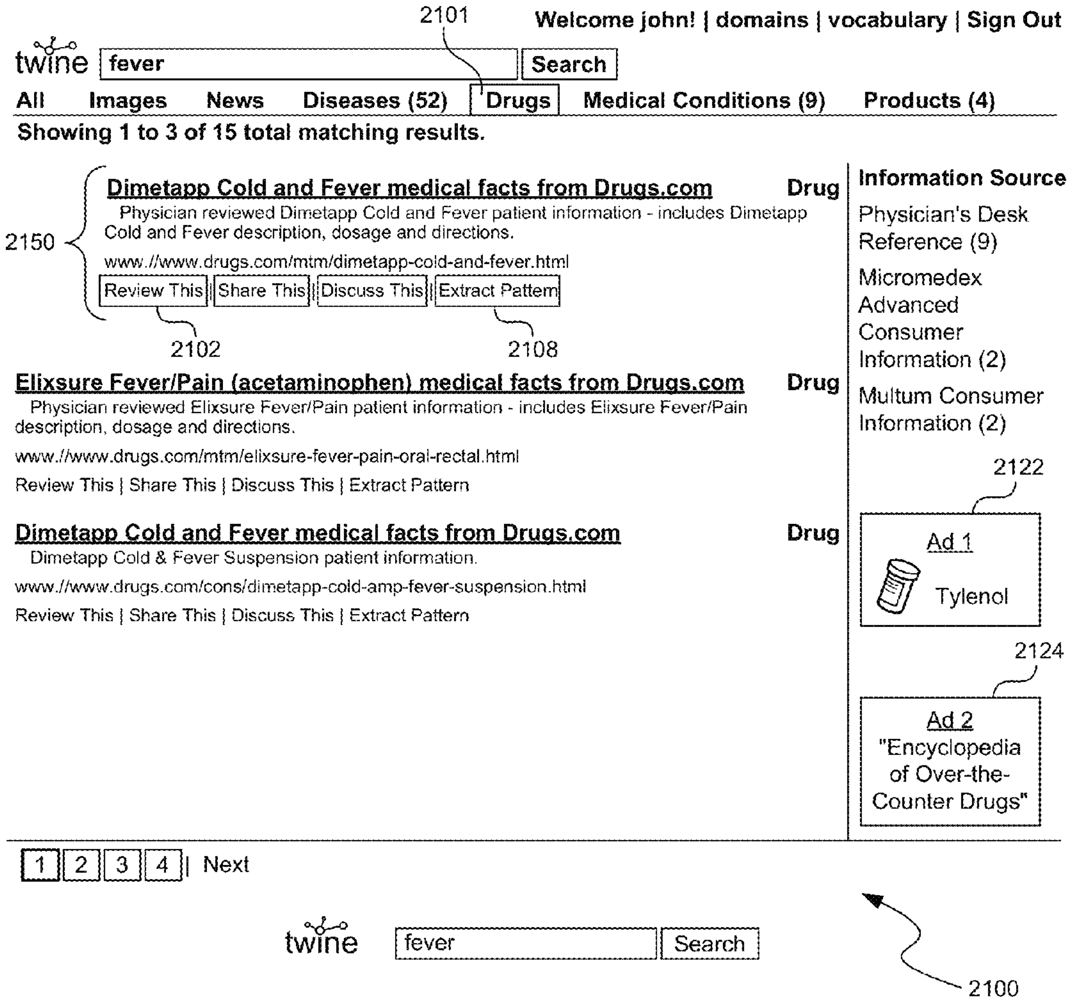
FIG. 21 illustrates a screenshot showing an example list of search results identified responsive to the search query and categorized as having content related to another semantic type.

FIG. 21 illustrates a screenshot 2100 showing an example list of search results identified responsive to the search query and categorized as having content related to another semantic type 2101.

When tab 2101 "Drugs" is selected, the search results shown in the example of FIG. 18 having content or related to the semantic type "Drugs" are shown and categorized as such. The entry 2150 can be labeled in the user interface as having a semantic type of "Drugs" 2101. In addition, a user can review the entry using tab 2102, share the entry, discuss the entry, and/or extract the pattern from the location identifier of the web page using tab 2108.

In one embodiment, when the semantic type "Drugs" is selected by the user, advertisements relevant to the selected semantic type can also be identified. For example, Ad 1 2122 for Tylenol can be presented to the user. In addition, Ad 2 2124 for an encyclopedia entitled "Encyclopedia of Over-the-counter Drugs" can be identified and selected for presentation to the user.

Figure 22:
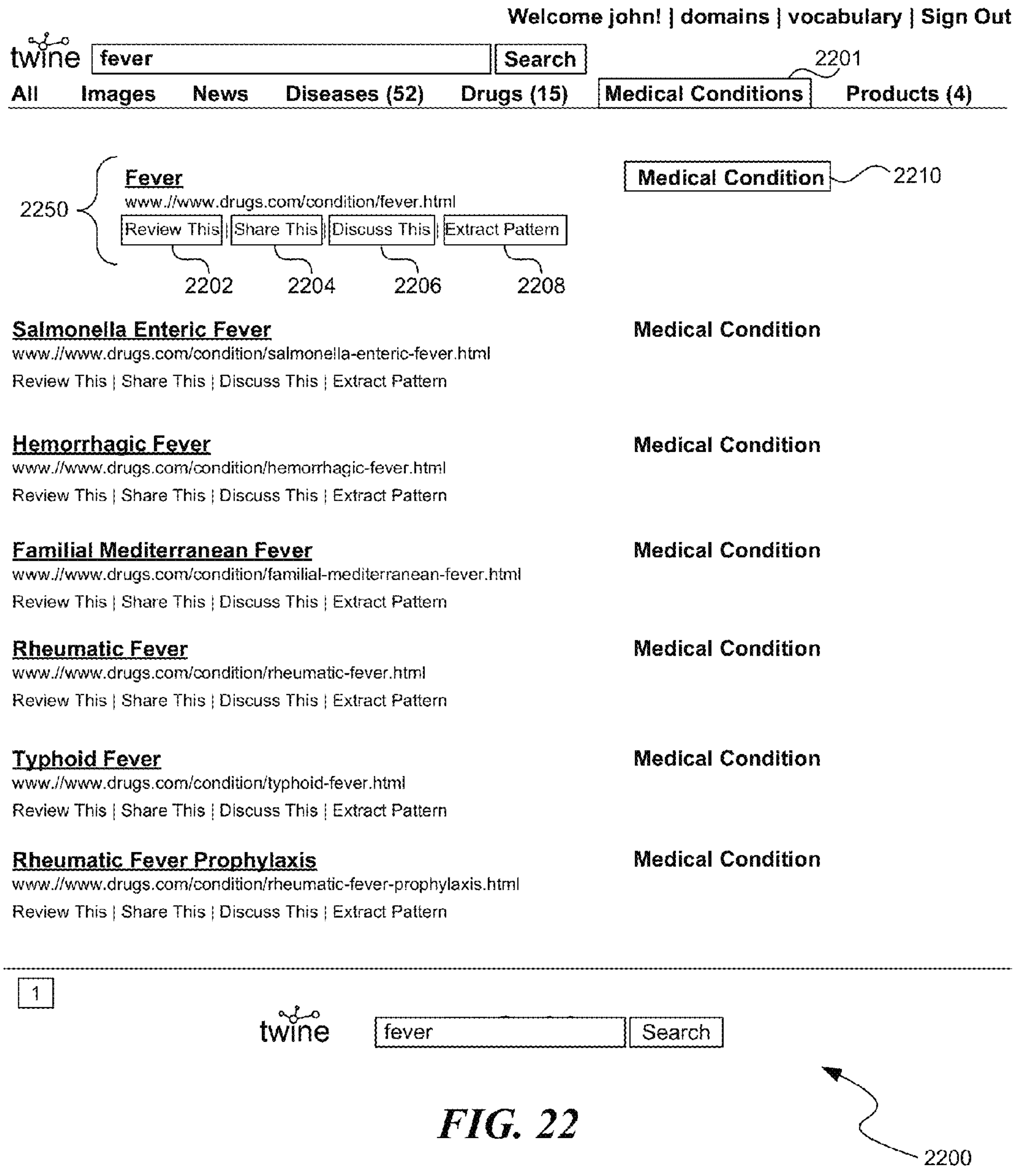
FIG. 22 illustrates a screenshot showing an example list of search results identified responsive to the search query and categorized as having content related to yet another semantic type.

FIG. 22 illustrates a screenshot 2200 showing an example list of search results identified responsive to the search query and categorized as having content related to yet another semantic type 2201.

When tab 2201 "Medical Conditions" is selected, the search results shown in the example of FIG. 18 having content or related to the semantic type "Medical Conditions" are shown and categorized as such. The entry 2150 can be labeled in the user interface as having a semantic type of "Medical Conditions" 2201. In addition, a user can review the entry using tab 2202, share the entry using 2204, discuss the entry using 2206, and/or extract the pattern from the location identifier of the web page using tab 2208.

Figure 23:
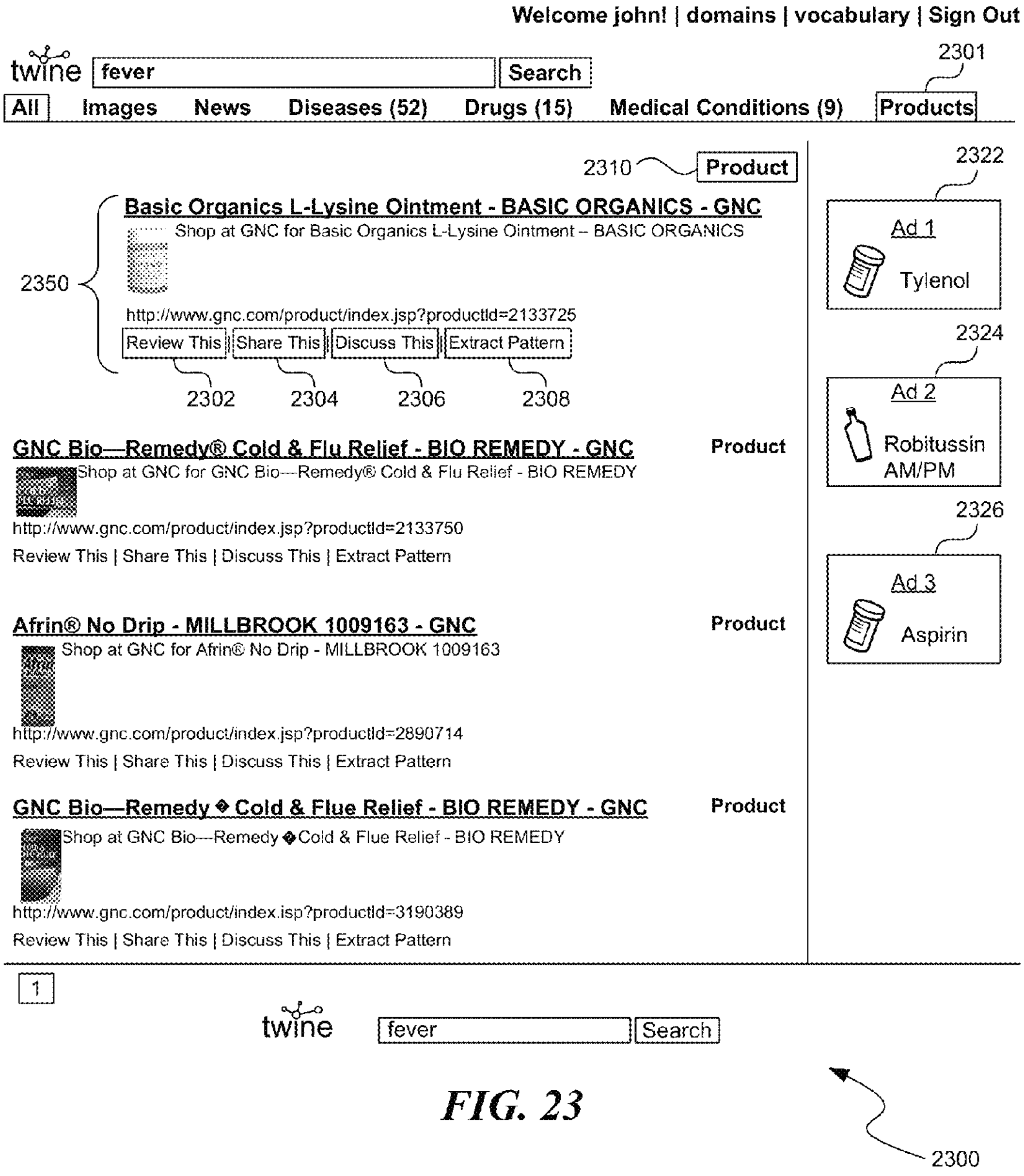
FIG. 23 illustrates an example list of search results identified responsive to the search query and categorized as having content related to yet another semantic type.

FIG. 23 illustrates a screenshot 2300 showing an example list of search results identified responsive to the search query and categorized as having content related to yet another semantic type 2301.

When tab 2301 "Products" is selected, the search results shown in the example of FIG. 18 having content or related to the semantic type "Products" are shown and categorized as such. The entry 2350 can be labeled in the user interface as having a semantic type of "Products" 2301 and labeled as having the semantic type of "Product" 2310. In addition, a user can review the entry using tab 2302, share the entry using 2304, discuss the entry using 2306, and/or extract the pattern from the location identifier of the web page using tab 2308.

In one embodiment, when the semantic type "Products" is selected by the user, advertisements relevant to the selected semantic type can also be identified. For example, Ad 1 2322 for Tylenol can be presented to the user. In addition, Ad 2 2324 for Robitussin can be identified and selected for presentation to the user. Further, Ad 3 2326 for Aspirin can also be identified and selected for presentation to the user.

Figure 24:
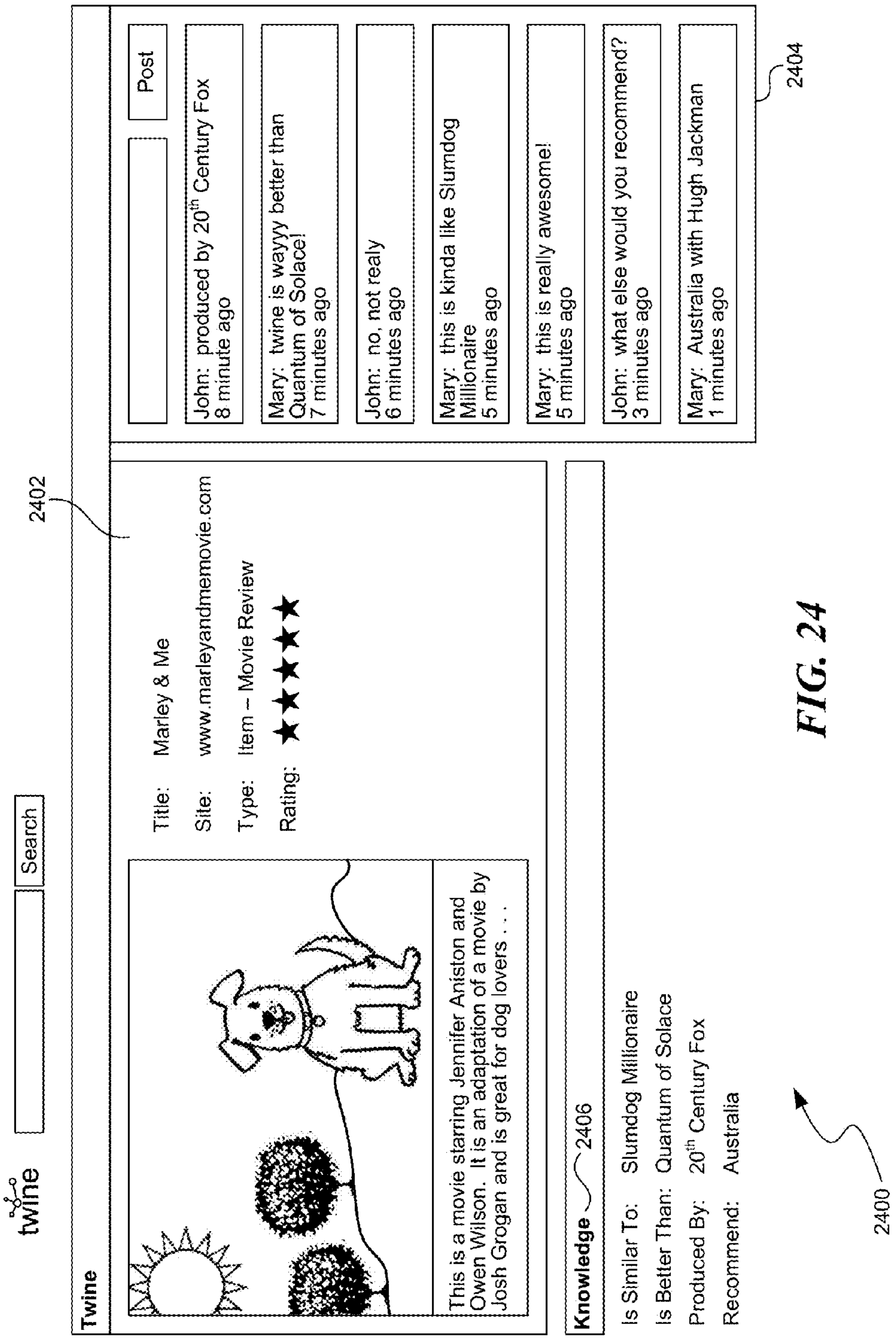
FIG. 24 illustrates an example of a web-dialogue that is parsed to obtain information regarding a particular webpage.

FIG. 24 illustrates an example of a web-dialogue 2404 that is parsed to obtain information regarding a particular webpage 2402.

The webpage 2402 includes a rating and a review of a movie. The web-dialogue 2404 conducted between users John and Mary are about the movie, other recently released movies, and recommendations, etc. The web-dialogue 2404 can be parsed according to a grammar. The grammar may be specifically designed for parsing online conversations or electronics conversations. By parsing the dialogue 2404, the semantic type of the content of webpage 2402 can be determined and used by the search engine in identifying search results or optimizing a set of search results.

In addition, triplets for conversations can be generated for a fixed subject and/or a variable subject. The fixed subject can be the content or resource being commented upon in the conversation (e.g., in reference to a webpage referencing "Pulp Fiction", the comment can be "this movie was directed by Quentin Tarantino"). The predicate and objects in the conversation can be detected using grammars which can be either a general grammar of a domain-specific grammar (e.g., movies or entertainment related).

The semantic facets identified using the predicate/objects can be used for targeted domain and/or conversational search (e.g., clicking on "movies", then clicking "Quentin Tarantino" under a "Director" filter; or typing in "who directed pulp fiction?"). In addition, the grammar (e.g., general or domain-specific) can also be used for targeted search or conversational search.

Figure 25:
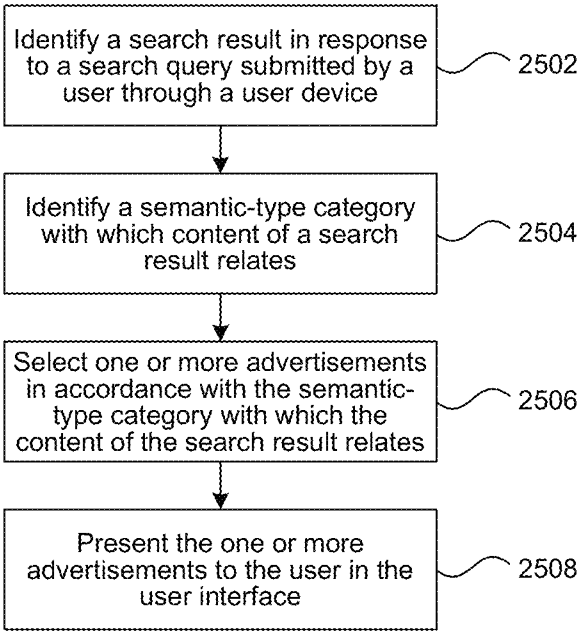
FIG. 25 depicts a flow chart illustrating an example process for semantic search enhanced advertising.

FIG. 25 depicts a flow chart illustrating an example process for semantic search enhanced advertising.

In process 2502, a search result is identified in response to a search query submitted by a user through a user device (e.g., computer, portable device, PDA, iPhone, cell phone, etc.). The search results can be identified using any method including but not limited to, a keyword search, indexing, semantics search, and/or any combination of the above. The search result can include a web page or other types of electronic content. In general, the search result is presented to a user interface for access by the user on the user device.

In process 2504, a semantic-type category with which content of a search result relates is identified. The semantic-type category can be identified via any method including but not limited to, topic detection, Natural Language Processing, data mining, speech analysis, speech recognition, or any combination of the above. In one embodiment, the semantic-type category is identified based on a pattern of a location identifier (e.g., a URI and/or a URL) of the web page.

In process 2506, one or more advertisements are selected in accordance with the semantic-type category with which the content of the search result relates. The advertisements may be selected by keyword matching using the semantic-type category. In process 2508, the one or more advertisements are presented to the user in the user interface.

Through the user interface, a selection of the search result by the user can be received. In one embodiment, instead of directing the user to a target page URL of the search result, a web page including item details is retrieved based on the semantic-type category for display to the user. The one or more advertisements can be presented to the user in the web page.

In one embodiment, a set of search results are identified responsive to the search query. Each of set of search results can be, for example, identified as having content related to a specific semantic-type category of a set of semantic-type categories. Advertisements to be associated with each of the set of search results can be identified using the specific semantic-type category with which the content is related.

When a user request to view a specific search result of the search results is received, an advertisement can selected using the specific semantic-type category with which content of the specific search result relates. The selected advertisement can be presented to the user in conjunction with the specific search result.

In addition, each of the advertisements can be categorized according to the specific semantic-type category used to identify each of the advertisements. In one embodiment, an index is assigned to each of the advertisements according to the specific semantic-type. The indices can subsequently be stored for each of the advertisements in a machine-readable storage medium for subsequent usage, for example.

The advertisements can generally include third-party content, hosted content, or a combination of the above. In one embodiment, a third party host of the third-party content is charged for indexing each of the advertisements based on the specific semantic-type. Further, third-party hosts can be provided with the advertisements and the indices associated with each of the advertisements. In some instances, the third-party host is charged for the indices associated with each of the advertisements.

In one embodiment, at least a portion of the set of search results is identified as having content related to a specific attribute of the specific semantic-type category. The specific attribute can be determined using patterns of location identifiers of each of the set of search results. Advertisements to be associated with each of the at least a portion of the set of search results can further be identified using the specific attribute with which the content is related.

Each of the advertisements can be categorized according to the specific attribute of the specific semantic-type category used to identify each of the advertisements. In addition, an index can be assigned to each of the advertisements according to the specific attribute of the semantic-type category. The indices for each of the advertisements can be stored in a machine-readable storage medium.

Figure 26:
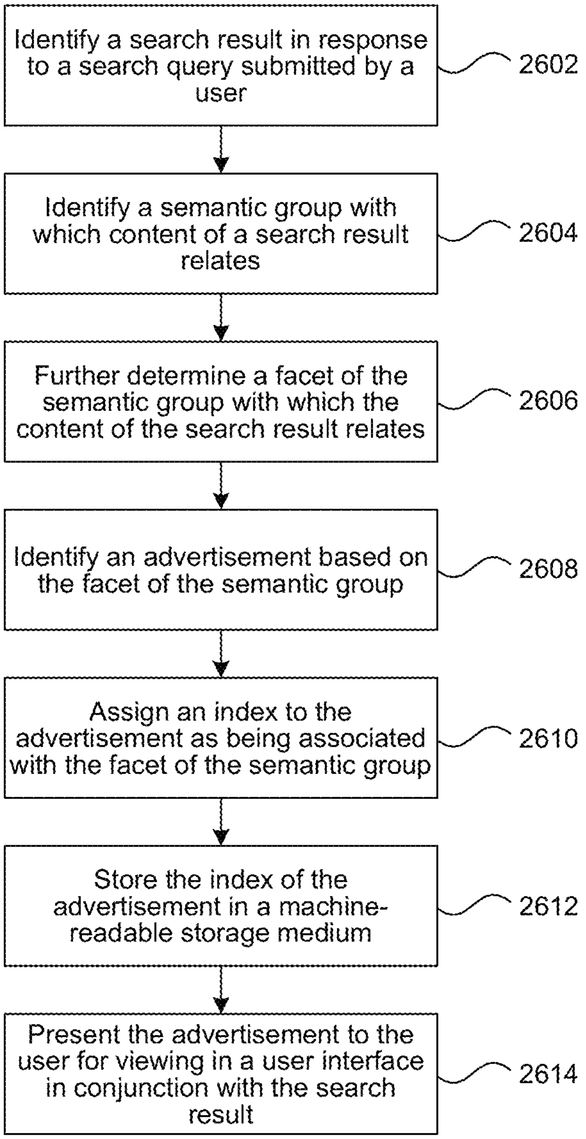
FIG. 26 depicts a flow chart illustrating an example process for targeting advertisements using semantic constraints.

FIG. 26 depicts a flow chart illustrating an example process for targeting advertisements using semantic constraints.

In process 2602, a search result is identified in response to a search query submitted by a user. In process 2604, a semantic group with which content of a search result relates is identified. In process 2606, a facet of the semantic group with which the content of the search result relates is further determined. In one embodiment, the semantic group (e.g., also referred to as 'semantic type') is identified using a pattern of a location identifier of the search result. The semantic facet (e.g., also referred to as an attribute of the semantic type or group) can also be identified using the pattern of the location identifier of the search result. The search result generally includes a web page. The location identifier can be a URI and/or a URL.

In process 2608, an advertisement is identified based on the facet of the semantic group.

In process 2610, an index is assigned to the advertisement as being associated with the facet of the semantic group. In one embodiment, the index of the advertisement is provided to a third-party for a fee. In addition, the advertisement is hosted by a third party and the index can be assigned to the advertisement for the third-party for a fee.

In process 2612, the index of the advertisement is stored in a machine-readable storage medium. The index of the advertisement can be retrieved from the machine-readable storage medium to determine the facet with which the advertisement is associated.

In process 2614, the advertisement is presented to the user for viewing in a user interface in conjunction with the search result. In addition, in response to determining that a second search result includes content related to the facet of the semantic group, the same advertisement can be presented with the second search result.

Figure 27:
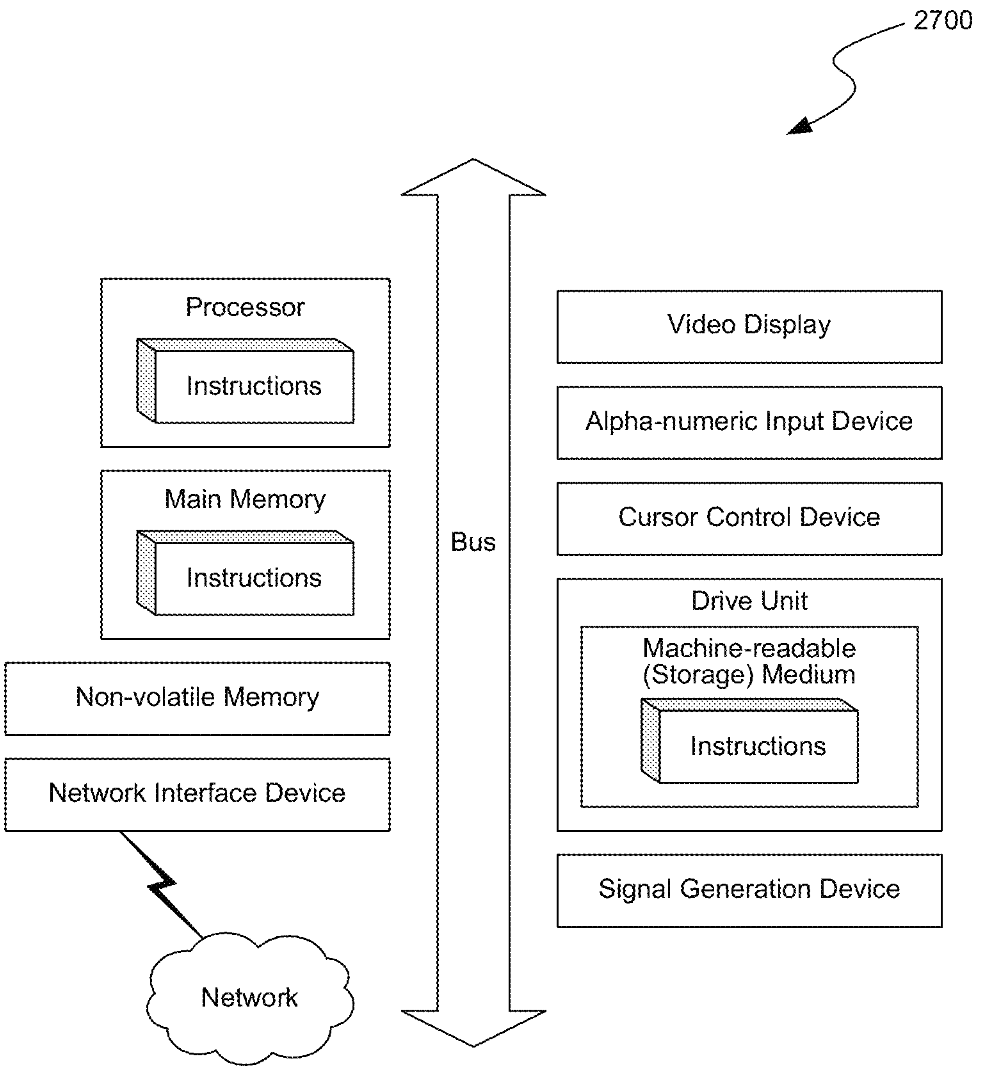
FIG. 27 shows a diagrammatic representation of a machine in the example form of a computer system within which a set of instructions, for causing the machine to perform any one or more of the methodologies discussed herein, may be executed.

FIG. 27 shows a diagrammatic representation of a machine in the example form of a computer system 2700 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

The invention claimed is:

1. A method of search, comprising:
detecting, by a computer processor, a set of Universal Resource Identifiers (URIs) where texts of the URIs match a specified pattern of characters that is not a URI, without analyzing content of a set of webpages associated with the set of URIs;
wherein the specified pattern of characters matching the set of URIs includes a domain name segment or a wildcard segment, a semantic type segment, and an attributes segment;
wherein the specified pattern corresponds to a semantic type;
wherein the semantic type is associated with multiple attributes that are user-defined; data mining, by the computer processor, content of each of the set of web pages associated with the set of URIs to determine a degree of relevancy to the semantic type; and
identifying, by the computer processor, a subset of the set of web pages based on the degrees of relevancy to the semantic type,
wherein the set of URIs correspond to user-added content in a social network.

2. The method of claim 1, further comprising associating each of the set of web pages with an ontology defining the semantic type.

3. The method of claim 1, further comprising ranking each of the set of web pages based on the degrees of relevancy determined from the data mining.

4. The method of claim 1, wherein the semantic type is defined by an end user through tagging or annotating the web pages on a user interface.

5. The method of claim 1, further comprising presenting a type-determined web page that is hosted by a sponsoring domain as a search result that has a differentiating template.

6. A system for search, comprising:
a process and memory, cooperating to function as:
a detecting unit configured to detect a set of Universal Resource Identifiers (URIs) where texts of the URIs match a specified pattern of characters that is not a URI, without analyzing content of a set of webpages associated with the set of URIs,
wherein the specified pattern corresponds to a semantic type and includes a domain name segment or a wildcard segment, a semantic type segment, and an attributes segment;
wherein the semantic type is associated with multiple attributes that are user-defined;
a mining unit configured to mine content of each of the set of web pages associated with the set of URIs to determine a degree of relevancy to the semantic type; and
an identifying unit configured to identify a subset of the set of web pages based on the degrees of relevancy to the semantic type,
wherein the set of URIs correspond to user-added content in a social network.

7. A method performed by a search engine, comprising:
detecting, by a computer processor, a set of Universal Resource Identifiers (URIs) where texts of the URIs match a specified pattern of characters that is not a URI, without analyzing content of a set of webpages associated with the set of URIs;
wherein the specified pattern corresponds to a semantic type,
wherein the specified pattern includes a domain name segment or a wildcard segment, a semantic type segment, and an attributes segment, and
wherein the semantic type is associated with multiple attributes that are user-defined;
data mining, by the computer processor, content of each of the set of web pages associated with the set of URIs to determine a degree of relevancy to the semantic type; and
identifying, by the computer processor, a subset of the set of web pages based on the degrees of relevancy to the semantic type.

8. The method of claim 7, where the multiple attributes are rated by users via a user interface.

9. The method of claim 7, wherein some of the multiple attributes are determined by a predefined ontology.

10. The method of claim 7, wherein the set of URIs correspond to user-added content in a social network.

11. The method of claim 7, wherein the set of URIs correspond to links in a sitemap.

12. The method of claim 7, wherein the semantic type is automatically determined.

13. The method of claim 7, further comprising identifying multiple patterns corresponding to the semantic type from the set of web pages.

14. The method of claim 7, wherein the specified pattern corresponds to an attribute of the semantic type.

15. The method of claim 14, wherein each of the web pages includes content that is associated with the attribute of the semantic type.

16. The method of claim 7, further comprising ranking each of the set of web pages based on the degrees of relevancy determined from the data mining.

17. A non-transitory machine-readable storage medium having stored thereon instructions which when executed by a processor performs a method, the method comprising:
detecting a set of Universal Resource Identifiers (URIs) where texts of the URIs match a specified pattern of characters that is not a URI, without analyzing content of a set of webpages associated with the set of URIs;
wherein the specified pattern corresponds to a semantic type,
wherein the specified pattern includes a domain name segment or a wildcard segment, a semantic type segment, and an attributes segment, and
wherein the semantic type is associated with multiple attributes that are user-defined;
data mining content of each of the set of web pages associated with the set of URIs to determine a degree of relevancy to the semantic type; and identifying a subset of the set of web pages based on the degrees of relevancy to the semantic type.

18. The method of claim 1, further comprising:
extracting a sub-pattern from at least one of the URIs, wherein the sub-pattern corresponds to an attribute of the semantic type;
performing pattern recognition on the URIs using the sub-pattern;
detecting a subset of the matching URIs that match the sub-pattern; and
identifying a subset of web pages associated with the matching URIs, wherein each of the subset of web pages includes content associated with the attributed of the semantic type.

* * * * *